United States Patent
Kermoian et al.

(10) Patent No.: US 8,548,382 B2
(45) Date of Patent: Oct. 1, 2013

(54) SYSTEM AND METHOD FOR NAVIGATING BETWEEN USER INTERFACE ELEMENTS

(75) Inventors: Chris Sam Kermoian, Redwood City, CA (US); Joseph Patrick Thomas Goguen, Los Gatos, CA (US)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 13/615,370

(22) Filed: Sep. 13, 2012

(65) Prior Publication Data

US 2013/0097562 A1    Apr. 18, 2013

Related U.S. Application Data

(63) Continuation of application No. 13/397,533, filed on Feb. 15, 2012.

(60) Provisional application No. 61/548,145, filed on Oct. 17, 2011, provisional application No. 61/555,836, filed on Nov. 4, 2011, provisional application No. 61/555,984, filed on Nov. 4, 2011.

(51) Int. Cl.
*H04W 88/02* (2009.01)

(52) U.S. Cl.
USPC ........................................... 455/41.2

(58) Field of Classification Search
USPC ........ 455/41.2, 41.3, 416, 436–445; 709/223
See application file for complete search history.

(56) References Cited

U.S. PATENT DOCUMENTS

| | | | |
|---|---|---|---|
| 5,072,412 A | 12/1991 | Henderson et al. | |
| 7,536,000 B2 | 5/2009 | Ho | |
| 7,684,550 B2 | 3/2010 | McCullough et al. | |
| 7,734,680 B1 | 6/2010 | Kurapati et al. | |
| 2005/0059439 A1 | 3/2005 | White et al. | |
| 2005/0198612 A1 | 9/2005 | Gonzalez | |
| 2006/0187900 A1 | 8/2006 | Akbar | |
| 2006/0236328 A1 | 10/2006 | DeWitt | |

(Continued)

FOREIGN PATENT DOCUMENTS

| | | |
|---|---|---|
| WO | 02057899 A1 | 7/2002 |
| WO | 2005041027 A1 | 5/2005 |
| WO | 2006043977 A1 | 4/2006 |
| WO | 2009012330 A2 | 1/2009 |

OTHER PUBLICATIONS

Syed, C.; Search Report from corresponding PCT Application No. PCT/CA2012/000315; search completed Aug. 7, 2012.

(Continued)

*Primary Examiner* — Diane Mizrahi
(74) *Attorney, Agent, or Firm* — Novak Druce Connolly Bove + Quigg LLP

(57) ABSTRACT

A method is provided that comprises detecting an incoming or outgoing call; and sending data to a paired device for displaying a plurality of elements associated with the call in a user interface on the paired device prior to connecting the call, the plurality of elements having been obtained from a plurality of sources accessible to the mobile device. Another method is provided, which comprises receiving data from the mobile device for displaying a plurality of elements associated with the call in a user interface on a paired device prior to connecting the call, the plurality of elements having been obtained from a plurality of sources accessible to the mobile device; and displaying the plurality of elements in a user interface on the paired device using the data received from the mobile device.

15 Claims, 38 Drawing Sheets

(56) References Cited

U.S. PATENT DOCUMENTS

| | | |
|---|---|---|
| 2006/0285502 A1 | 12/2006 | Bigioi et al. |
| 2008/0122796 A1 | 5/2008 | Jobs et al. |
| 2008/0174570 A1* | 7/2008 | Jobs et al. .................... 345/173 |
| 2008/0233957 A1 | 9/2008 | Akama |
| 2009/0083374 A1 | 3/2009 | Saint Clair |
| 2009/0136013 A1 | 5/2009 | Kuykendall et al. |
| 2009/0327953 A1 | 12/2009 | Honkala et al. |
| 2010/0157990 A1 | 6/2010 | Krzyzanowski et al. |
| 2010/0167712 A1 | 7/2010 | Stallings et al. |
| 2010/0332530 A1 | 12/2010 | McKelvie et al. |
| 2011/0072394 A1* | 3/2011 | Victor ........................... 715/821 |
| 2011/0078597 A1* | 3/2011 | Rapp et al. .................... 715/765 |
| 2011/0179388 A1* | 7/2011 | Fleizach et al. ............... 715/840 |
| 2012/0264408 A1 | 10/2012 | Wilkerson |

OTHER PUBLICATIONS

Sterling, G.; Yellix Turns Facebook into Caller ID << Screenwerk; Aug. 11, 2009; pp. 1 and 2; http://gesterling.wordpress.com/2009/08/11/yellix-turns-facebood-into-caller-id/.

Nuttal, C.; FT.com / Media—'Social' phones to reveal all about your caller; Sep. 20, 2009; p. 1; http://www.ft.com/cms/s/0/f5529db2-a5ff-11de-8c92-00144feabcd0/html.

Leachon, A.; Hands-onwith TieScape:Sony Ericsson's brilliant message mash-up app : Shiny Shiny; Feb. 17, 2010; p. 1; http://shinyshiny.tv/2010/02/.

"Smartphone Views: Building Multi-Device Distributed User Interfaces"; LNCS/Computational Science; Sep. 13, 2004; pp. 507 to 511; vol. 3160; ISBN: 978-3-540-24128-7.

Search Report from corresponding European Application No. 12185861.7; search completed Feb. 14, 2013.

Search Report from corresponding European Application No. 12185865.8; search completed Feb. 15, 2013.

Search Report from corresponding European Application No. 12185867.4; search completed Feb. 15, 2013.

Search Report from corresponding European Application No. 12161204.8; search completed Nov. 13, 2012.

\* cited by examiner

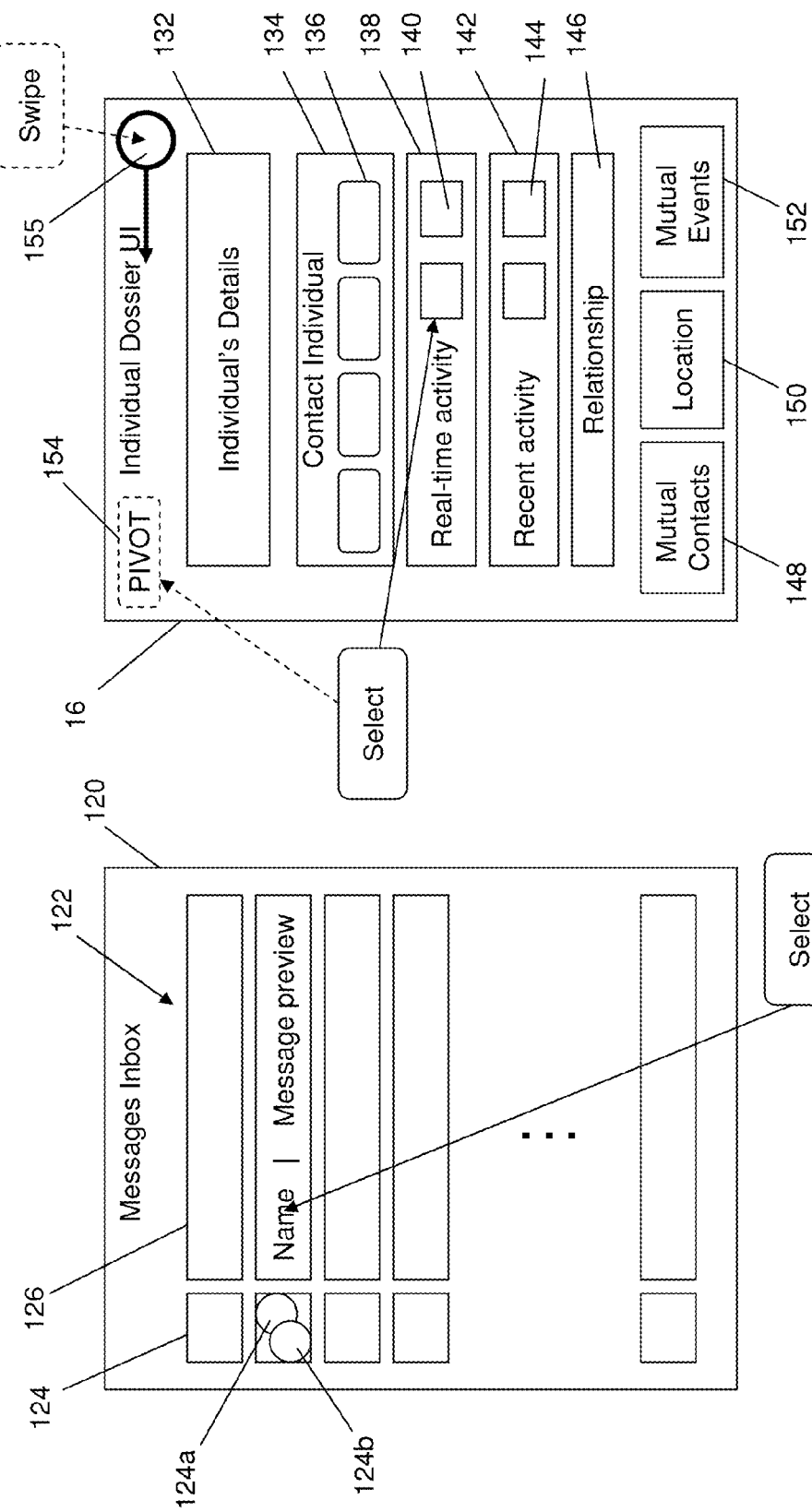

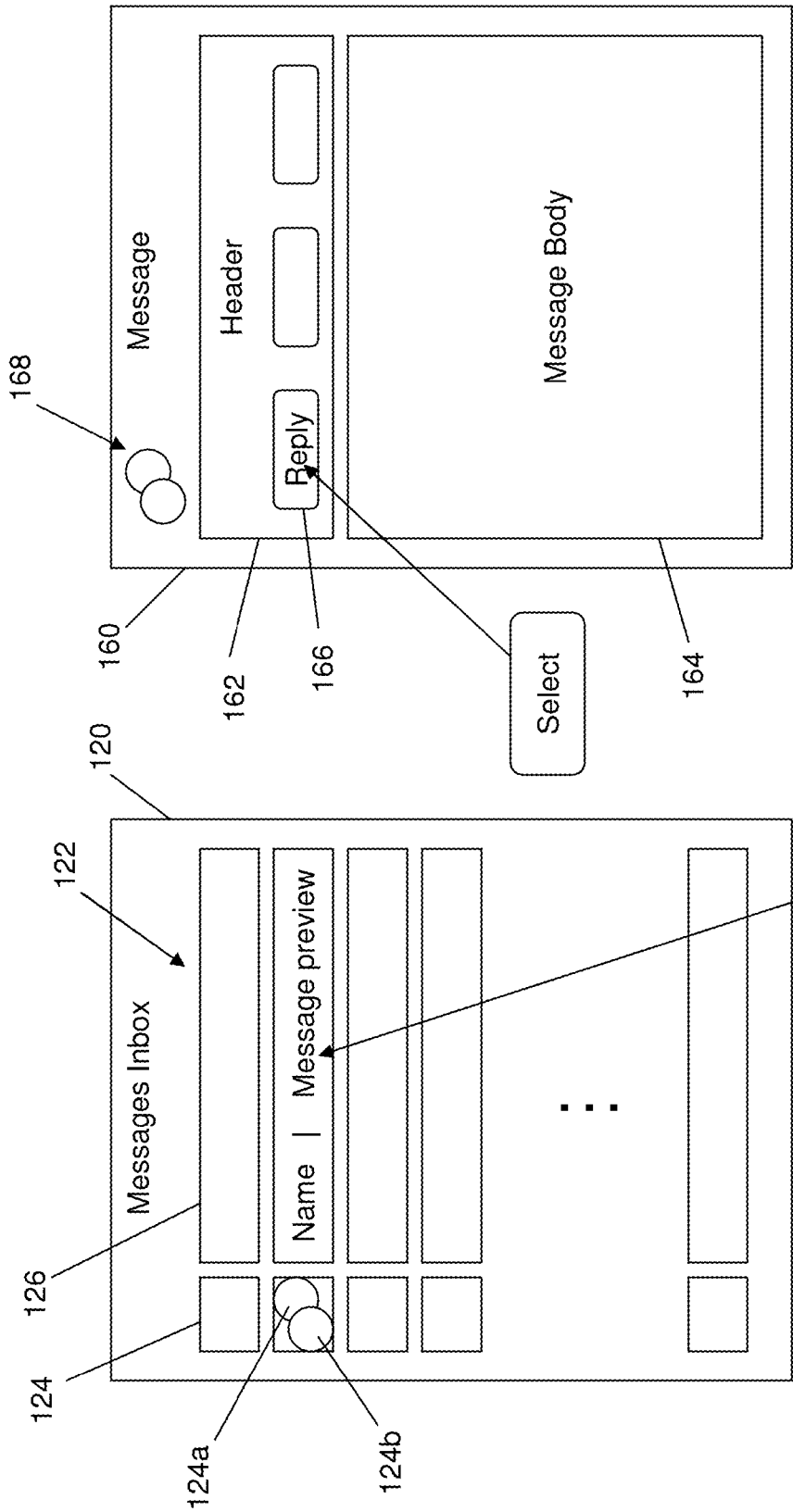

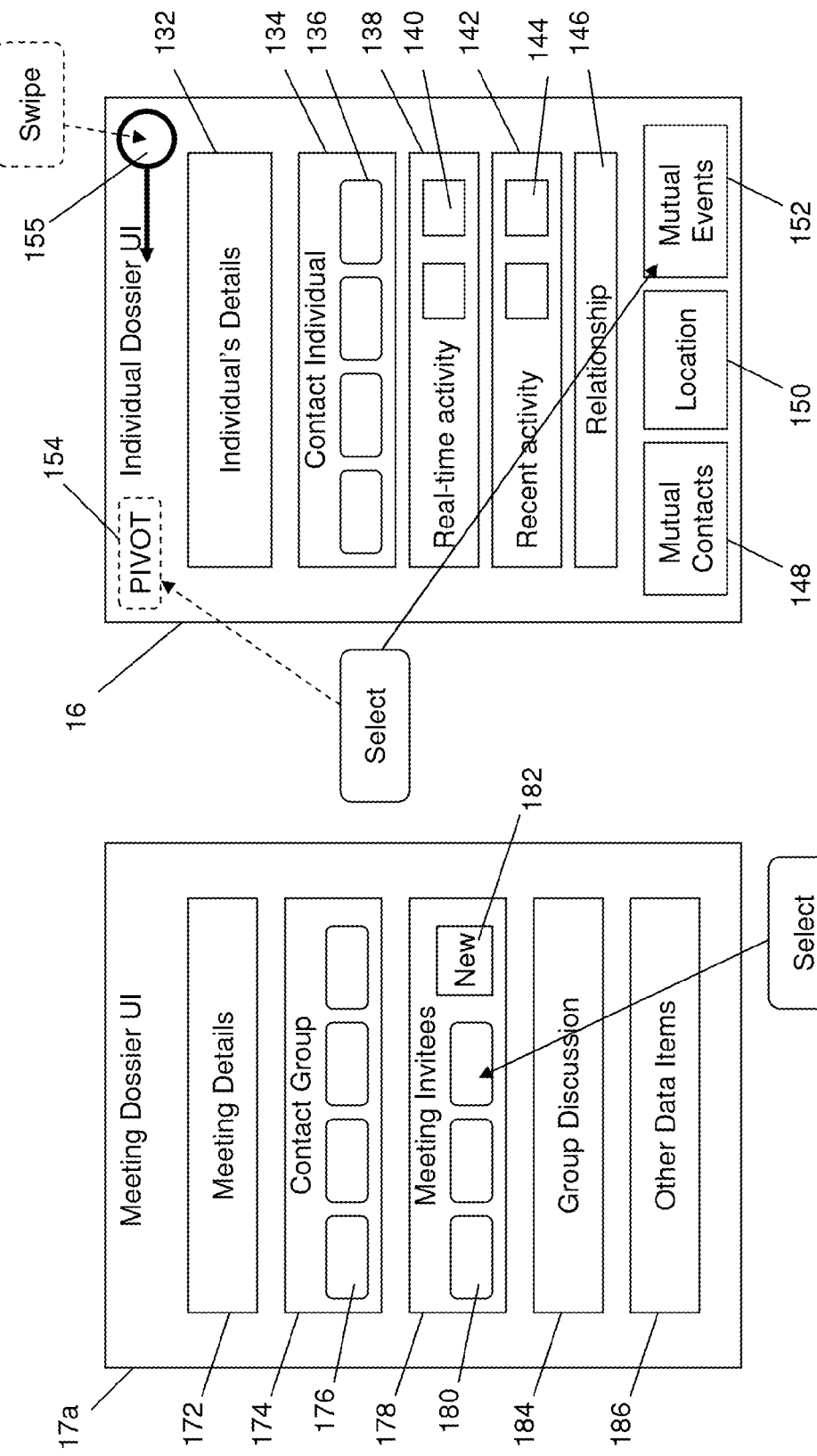

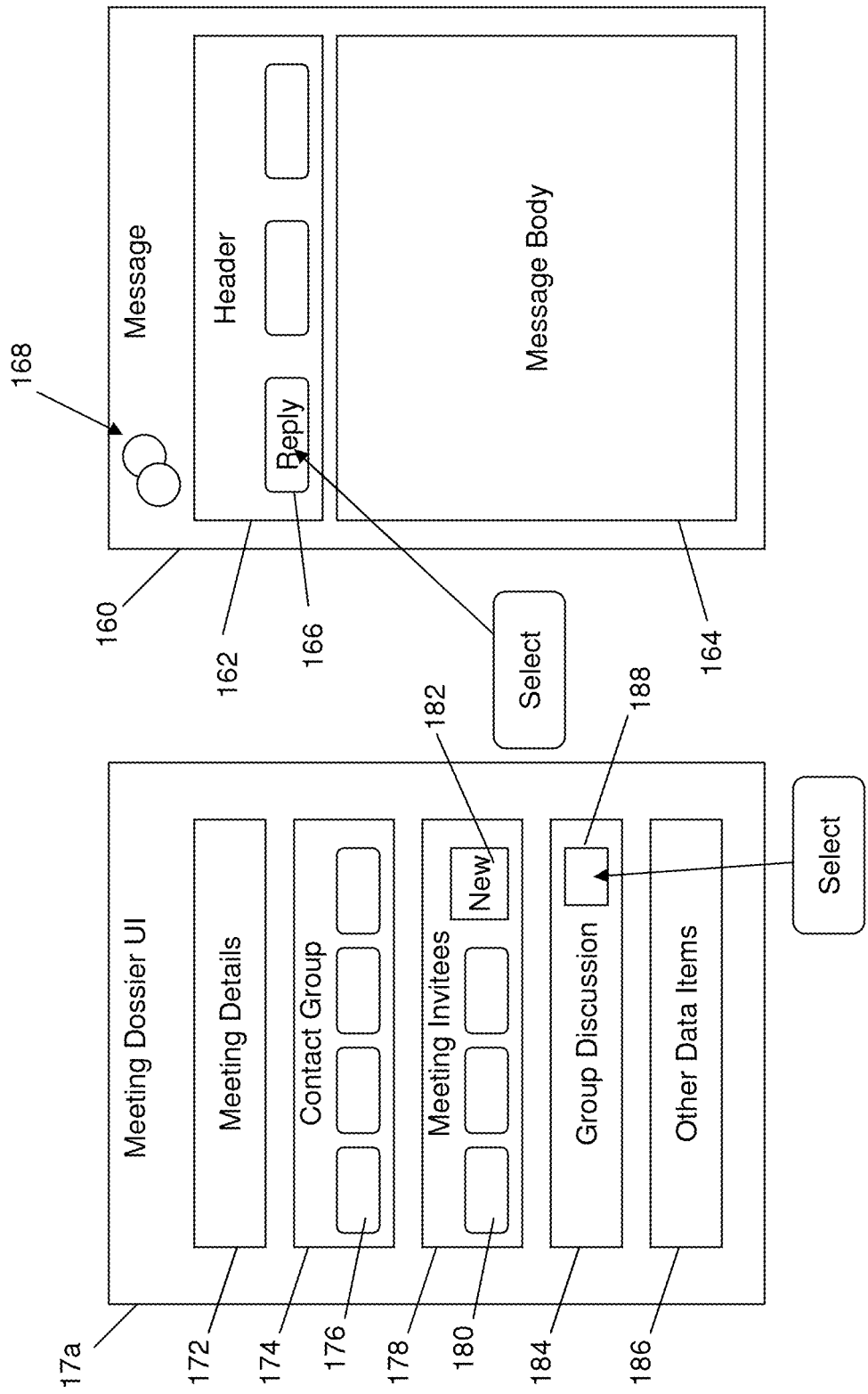

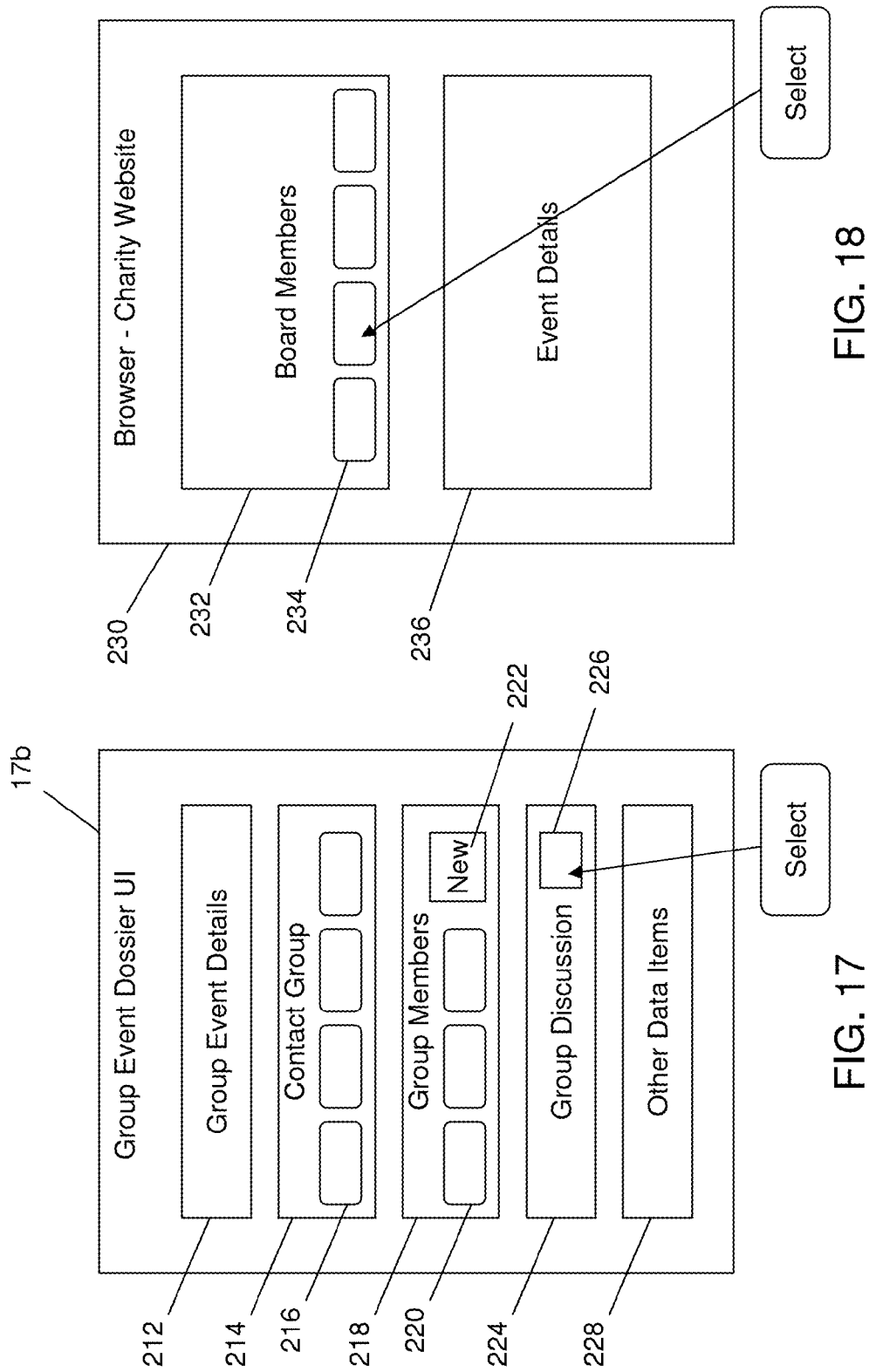

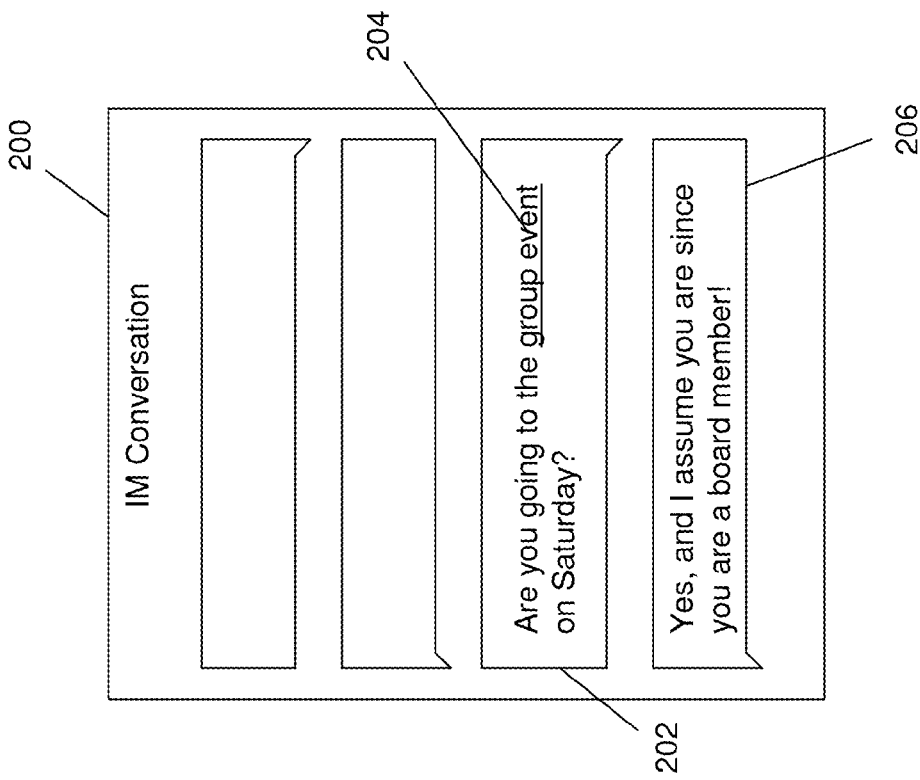
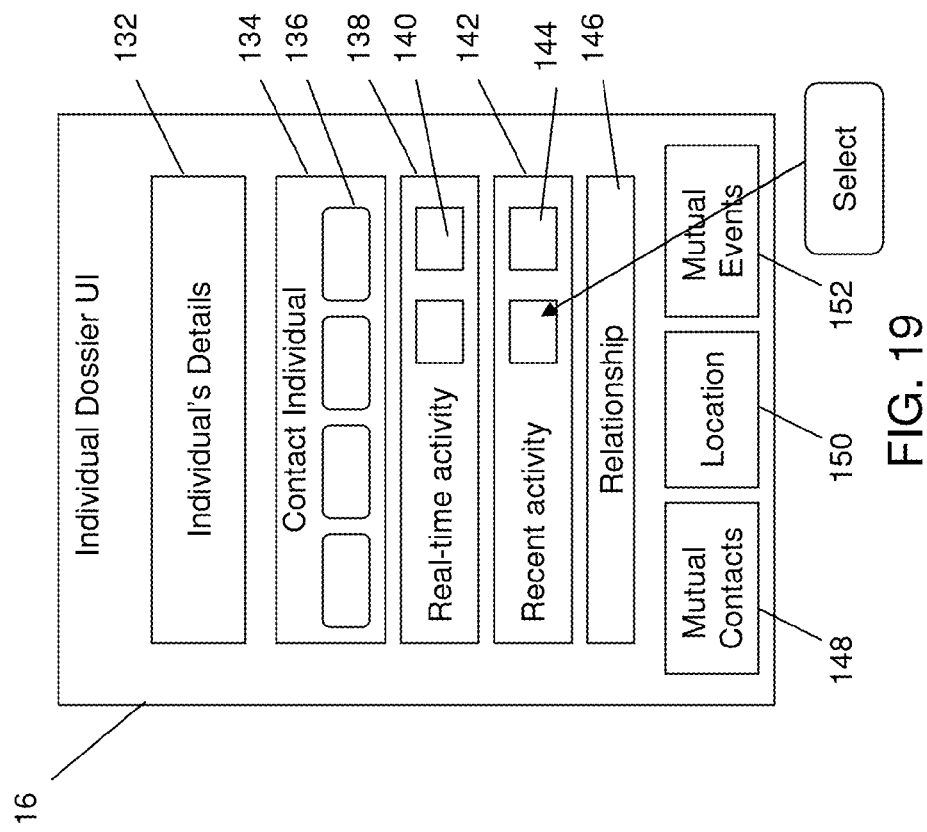
FIG. 20
FIG. 19

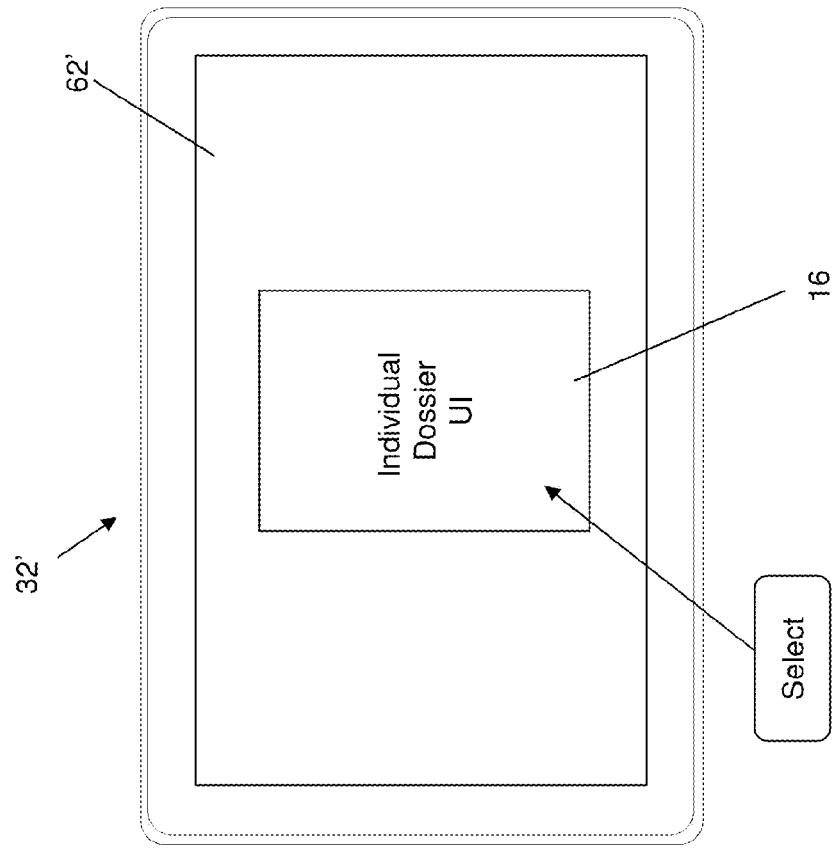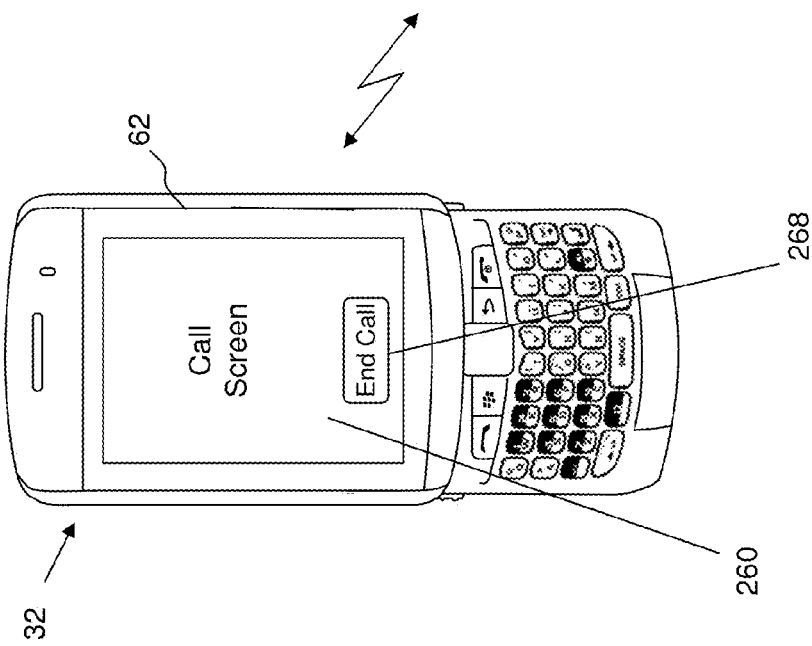
FIG. 26

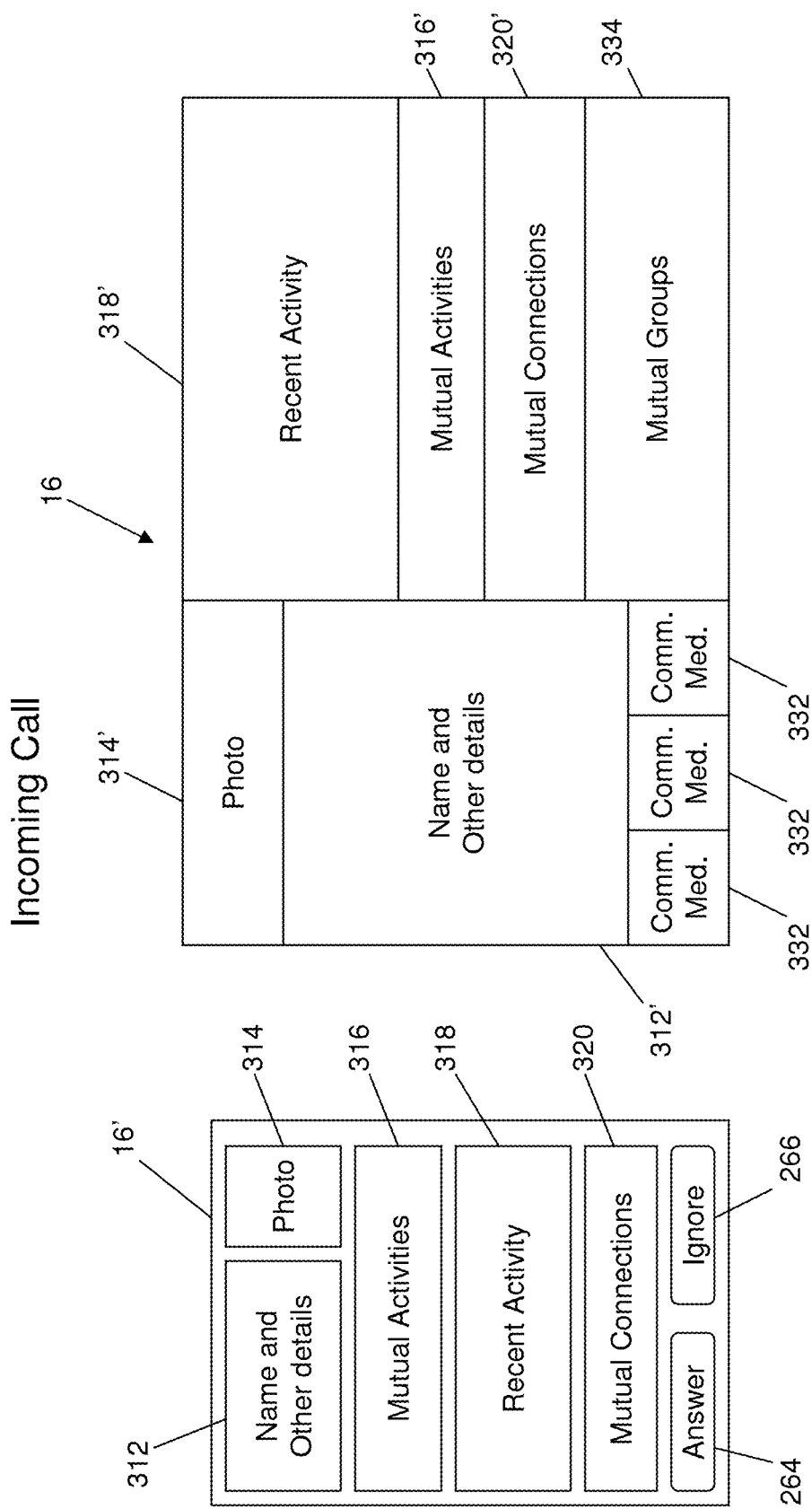

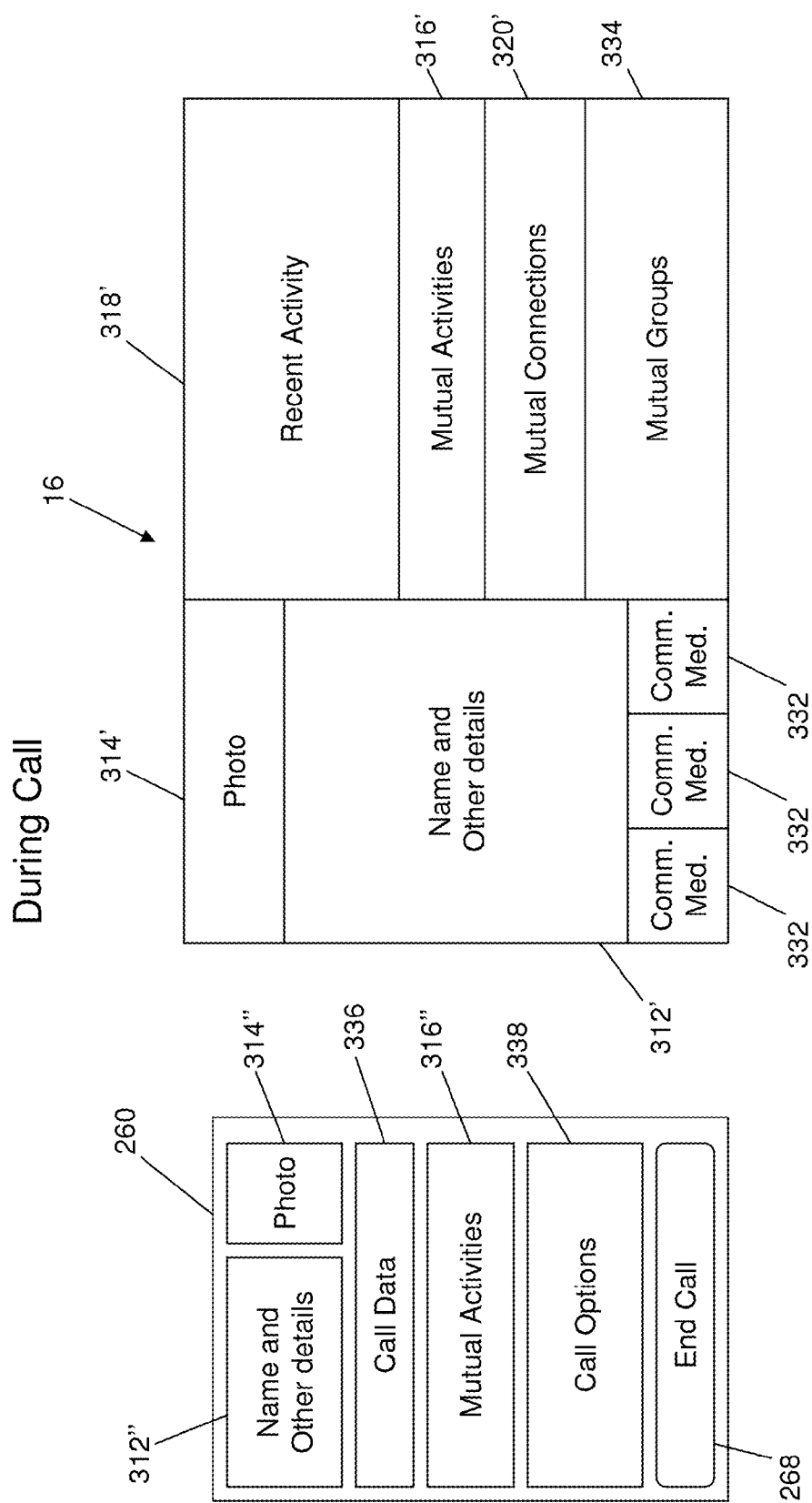

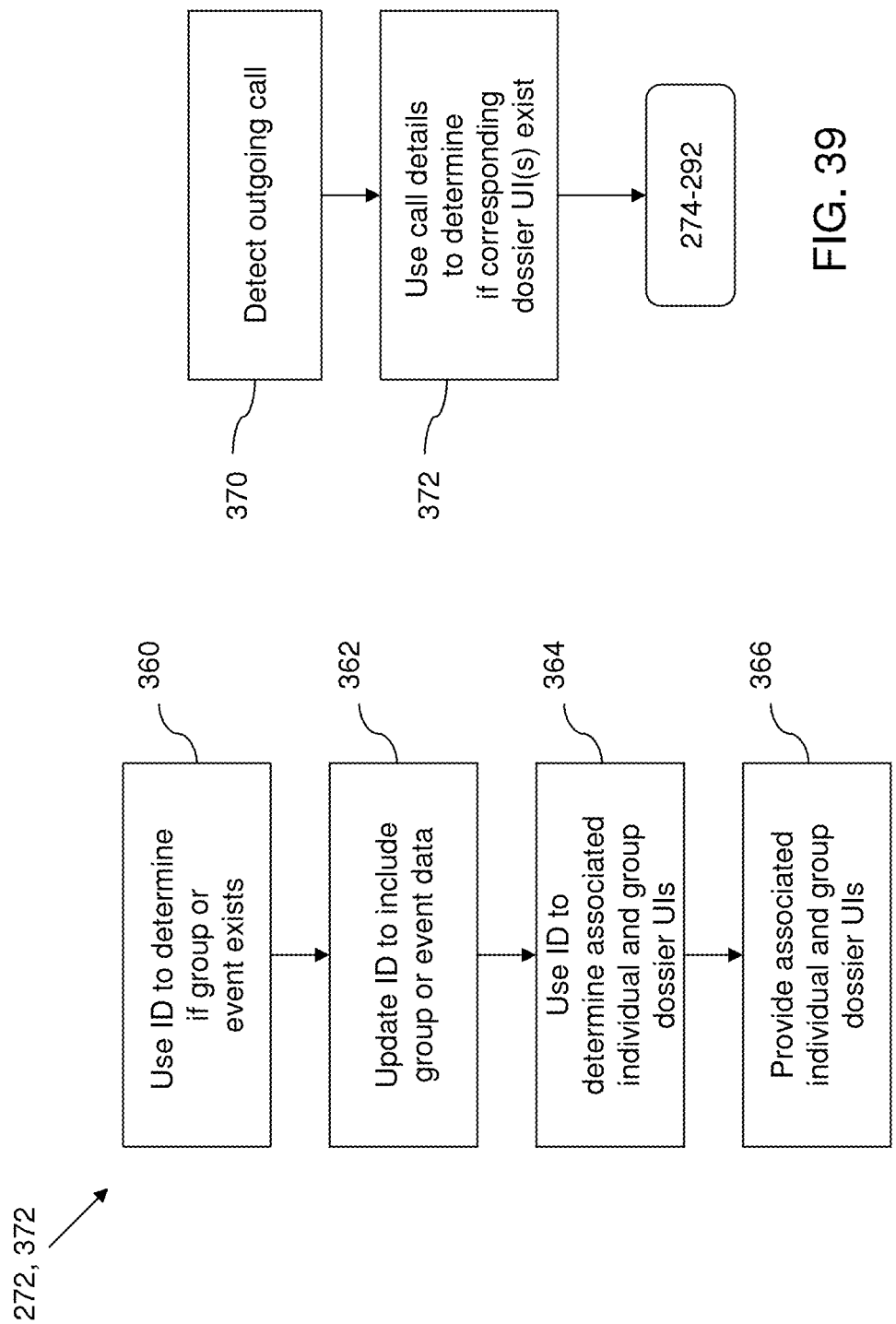

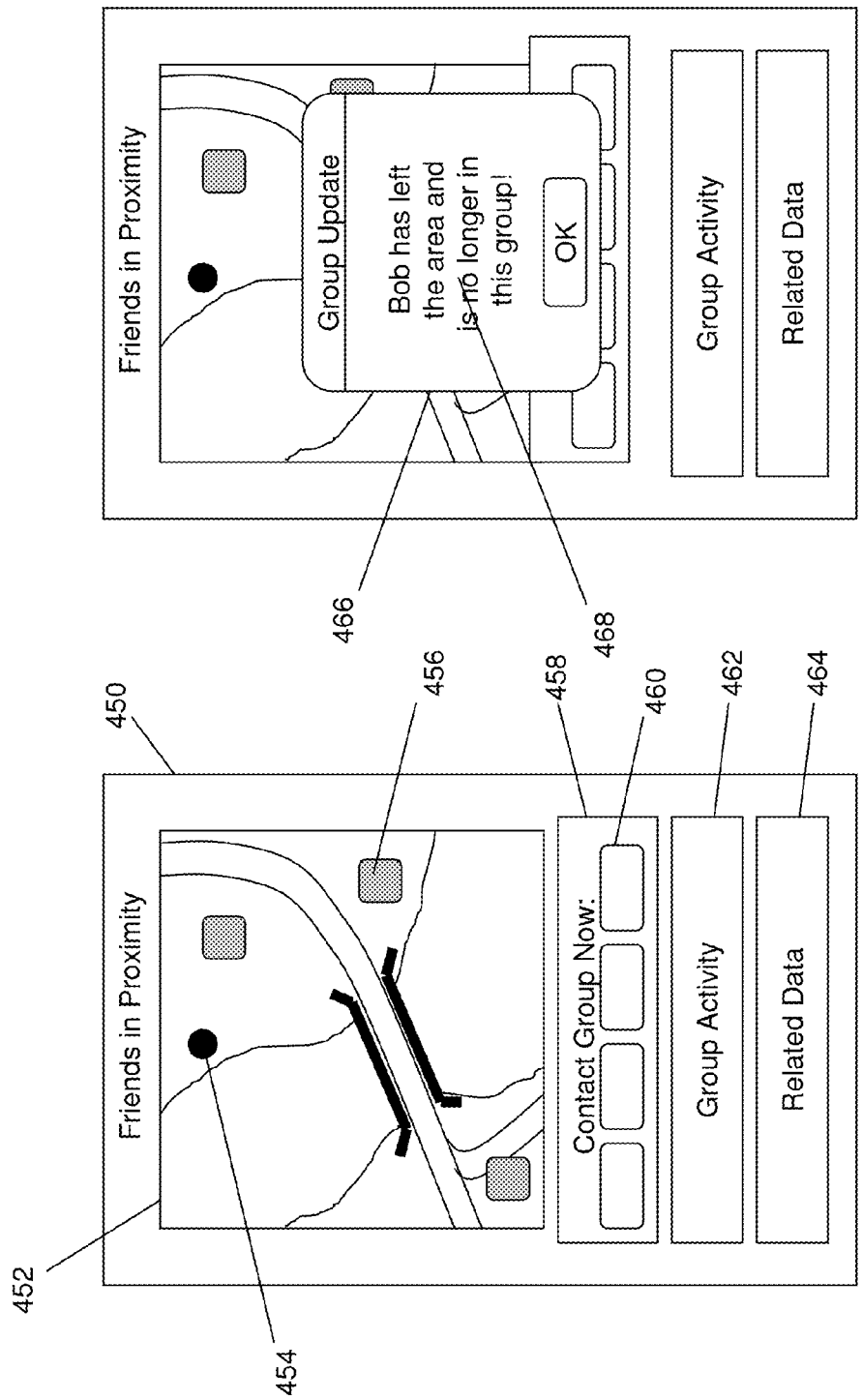

SYSTEM AND METHOD FOR NAVIGATING BETWEEN USER INTERFACE ELEMENTS

This application is a continuation of U.S. patent application Ser. No. 13/397,533 filed on Feb. 15, 2012, which claims priority from U.S. Provisional Patent Application Nos. 61/548,145 filed on Oct. 17, 2011; 61/555,836 filed on Nov. 4, 2011; and 61/555,984 filed on Nov. 4, 2011; the contents of these applications being incorporated herein by reference in their entireties.

TECHNICAL FIELD

The following relates to systems and methods for managing electronic groups.

DESCRIPTION OF THE RELATED ART

Computing devices or systems providing user interfaces (UIs) on a display to enable users to interact with the computing devices or systems traditionally separate functionality and operability into distinct applications. For example, messages may be accessed through a messages inbox or application UI, calendar events may be accessed through a calendar application UI, instant messaging (IM) conversations may be accessed through an IM application, social networking updates may be accessed through the messages inbox UI or a social networking application UI, etc.

The separation of data items associated with the functionally and operability of the computing device or system into different applications creates a virtual barrier between the data items. For example, if a user wishes to view a calendar appointment associated with a message they are currently viewing, the user would typically navigate from the messages application UI to the calendar application UI and find the particular calendar appointment. On computing devices having relatively smaller displays, such as smart phones, tablet computers, portable gaming systems, and the like, having to navigate between applications in this way can be cumbersome and time consuming. Moreover, the user may inadvertently forget where they are navigating to and have difficulty returning to the previous application UI.

BRIEF DESCRIPTION OF THE DRAWINGS

Examples will now be described with reference to the appended drawings wherein:

FIG. 5 is a screen shot of an example messages inbox UI;

FIG. 6 is a screen shot of an example individual dossier UI;

FIG. 7 is a screen shot of an example messages inbox UI;

FIG. 8 is a screen shot of an example message UI;

FIG. 9 is a screen shot of an example meeting dossier UI;

FIG. 10 is a screen shot of an example individual dossier UI;

FIG. 11 is a screen shot of an example meeting dossier UI;

FIG. 12 is a screen shot of an example message UI;

FIG. 17 is a screen shot of an example group event dossier UI;

FIG. 18 is a screen shot of an example browser UI;

FIG. 19 is a screen shot of an example individual dossier UI;

FIG. 20 is a screen shot of an example IM conversation UI;

FIG. 26 is a pictorial view of two paired mobile devices displaying dossier UIs during an ongoing call;

FIG. 30 is a screen shot of an example enhanced caller ID UI for an incoming call comprising an individual dossier UI;

FIG. 31 is a screen shot of an example individual dossier UI displayed by a paired device;

FIG. 32 is a screen shot of an example call screen UI for an ongoing call;

FIG. 33 is a screen shot of an example individual dossier UI displayed by a paired device during an ongoing call;

FIG. 38 is a flow chart illustrating example computer executable operations that may be performed by a called device in determining dossier UIs associated with a caller;

FIG. 39 is a flow chart illustrating example computer executable operations that may be performed in displaying dossier UIs when initiating an outgoing call;

FIG. 42 is a screen shot of an example of a location-based group UI;

FIG. 43 is a screen shot of an example of a group update UI;

DETAILED DESCRIPTION

Figure 1:
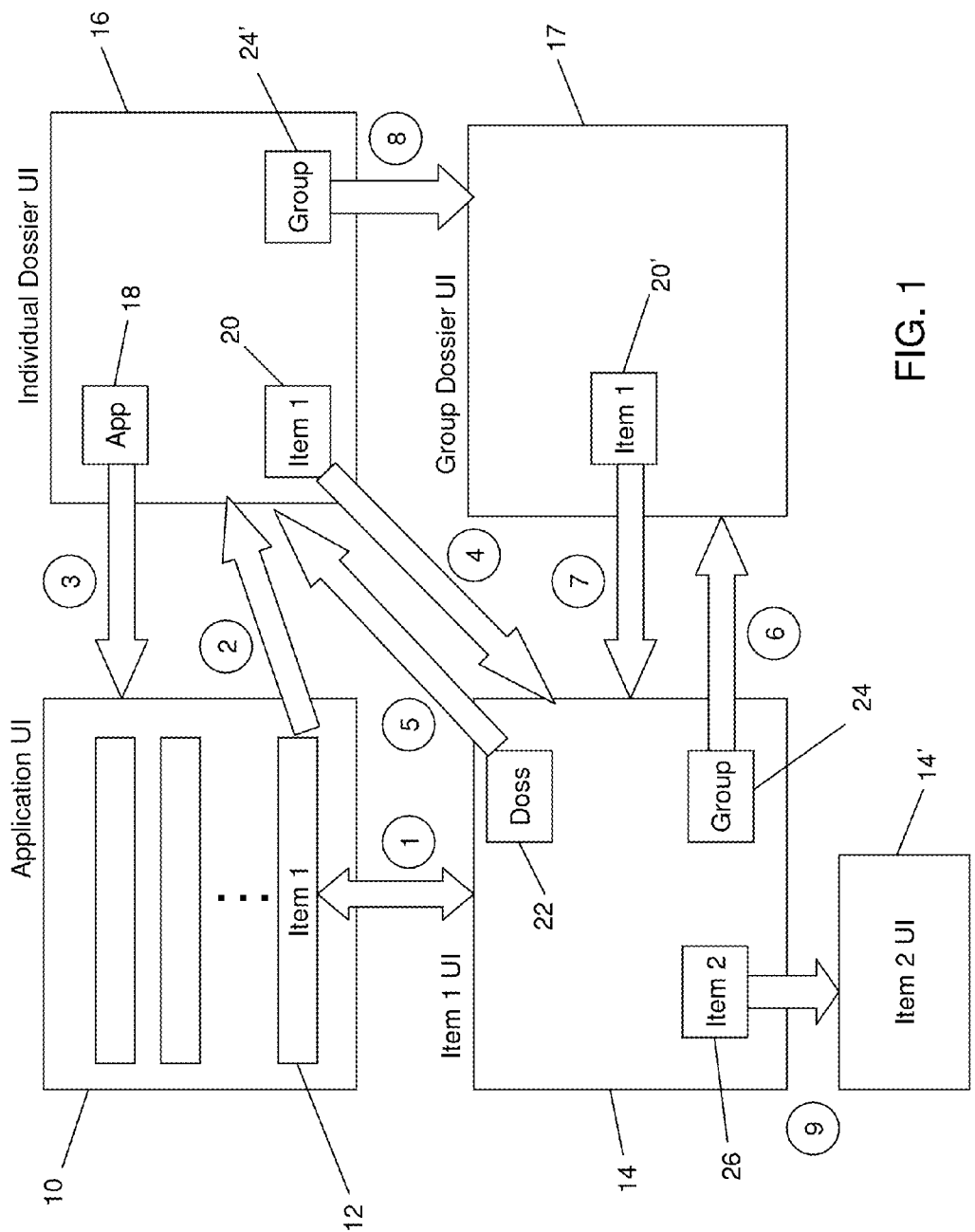
FIG. 1 is a schematic diagram illustrating a UI navigation flow utilizing dossier UIs.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To provide a more convenient navigation flow between user interface items, an amalgamated "dossier" view may be provided. Such a dossier view incorporates multiple links to item UIs, application UIs, and other dossier views to enable pivoting between related UIs and navigation through and around a connected social or business network without having to individually access each application UI and search or otherwise locate the desired item UIs, application UIs, or other dossier views.

It has also been found that when receiving a call on a mobile device, current caller ID functions generally provide only minimal details related to the caller, such as the phone number and, if available, the name and a picture associated with the caller. Although such information may assist in identifying the caller, by providing additional information such as a dossier view or modified version thereof during an incoming call screen, the recipient can better understand the context of the call and his/her relationship with the caller.

While participating in a call (e.g., direct call, group call, conference call, etc.), it can be time consuming to obtain detailed information associated with the other call attendee(s) to facilitate communications and coordination with the call attendee(s). For example, one may need to access a corporate directory or social networking system to obtain detailed information about the call attendee(s) and recent interactions or relevant associations, e.g., to see what has been posted, recent activities, profile pages, calendars, call logs, messages, group lists, etc. Moreover, it may be unclear which if any of these directories or systems will provide useful information concerning the call attendee(s). By providing additional information in, for example, a dossier view on a paired device, the recipient would have relevant information about the call attendee(s) available without having to search for such relevant information. Navigation between item UIs, application UIs, and dossier views can also be facilitated during a call.

It has also been found that although both temporary and longer term groups may form dynamically in a real-world setting, often creating corresponding electronic groups can be time consuming or may not occur at all, particularly temporary groups. Additionally, when the need for a group ends, the group typically needs to be manually deleted and thus may persist longer than the group is needed. To facilitate group communications, automatic group creation, automatic modification (e.g., removal of a member), and automatic deletion of electronic groups can be implemented by detecting events that correspond to creation, modification, and deletion events. In addition to facilitating group communications on personal mobile devices, by creating and making the group available in a cloud computing environment, users may seamlessly transition to other devices and access the same group data in order to continue participating in the electronic group in different scenarios and environments. For example, a user may wish to update group data from a desktop computer instead of a mobile device and access to the cloud computing environment facilitates such an update.

An example of an update to the group data includes the creation of a task which can be assigned to other members of the group or the entire group itself. Newly created tasks, and the associated information for that task may then be available to other members of the group, including access through the cloud computing environment.

The creation, modification, and deletion of groups, as well as the creation of tasks for a group can be incorporated into group dossier UIs to enhance the navigation flows herein described.

Turning now to FIG. 1, various example UI navigation flows are shown to illustrate navigation into and out of UIs through links or other identifiers included in the UIs and the amalgamation of a plurality of data items associated with an individual or group of individuals in a single UI. Hereinafter UIs comprising multiple data items that are associated with the same individual or group of individuals may be commonly referred to as a "dossier" UI for the sake of clarity. Similarly a navigation into one UI and back to the previous UI may be commonly referred to as "pivot" for the sake of clarity. Groups as hereinafter described may refer to any association of more than one individual and may be used to commonly refer to both short term or event related groups (e.g., a meeting, appointment or occasion) and groupings based on associations between individuals, which may be persistent or otherwise longer term than something tied to a temporally affected event.

An application UI 10 is shown in FIG. 1 which illustrates a traditional UI that has been developed to perform one or more particular functions and may utilize and/or provide one or more items 12. For example, the application UI 10 may display items 12 representing messages, status updates, calendar invites and responses, etc. FIG. 1 also illustrates an item UI 14 which represents a displayed element that, in this example, may be launched, opened, or otherwise displayed after detecting an input associated with the item 12 provided in the application UI 10. By storing or obtaining data associated with the items 12 individually, the corresponding item UIs 14 may be accessed and displayed via other UIs as described below. In this way, a user can pivot between item UIs 14 and dossier views to more conveniently navigate between items 12 that share context with each other, an individual, a group of individuals or are otherwise related or associated with each other. An individual dossier UI 16 and a group dossier UI 17 are also shown in FIG. 1. The dossier UIs 16, 17 amalgamate a plurality of links or identifiers (hereinafter commonly referred to as "links" for the sake of clarity) associated with a plurality of items 12, from at least one data source 40 (see also FIG. 2 described below), which when selected, navigate the user to the associated item UI 14. Various links are shown in FIG. 1, and it may be appreciated that those shown are for illustrative purposes only.

Various navigation flows and/or flow segments are shown in FIG. 1, which are given labels or reference numerals 1 through 9. Flow 1 illustrates a traditional UI flow wherein after detecting selection of an item 12 in an application UI 10, an associated first item UI 14 is displayed. In such a traditional UI flow, the user may navigate back to the application UI 10, e.g., by closing the first item UI 14. As discussed above, traditional UI flows typically require that the user navigate out of or away from one application UI 10 and to another application UI 10 in order to access and/or display a second item UI 14'. To provide a more convenient navigation flow, a dossier view may be provided, which incorporates multiple links to item UIs 14, application UIs 10, and other dossier views to enable pivoting between related UIs and navigation through and around a connected social or business network without having to individually access each application UI 10 and search or otherwise locate the desired item UIs 14, application UIs 10, or other dossier views.

Flow 2 illustrates an example navigation flow between an application UI 10 and an individual dossier UI 16 which amalgamates links to items 12 and/or item UIs 14 associated with each other according to at least one predetermined criterion. In the example shown, selection of Item 1 (or a portion thereof) pivots the display to the individual dossier UI 16. For example, by tapping or selecting a name associated with a message may open an individual dossier UI 16 corresponding to a contact in a contact list or address book corresponding to the name selected. As discussed below, pivoting back to the previous view, in Flow 2, the application UI 10, may be performed in various ways. For example, the user may navigate back to the previous view by selecting a cancel or "back" button, convenience key, soft key or other link. The individual dossier UI 16 may also include an application identifier 18 (App), which when selected, navigates back to the application UI 10. It can be appreciated that the application identifier 18 can be used both to pivot back to the application UI 10 (e.g., in scenarios wherein the previous view provided the application UI 10), and to continue a navigation flow into the application UI 10 (e.g., in scenarios wherein the previous view was not the application UI 10). Flow 3 in FIG. 1 illustrates a navigation from the individual dossier UI 16 to the application UI 10.

Flow 4 illustrates an example wherein an item link 20 provided in the individual dossier UI 16 may be selectable to enable navigation directly to the first item UI 14. Flow 5 illustrates an example wherein a dossier link 24 (Doss) is provided in the first item UI 14 to enable a pivot back to the individual dossier UI 16 or a further navigation flow segment towards the individual dossier UI 16. As discussed above, it can be appreciated that a pivot from the first item UI 14 back into the individual dossier UI 16 may be performed in various ways. It can also be appreciated that predetermined inputs may also be used to automatically navigate from an item UI 14 back into its associated application UI 10. For example, by closing the first item UI 14 in a manner similar to a traditional navigation may direct the user back to the application UI 10.

Flow 6 illustrates an example wherein a group link 24 provided in the first item UI 14 may be selectable to enable navigation from the first item 14 UI into the group dossier UI 17. Similarly, Flow 7 illustrates an example wherein another item link 20' provided in the group dossier UI 17 may be selectable to enable navigation from the group dossier UI 17 into the first item UI 14. Flows 6 and 7 therefore illustrate that the first item UI 14 may be accessed from various UIs by associating item links 20, 20' with, for example, dossier UIs 16, 17. Flow 8 illustrates that the dossier UIs 16, 17 may also include links to other dossier UIs. In the example shown in FIG. 1, another group link 24' to the group dossier UI 17 is provided in the individual dossier UI 16 to enable a pivot between, or a navigation segment from, the individual dossier UI 16 into the group dossier UI 17. Flow 9 illustrates that yet another item link 26 may be provided in an item UI 14 to enable a user to navigate directly between the first item UI 14 and the second item UI 14'. For example, reference to the second item or the second item UI 14' may be detected and the second item link 26 inserted accordingly to enable selection thereof to navigate directly from the first item UI 14 to the second item UI 14'.

It can be appreciated that the UI navigation flows and segments illustrated in FIG. 1 may be applicable to UIs displayed by any electronic computing device, including mobile electronic devices. Examples of applicable mobile electronic devices may include, without limitation, cellular phones, smart-phones, tablet computers, wireless organizers, personal digital assistants, laptops, handheld wireless communication devices, wirelessly enabled notebook computers, portable gaming devices, and the like. Such devices will hereinafter be commonly referred to as "mobile devices" 32 for the sake of clarity. It will however be appreciated that the principles described herein are also suitable to other electronic computing devices, e.g. "non-mobile" devices. Such other devices will hereinafter be commonly referred to as "computing devices" 33 for the sake of clarity. For example, the principles herein are equally applicable to personal computers (PCs), tabletop computing devices, wall-mounted screens such as kiosks, or any other computing device 35.

Figure 2:
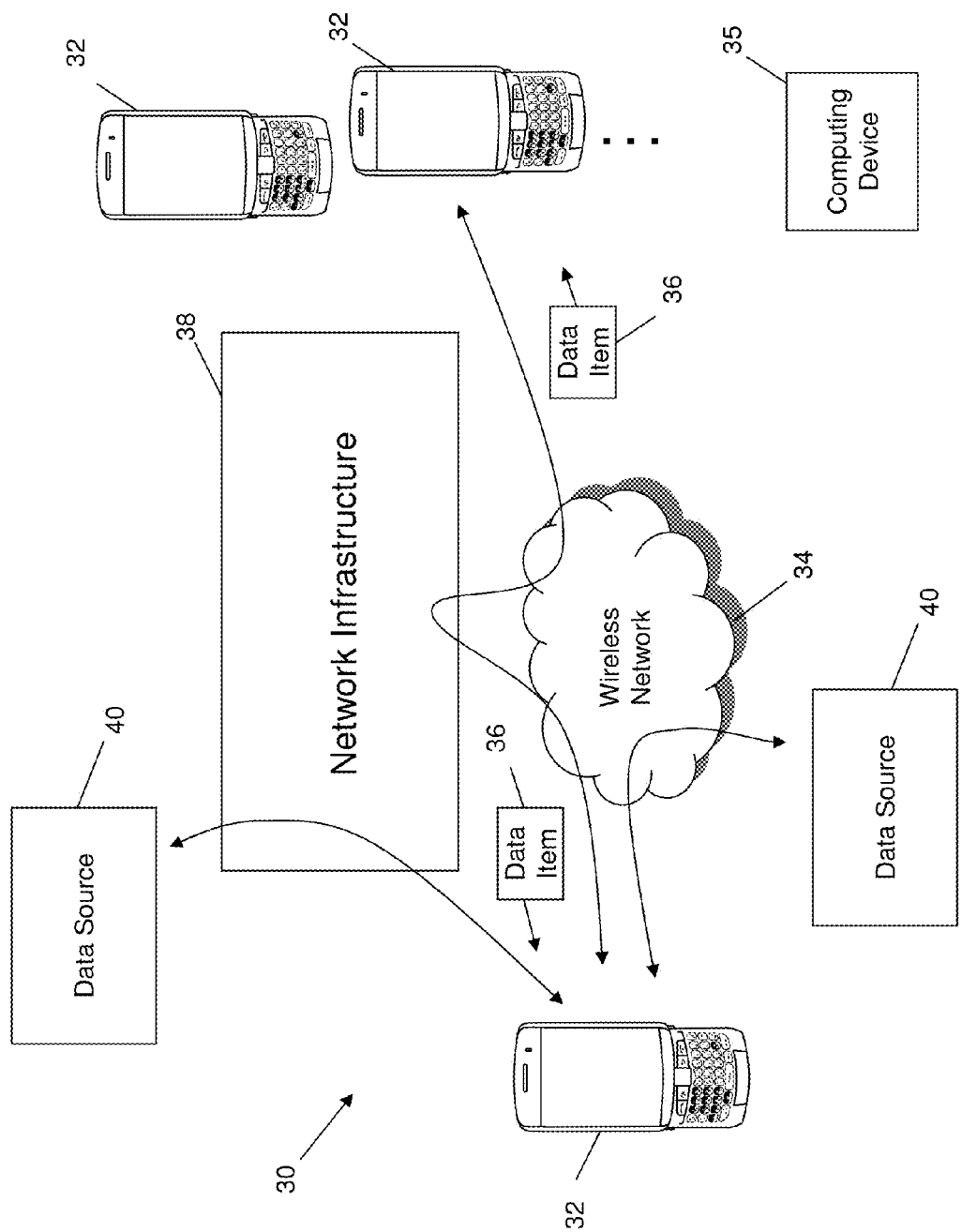
FIG. 2 is a block diagram of an example of a communication system.

Referring to FIG. 2, an example of a communication system 30 is shown. The communication system 30, in this example, enables, at least in part, mobile devices 32 to communicate with other mobile devices 32 and other computing devices 33, via a wireless network 34. For example, as shown, data items 36 may be exchanged between various mobile devices 32 and computing devices 33. Data items 36 that are sent from one mobile device 32 to another mobile device 32 may be transmitted according to a particular messaging or communication medium, protocol, or other mechanism. For example, as shown in FIG. 2, data items 36 may be sent over the wireless network 34 via a component of a network infrastructure 38. The network infrastructure 38 can include various systems that may be used by the mobile devices 32 to exchange data items 36. For example, a peer-to-peer (P2P) system, a short message service centre (SMSC), an email system (e.g. web-based, enterprise based, or otherwise), a web system (e.g. hosting a website or web service), a host system (e.g. enterprise server), social networking system, etc., may be provided by or within or be otherwise supported or facilitated by the network infrastructure 38. The mobile devices 32 and other computing devices 33 may therefore send data items 36 to, or receive data items 36 from, other mobile devices 32 or computing devices 33, via one or more particular systems with which the mobile devices 32 and computing devices 33 are communicable via the wireless network 34 (or other network—not shown), and network infrastructure 38. It can be appreciated that computing devices 33 may also communicate with each other over other networks (also not shown).

FIG. 2 also illustrates that data items 36 may be provided by or stored by one or more data sources 40 being external to the mobile device 32. As discussed below, data items 36 may also be stored and provided to the mobile device 32 from an online service, e.g., on a server or data centre, including data items 36 that originate or originally reside on the mobile device 32, e.g., call logs.

Figure 3:
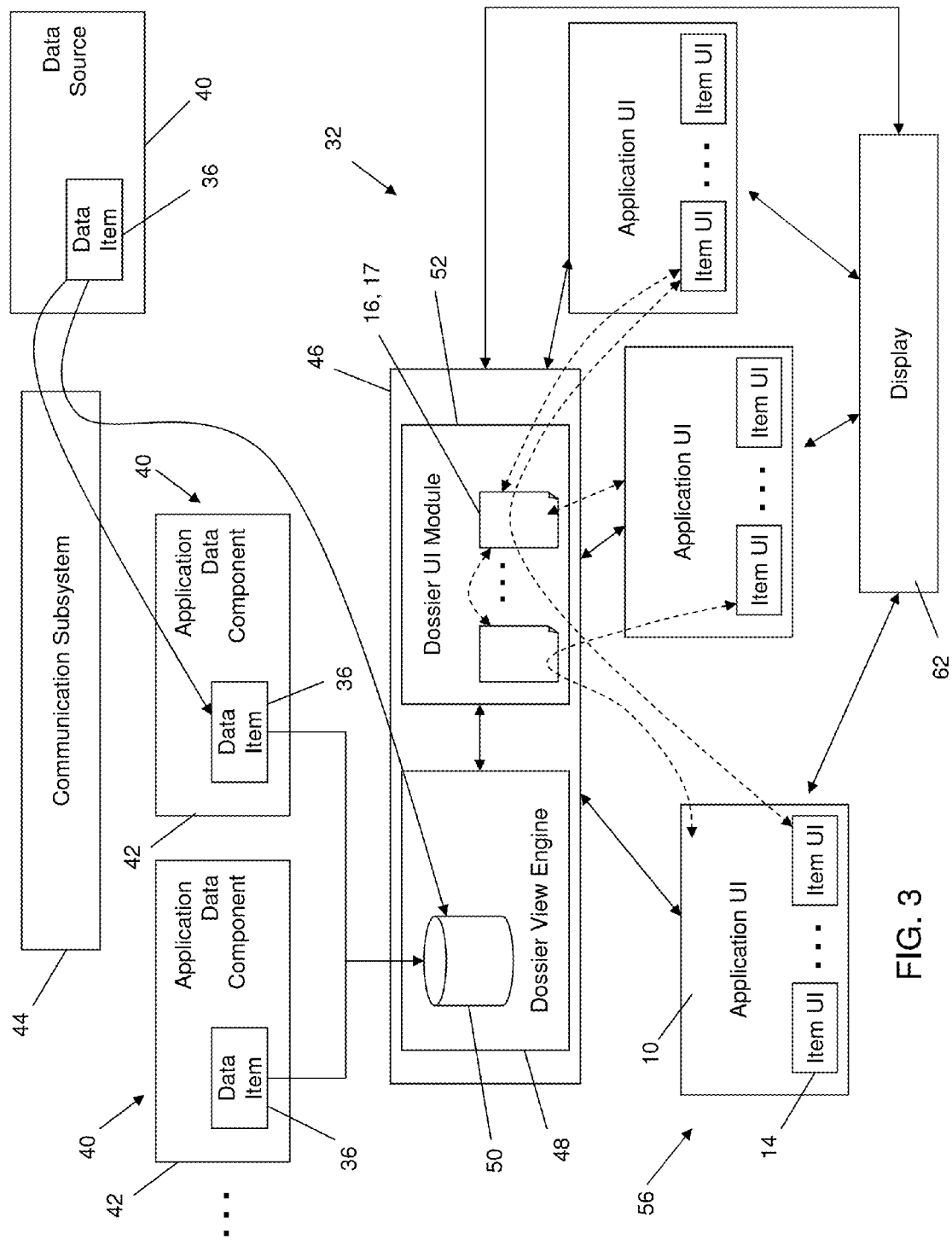
FIG. 3 is a block diagram of an example of a configuration for a mobile device operable to provide dossier UIs.

FIG. 3 illustrates an example of a configuration for a mobile device 32 operable to provide navigate flow capabilities between application UIs 10, item UIs 14, and dossier UIs 16, 17, e.g., as demonstrated in FIG. 1. The mobile device 32 comprises a dossier view module 46 which includes, for illustrative purposes, a dossier view engine 48 that includes or otherwise has access to a memory 50 for storing data items 36 associated with items 12 and item UIs 14 displayed by the mobile device 32 in one or more UIs. The dossier view engine 48 includes or has access to (as shown) a dossier UI module 52 which may be used to generate dossier UIs 16, 17 using the data items 36 obtained and, if necessary processed, by the dossier view engine 48. The dossier view engine 48 may obtain the data items 36 from data sources 40 residing on the mobile device 32, such as application data components 42, or any other data source 40 on the mobile device 32 or external thereto. For example, the dossier view engine 48 may be operable to access social networking systems external to the mobile device 32 to determine mutual contacts, relevant status updates or other information. It can be appreciated that the dossier view engine 48 may also download, pull or otherwise obtain data items 36 from data sources 40 in real-time or near-real-time and thus may not need to store at least some of the data items 36 used in generating the dossier UIs 16, 17. It can also be appreciated that the dossier view engine 48 may instead reside online, e.g., on a server, data centre, or other component of the network infrastructure 38, wherein the mobile device 32 is operable to access the data items 36 via one or more application programming interfaces (APIs).

As shown in FIG. 3, the mobile device 32 may include at least one communication subsystem 44 for accessing external data sources 40 and/or to obtain data items 36 for application data components 42. It can be appreciated that the application data components 42 may represent any memory element used for storing data items 36 for an application. For example, data items 36 may be stored by a person information management (PIM) function or tool.

A number of applications 56 are shown in FIG. 3, which include an application UI 10 and a number of individual item UIs 14 (e.g., an inbox UI and message UIs). The applications 56 are communicable with a display components 62 for rendering UI elements on a display 62 of the mobile device 32 (see also FIG. 21 described below). It can be appreciated from the dashed lines shown by way of example in FIG. 3 that the dossier UIs 16, 17 generated by the dossier UI module 52 enable navigation between item UIs 14 and application UIs 10 displayed by the mobile device 32 in a more direct and convenient manner. In this way, navigation flows such as those shown in FIG. 1 may be enabled on the mobile device 32.

Figure 4:
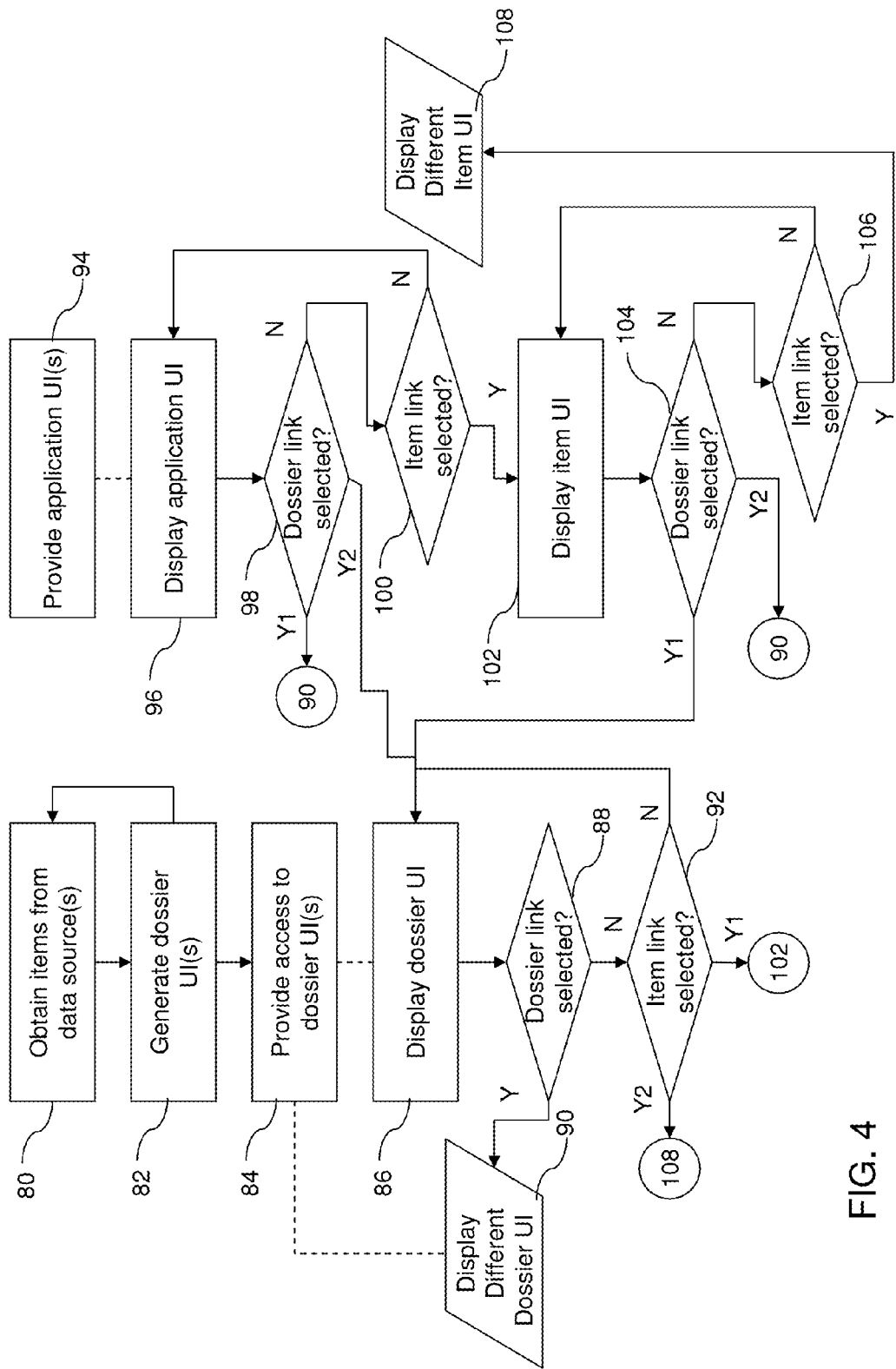
FIG. 4 is a flow chart illustrating example computer executable operations that may be performed in enabling a UI navigation flow between dossier UIs, application UIs and data item UIs.

FIG. 4 illustrates an example set of computer executable operations that may be performed in enabling navigation flows between dossier UIs 16, 17, item UIs 14, and application UIs 10 as described above. At 80 the dossier view engine 48 obtains data items 36 from at least one data source 40 and generates at least one dossier UI 16, 17 at 82. It can be appreciated that the same data item 36 may be used in generating multiple dossier UIs 16, 17. For example recent activities associated with a particular contact may be utilized in both an individual dossier UI 16 for that contact and a group dossier UI 17 associated with a group including that contact. The dossier UIs 16, 17 may be stored by the dossier UI module 52 and access thereto provided at 84. This access enables an input or event to trigger display of a dossier UI 16, 17 at 86. As discussed above, a dossier UI 16, 17 may include not only item links but also links to other dossier UIs 16, 17. The dossier view module 46 may be operable to determine at 88 whether or not a link to another dossier UI 16, 17 has been selected. If so, a different dossier UI 16, 17 is displayed at 90. If a link to another dossier UI 16, 17 has not be selected, the dossier view module 46 may be operable to determine whether or not an item link has been selected at 92. If so, the associated item UI 14 may be displayed. In FIG. 4 Y1 and Y2 branches are shown to illustrate that navigation may proceed to the item UI 14 displayed at 102 (discussed below) or to another item UI 14 displayed at 108 (also discussed below). If no dossier or item links are selected, the dossier view module 46 may continue to display the current dossier UI 16, 17 at 86.

The mobile device 32 in the example shown in FIG. 4 is also operable to provide at least one application UI 10 at 94 and to display any such application UI at 96, e.g., by detecting selection of an icon or a navigation segment as illustrated in FIG. 1. Also, as discussed above, an application UI 10 may include not only item links but also links to dossier UIs 16, 17. When an application UI 10 is being displayed, the dossier view module 46 may be operable to determine at 98 whether or not a link to a dossier UI 16, 17 has been selected. If so, the dossier view module 46 navigates to the dossier UI 16, 17 displayed at 86 or 90. If a link to a dossier UI 16, 17 has not be selected, the dossier view module 46 may be operable to determine whether or not an item link has been selected at 100. If so, the associated item UI 14 may be displayed at 102. As discussed above, an item UI 14 may include not only links to dossier UIs 16, 17, but also item links. The dossier view module 46 may be operable to determine at 104 whether or not a dossier link has been selected. If so, navigation may proceed to the dossier UI 16, 17 displayed at 86 or 90. If a dossier link has not been selected, the dossier view module 46 may be operable to determine at 106 whether or not an item link has been selected. If not, the dossier view module 46 may be operable to continue to display the item UI 14 at 102. If an item link has been selected, the dossier view module 46 may navigate to a different item UI 14 at 108. It can be appreciated that although not shown in FIG. 4, an item UI 14 may also include links to application UIs 10 and the dossier view module 46 may be operable to determine whether or not such links have been selected. In this example, it is assumed that navigation from an item UI 14 to an application UI 10 occurs through closing or pivoting back from an item UI 14.

FIGS. 5 to 21 provide various example screen shots to illustrate navigation flows in the manner shown, for example, in FIG. 1.

FIG. 5 illustrates an example of a messages inbox UI 120 displaying a number of message items 122. It can be appreciated that the messages inbox UI 120 may correspond to a single application such as an email inbox, or provide a "unified" inbox for displaying message items 122 for a plurality of media, e.g., email, IMs, text messages, calendar messages, etc. and illustrates an example application UI 10. In the example shown in FIG. 5, each message item 122 displayed in the messages inbox UI 120 includes an identifier 124 and a message details portion 126. It can be appreciated that, as shown in FIG. 5, the message details portion may include various data, such as a name associated with a sender of the message item 122, a message preview, etc. It can also be appreciated that the identifier 124 may include various items such as an avatar, a medium-specific icon (e.g., IM icon for IMs, envelope for emails, calendar for calendar items, etc.). Moreover, as illustrated in FIG. 5, the identifier 124 may include multiple elements, in this example, a first identifier 124a and a second identifier 124b. For example, the first identifier 124a may include a medium-specific icon and the second identifier 124b may include an icon related to a specific group or event from which the message item 122 was generated. Each message item 122 may therefore have a number of associated attributes that can be linked to other UI elements. For example, by selecting the name indicated in the message details portion 126 of a particular message item 122 may initiate the display of an individual dossier UI 16 associated with the contact corresponding to the selected name, as shown in FIG. 6.

The individual dossier UI 16 shown in FIG. 6 includes an individual's details portion 132, a contact individual portion 134 with a number of contact buttons 136 representing corresponding media by which the individual may be contacted, a real-time activity portion 138 including a number of the most recent interactions 140 associated with the individual, a recent activity portion 142 including less recent interactions 144 associated with the individual, a relationship portion 146 identifying the individual's relationship (if any) to the user of the mobile device 32, a mutual contacts portion 148, a location identifier 150 for the individual, and a mutual events portion 152. Each element shown in FIG. 6 may be utilized as a link to an item UI 14, application UI 10, or different dossier UI 16, 17. It can be appreciated that the elements shown in FIG. 6 are for illustrative purposes only. By way of example, the contact buttons 136 may correspond to voice (phone), IM, email, calendar invites, text messaging, etc. The most recent interactions 140 and less recent interactions 144 may include, without limitation, social networking updates (e.g., posts, comments, messages), voicemails, meetings or appointments, social networking feeds, IMs, emails, text messages, location updates, etc. The relationship portion 146 may include past or current associations between the user of the mobile device 32 and the individual, and the individual's details portion 132 may include contact details pulled from a contact list or address book. As discussed above, the item links displayed in the individual dossier UI 16 may correspond to data items 36 available on the mobile device 32 as well as from any available data source 40 such as a social network infrastructure.

The individual dossier UI 16 may also provide a pivot button 154 for convenient "pivoting" back to the previous UI. In the example shown in FIGS. 5 and 6, selection of the pivot button 154 would navigate the user back to the messages inbox UI 120. The pivot button 154 is an optional feature and the user may instead or additionally navigate back to the messages inbox UI 120 by selecting an application UI link, e.g., an icon included in a most recent interaction 140 associated with the message item 122 selected from the messages inbox UI 120 in FIG. 5. Other user experience elements such as gestures may also be used to initiate a navigation or pivot from one UI to another. For example, as shown in FIG. 6, a backwardly directed "swipe" gesture 155 may be operable to pivot back to the messages inbox UI 120. By selecting the application UI link, the pivot button 154, or performing a swipe gesture 155 as shown in FIG. 6, dossier view module 46 pivots back to the messages inbox UI 120 as shown in FIG. 7. In this way, the user is able to pivot to the individual dossier UI 16 for a sender of message item 122 to obtain further context or information associated with the message item 122. This allows the user to respond to the message item 122 with a better understanding of the context and background of the sender of the message item 122. In this example, by selecting the message preview portion of the message details 126, a message UI 160 may be displayed as shown in FIG. 8. The message UI 160 in this example includes a message header 162 and a message body 164. The message UI 160 may also include one or more identifiers 168 that correspond to the identifiers 124 listed with the message item 122 in the messages inbox UI 120. It can be appreciated that the message UI 160 illustrates an example item UI 14. The user may then select a reply button 166 in the message header 162 to reply to the message item 122.

An other example navigation flow is illustrated in FIGS. 9-14. FIG. 9 illustrates a meeting dossier UI 17a, which provides an example of a group dossier UI 17, particularly a dossier UI related to an event or occasion. As discussed above, it can be appreciated that the group dossier UIs 17 may be used to provide a plurality of data items associated with an event associated with a group of individuals, an organized or implicit group of individuals (e.g., family, friends, etc.), or any other grouping that may, in some form, be associated with more than one contact or individual. The meeting dossier UI 17a in this example includes a meeting details portion 172, a contact group portion 174 with a number of contact buttons 176 representing corresponding media by which the meeting invitees/attendees may be contacted, a meeting invitees portion 178 providing invitee identifiers 180 for the meeting invitees and a new invitation button 182 for inviting new invitees, a group discussion portion 184, and an other data items portion 186. It can be appreciated that the elements shown in FIG. 9 are for illustrative purposes only. For example, the meeting details portion 172 may include meeting details obtained from a calendar appointment associated with the meeting dossier UI 17a. As in FIG. 6, the contact buttons 176 may correspond to voice (phone or conference), IM, email, calendar invites, text messaging, etc. The group discussion portion 184 may include an ongoing IM conversation, other embedded chat feature, or a unified view of recent messages across several media. The group discussion portion 184 or other data items portion 186 may also include, without limitation, social networking updates (e.g., posts, comments, messages), voicemails, social networking feeds, IMs, emails, text messages, location updates, posted meeting materials, etc. In an example, the user may begin typing in an open text box (not shown) in the group discussion portion 184 and attach a file such as a presentation or other item that the user wishes to share with other meeting attendees. When the user submits a comment and attachment, the group discussion portion 184 may be updated for the meeting dossier UI 17a for each meeting invitee/attendee and the attached file may be provided or otherwise accessible through the other data items portion 186. The other data items portion 186 may include various shared files, e.g., photos, presentations, spreadsheets, documents, etc., that an individual in the group has shared with other members of the group.

Figures 13, 14:
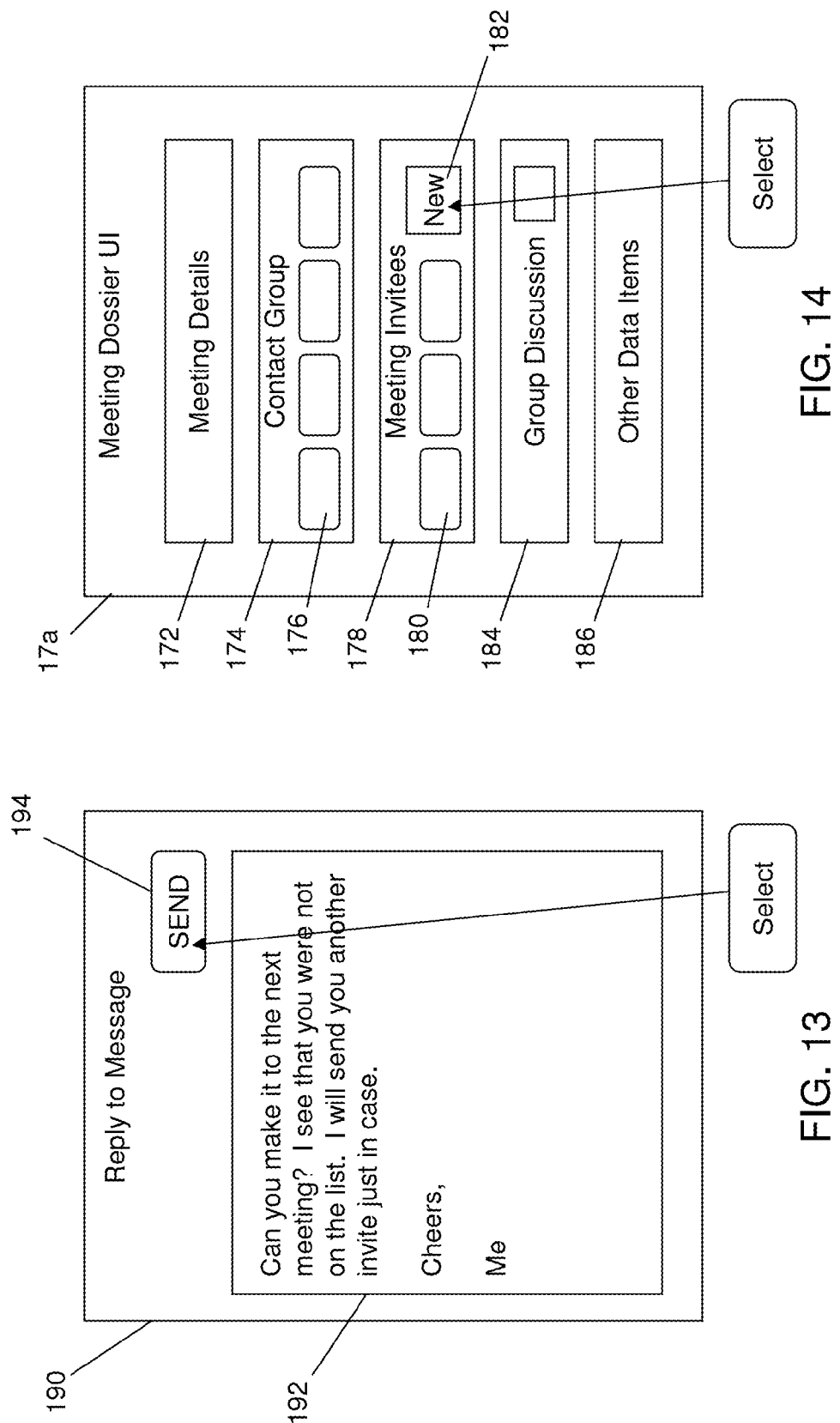
FIG. 13 is a screen shot of an example message reply UI.
FIG. 14 is a screen shot of an example meeting dossier UI.

After detecting selection of a particular meeting invitee identifier 180 as shown in FIG. 9, the dossier view module 46 may navigate or pivot to the individual dossier UI 16 for that individual as shown in FIG. 10. For example, the user may see that a certain individual is attending a meeting and wish to learn more about that individual. By pivoting between the meeting dossier UI 17a and the individual dossier UI 16 as shown in FIGS. 9 and 10, the user may quickly determine comprehensive information regarding interactions had with that individual. By selecting the mutual event (corresponding to the meeting details 172) from the mutual events portion 152 in the individual dossier UI 16 or by selecting the pivot button 154 or performing the swipe gesture 155 (if available) as shown in FIG. 10, the dossier view module 46 can pivot back to the meeting dossier UI 17a as shown in FIG. 11. In this example, it may be assumed that the user realized when viewing the individual dossier view 16 in FIG. 10 that another individual should be invited to the meeting. By locating and selecting a discussion item 188 in the group discussion portion 184 in the meeting dossier UI 17a as shown in FIG. 11, the dossier view module 46 can navigate directly to a message UI 160 for that discussion item 188, as shown in FIG. 12. In this way, the user can quickly jump to the relevant message or item related to the uninvited individual and by selecting the reply button 166 can generate a new message as shown in FIG. 13, notifying the uninvited individual of the meeting before sending a new invite. Turning now to FIG. 13, a message reply UI 190 is shown which includes a message body 192 composed by the user to notify the corresponding individual of the meeting and to provide notice that they will send another invite "just in case". After detecting selection of a send button 194, the dossier view module 46 can pivot back to the meeting dossier UI 17a as shown in FIG. 14 to enable the new invitation button 182 to be selected. By enabling navigation between item UIs 14 such as the message UI 160 and message reply UI 190 and dossier UIs 16, 17, the user can conveniently determine meeting invitees, obtain further details regarding specific invitees, perform a first action to notify an uninvited individual, and perform a second action to invite or re-invite that individual, without having to necessarily navigate into and out of a number of application UIs 10.

Figure 16:
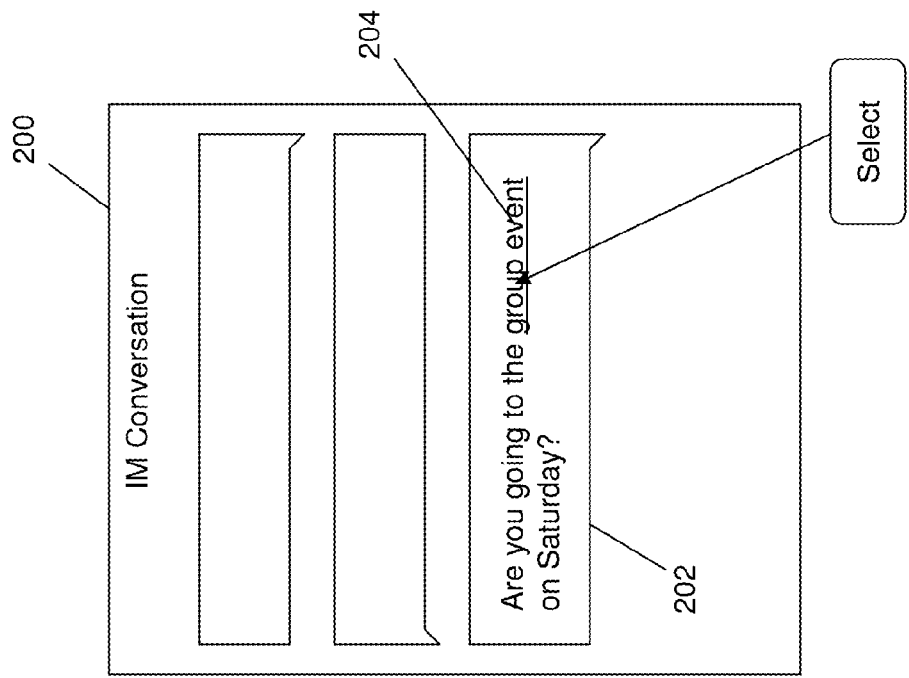
FIG. 16 is a screen shot of an example IM conversation UI.
Figure 15:
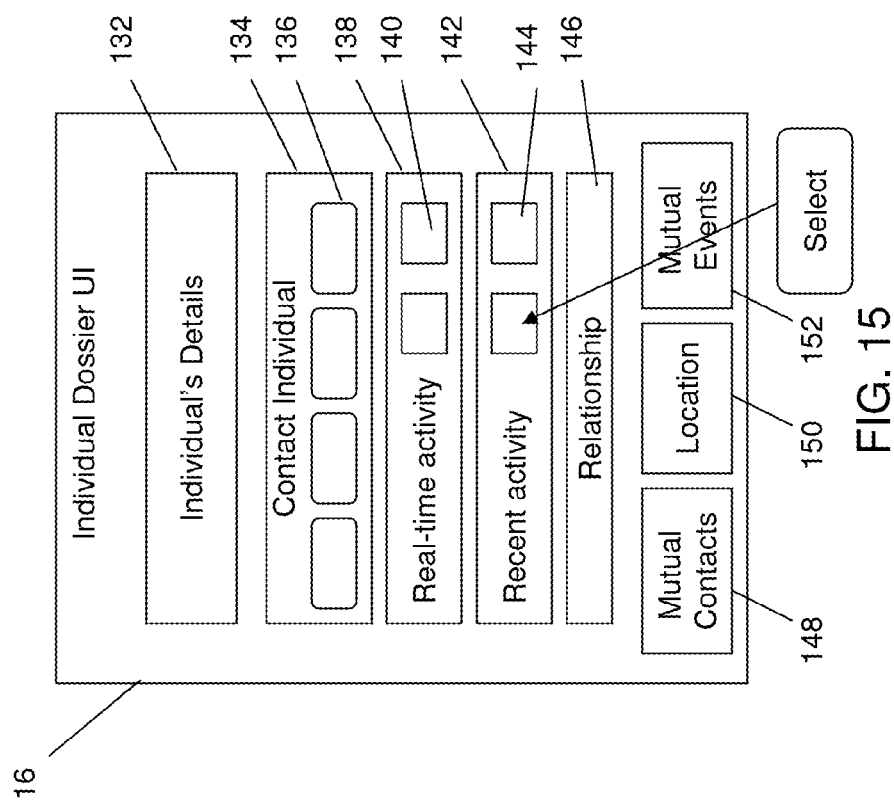
FIG. 15 is a screen shot of an example individual dossier UI.

An other example navigation flow is illustrated in FIGS. 15-20. FIG. 15 illustrates an individual dossier UI 16 and selection of a less recent interaction 144 from the recent activity portion 142. In this example, after detecting selection of the less recent interaction 144, an IM conversation UI 200 is displayed by the dossier view module 46 as shown in FIG. 16. The IM conversation UI 200 is another example of an application UI 10. The IM conversation UI 200 includes an incoming message 202, which is another example of an item 12 displayed in an application UI 10. The incoming message 202 shown in FIG. 16 includes message text comprising a group event link 204. It can be appreciated that the group event link 204 may be generated by the dossier view engine 48 upon detecting an association between a portion of the incoming message 202 and a group dossier UI 17. For example, a keyword search of the incoming message 202 identifies that the "group event" mentioned corresponds to an established group dossier UI 17 for that group event. After detecting selection of the group event link 204, a group event dossier UI 17b is displayed as shown in FIG. 17. It can be appreciated that item links, application links, and dossier links can be embedded in any UI element to enable navigation through or pivoting into and out of various UIs.

The group event dossier UI 17b includes a group event details portion 212 listing the event details (e.g., charity event, time of event, date of event, talent hired for event, etc.), a contact group portion 214 with a number of contact buttons 216 representing corresponding media by which the group members may be contacted, a group members portion 218 providing identifiers 220 for the group members and a new invitation button 222 for inviting new members to the group, a group discussion portion 224, and an other data items portion 228. It can be appreciated that the elements shown in FIG. 17 are for illustrative purposes only. As in FIGS. 6 and 9, the contact buttons 216 may correspond to voice (phone or conference), IM, email, calendar invites, text messaging, etc. The group discussion portion 224 may include various discussion items 226, e.g., from an ongoing IM conversation, other embedded chat feature, or a unified view of recent messages across several media. The group discussion portion 224 and/or other data items portion 228 may also include, without limitation, social networking updates (e.g., posts, comments, messages), voicemails, social networking feeds, IMs, emails, text messages, location updates, posted meeting materials, etc.

In this example, it may be assumed that the group event associated with the group event dossier UI 17b is a charity event. The charity comprises a website and the website is linked or otherwise mentioned in the group discussion item 226. After detecting selection of the group discussion item 226, the dossier view module 46 may initiate a browser UI 230 as shown in FIG. 18 to display the charity's website. In this example, the charity's website displayed by the browser 230 includes a board members portion 232 indicating board members 234 for the charity, and an event details portion 236 related to the group event. By navigating into the browser UI 230 in this way, the user may notice that one of the board members 234 shown on the website is the contact associated with the IM conversation UI 200 shown in FIG. 16. By selecting the board member 234 as shown in FIG. 18, the dossier view module 46 may then navigate into an individual dossier UI 16 for that contact as shown in FIG. 19. In this example, it can be assumed that although the user's contact is a board member of the charity, they are not included in the group associated with the group event dossier UI 17b shown in FIG. 17. After detecting a further selection of the less recent interaction 144 as shown in FIG. 19, the dossier view module 46 may initiate the display of the IM conversation UI 200 as shown in FIG. 20.

By enabling the user to navigate from the individual dossier UI 16 to the IM conversation UI 200, to the group event dossier UI 17b, to a web site for the charity using the browser UI 230, back to the individual dossier UI 16 and again back to the IM conversation UI 200, the user can gain insightful context regarding the relationship between the individual and the charity event associated with the group event.

As shown in FIG. 20, an outgoing message 206 sent to the individual can include a more meaningful reply by enabling the user to mention the board member linkage between the charity and the individual. It can be appreciated that in order to obtain the context provided in the navigation flow illustrated in FIGS. 15-20 using traditional UI flow, the user would be required to navigate between several application UIs 10 and search for relevant items 12 in order to obtain the same context about the charity event and the individual that is on the board of the charity. Such a time consuming and cumbersome navigation may not even be attempting being thus detrimental to the user experience. By providing dossier UIs 16, 17 and links to application UIs 10, item UIs 14, and other dossier UIs 16, 17, a convenient and intuitive experience is instead provided.

Figure 21:
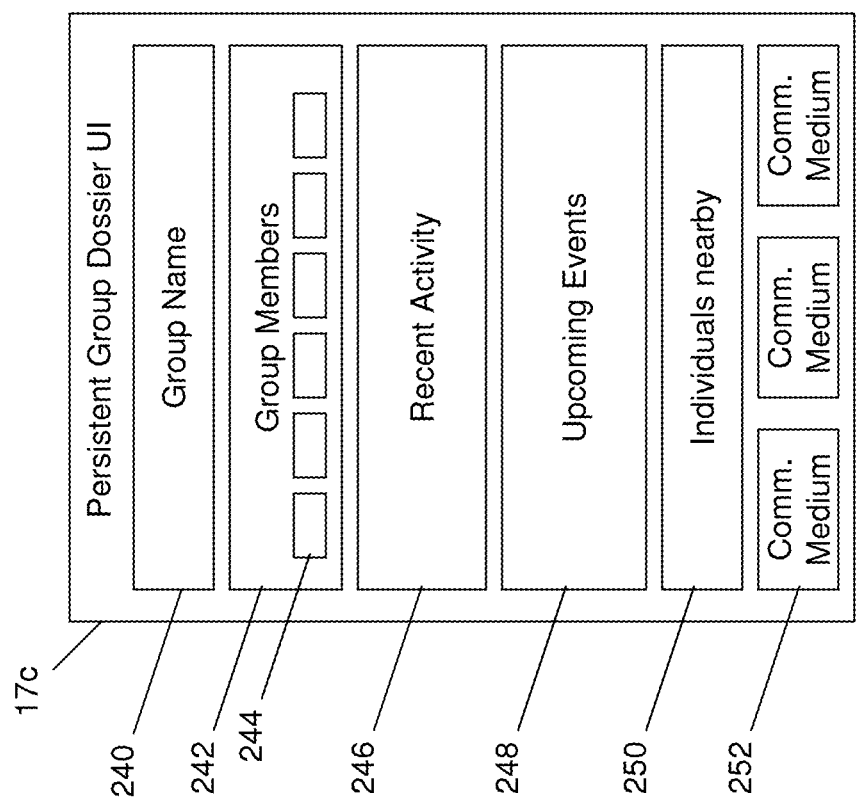
FIG. 21 is a screen shot of an example group dossier UI.

As discussed above, group dossier UIs 17 can also be generated for groups based on associations between the individuals rather than a single event or meeting. FIG. 21 illustrates an example of a persistent group dossier UI 17c, which may be generated for groups such as "friends from college", "family members", "sports team", etc. In this example, the persistent group dossier UI 17c includes a group name portion 240, which may include other details pertaining to the group; a group members portion 242, which may include identifiers 244 for each group member (e.g., a photo or avatar), a recent activity portion 246, an upcoming events portion 248, an individuals nearby portion 250, which may be used to identify members from the group that are geographically nearby; and various communication medium links 252, e.g., for accessing IM, email, calendar, voice, or other media that can be used to connect or communicate with the other members of the group.

As discussed above, the mobile devices 32 shown in FIG. 2 are for illustrative purposes only. Mobile devices 32 may also interact with other devices. For example, a smart phone mobile device 32 may be tethered or paired with another device. When devices are tethered or paired with each other, often the devices are capable of, for example, displaying an application UI on the device having a large screen size, while using wireless connectivity of one of the devices to communicate via the wireless network 34. It has also been recognized that the principles discussed herein may also be advantageously applied to tethered or paired devices in order to enable convenient navigation between application UIs 10, item UIs 14, and dossier UIs 16, 17. By having multiple devices and corresponding displays, multiple UIs can be displayed at the same time while enabling navigation or pivoting between the devices to quickly and conveniently explore interconnected applications 36, items 12, and dossier-type collections of items 12.

Figure 22:
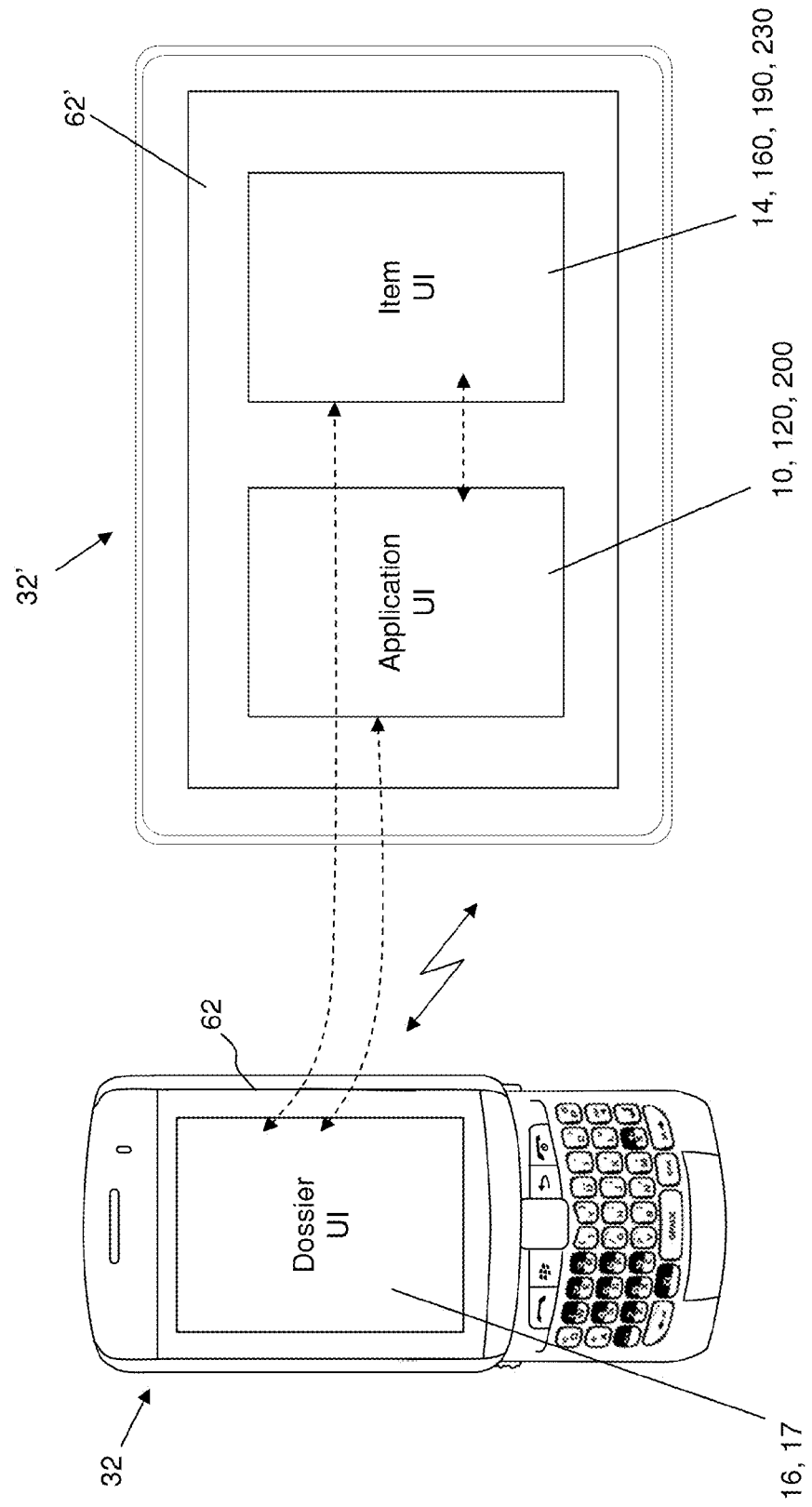
FIG. 22 is a pictorial view of two paired mobile devices.

FIG. 22 illustrates an example of a tethered configuration, wherein a smart phone 32 is wirelessly tethered to a portable tablet computer 32'. The smart phone 32 includes a first display 62 and the tablet computer 32' includes a second display 62'. As shown in FIG. 22, the principles discussed above can also be applied to utilize multiple displays 62, 62' such that, for example, a dossier UI 16, 17 can be displayed on the first display 62 while application UIs 10, 120, 200 and/or item UIs 14, 160, 190, 230 are displayed on the second display 62'. In this way, the user experience can be further enhanced by providing multiple views at the same time while navigating and pivoting between UIs to direct a focus for interacting with particular elements.

For example, referring again to the example scenario illustrated in FIGS. 15 to 20, the individual dossier UI 16 may be displayed on the first display 62 to provide a pivot point or "anchor" for the UI navigation experience. When the user selects the recent activity item 144 as shown in FIG. 15, the IM conversation UI 200 may be displayed on the second device 62' and persist until the user closes the UI. In this way, multiple branches from an anchor displayed on the first display 62 can be created. Similarly, selecting the link 204 as shown in FIG. 16 may cause the group event dossier UI 17b to also be displayed on the second display 62', or could move the individual dossier UI 16 to the second display 62' and display the group event dossier UI 17b on the first display. This enables a current anchor to be displayed in the same place while updating other display areas as the navigation continues. For example, the browser UI 230 shown in FIG. 18 could also be displayed on the second display 62' and the UIs rearranged when the user selects the individual dossier UI 16 again. For devices that utilize a touch screen and that enable multiple applications to be both running and displayed at the same time (as illustrated in FIG. 22), the user is able see a number of UIs at a glance and touch or "tap" through a navigation and pivot between UIs. By enabling, for example, dossier UIs 16, 17 to be anchored on one of the displays provided by multiple devices, the user can intuitively navigate between UIs and across displays.

It can be appreciated that the examples described above are illustrative only. For example, the principles discussed herein may be applied to other computing devices (individually or in tethered/coupled/paired arrangements) such as PCs, gaming terminals, kiosk displays, etc.

The principles discussed above regarding the amalgamation of UI elements concerning an individual or group (event based or persistent), can also be applied to enhancing other functions provided by a mobile device 32, such for displaying enhanced caller ID information.

Figure 23:
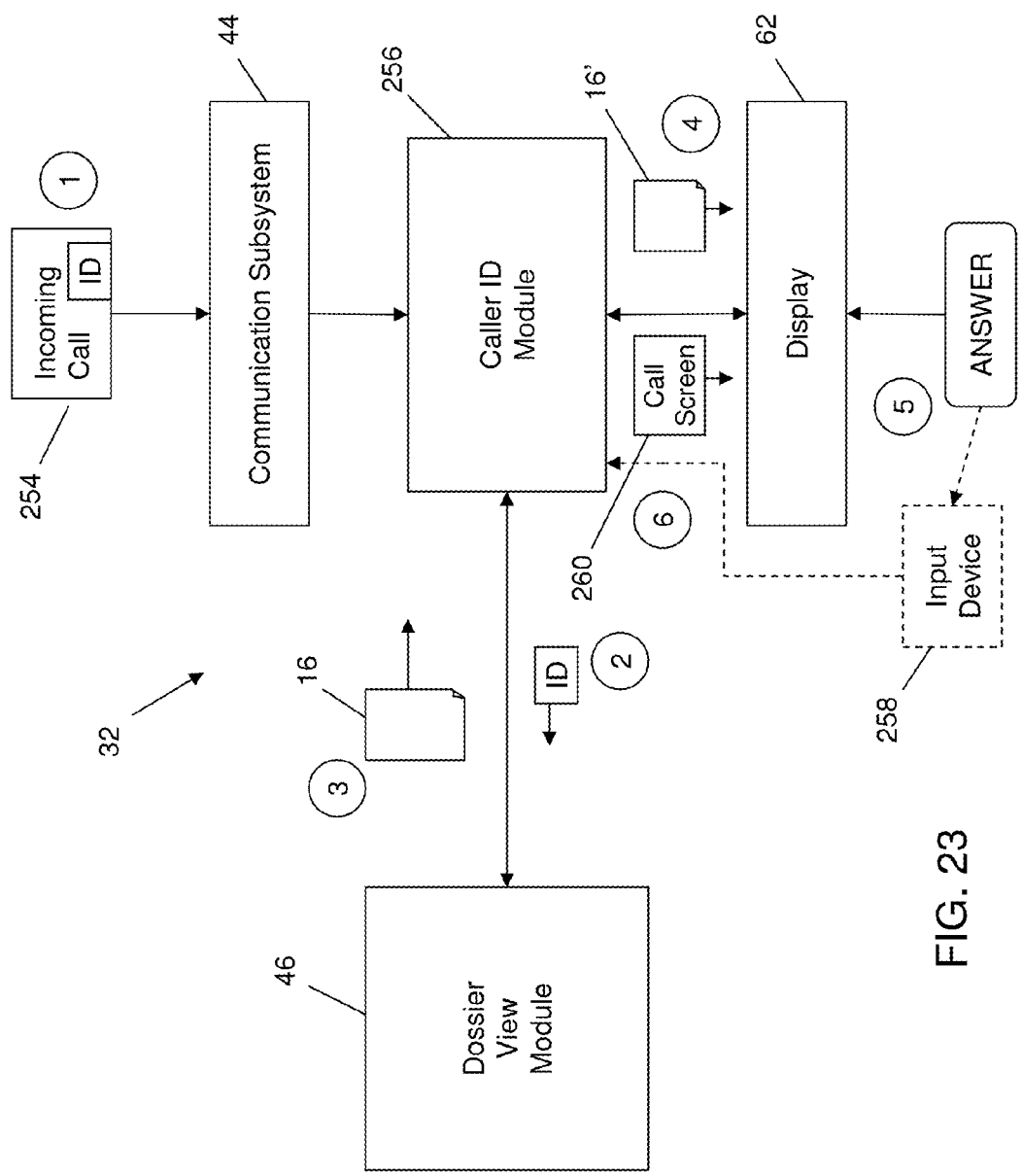
FIG. 23 is a block diagram of an example of a configuration for a mobile device operable to utilize dossier UIs for enhanced caller identification ID.

FIG. 23 illustrates an example configuration for a mobile device 32 that is operable to receive a phone call, hereinafter also referred to as a "called device". At stage 1, incoming call data 254 is received via the communication subsystem 44 and detected by a caller ID module 256. In the example shown in FIG. 23, the incoming call data 254 includes at least some information or data identifying the caller or that can be used to identify the caller (hereinafter referred to as an identifier (ID) for clarity). The caller ID module 256 may use the ID to provide an indication of the caller to the dossier view module 46 in stage 2. By providing such an indication, the dossier view module 46 can determine if an individual dossier UI 16 or a group dossier UI 17 exists or can be created that is relevant to or associated with the caller. For example, if the caller corresponds to a stored contact, an individual dossier UI 16 for that contact may be fetched or generated. It can be appreciated that if the caller is part of a group having an associated group dossier UI 17, and/or the incoming call relates to a conference call (discussed further below), the dossier view module 46 may also (or instead) provide such a group dossier UI 17. It can also be appreciated that an existing dossier UI 16, 17 may also be modified or otherwise tailored for use in providing enhanced caller ID. Similarly, customized dossier UIs may also be generated for enhanced caller ID, e.g., to provide fewer elements than a dossier UI 16, 17 displayed when not on a call. In this way, a few relatively easy to read elements can be displayed to enable a quick review of the elements to make a decision while deciding whether or not to accept the incoming call while providing more detailed information at other times. Moreover, the elements of the dossier UI being used may be modified depending on a categorization of the caller, e.g., business contact versus personal contact. In the example shown in FIG. 23, it is assumed that an individual dossier UI 16 for the caller is located or generated by the dossier view module 46 and provided to the caller ID module 256 at stage 3.

By obtaining the individual dossier UI 16 at stage 3, the caller ID module 256 can provide enhanced caller ID information at stage 4 by displaying an enhanced caller ID UI 16' that includes or incorporates at least some of the elements provided in the individual dossier UI 16, along with at least one option for connecting the call as described below. In the example shown in FIG. 23 it is assumed that the user answers the incoming call at stage 5 by providing an input using the display 62 (e.g., by selecting a touch-sensitive display screen) or another input device 258 such as a voice recognition module (not shown), track pad other key or button, etc. After the call has been answered by the recipient, and the call is connected, the caller ID module 256 may be operable to replace the enhanced caller ID UI 16' with a call screen 260 in order to provide various call details and call options as described further below. It can be appreciated that the call screen 260 may also be a modification of the enhanced caller ID UI 16', wherein any incoming call data or options (e.g., "answer" or "ignore" buttons) are replaced with such call details and options while retaining the portions of the individual dossier UI 16 provided with the enhanced caller ID UI 16'.

Gathering information concerning the caller, such as by accessing a dossier UI 16, 17, or having a dossier UI 16, 17 generated as described herein, enables the caller ID module 256 to provide additional context regarding the caller along with various other available data associated with the caller. In this way, the user may have immediate access to relevant details and information to increase productivity during the call, make the call more meaningful and otherwise enhance the overall call experience.

Figure 24:
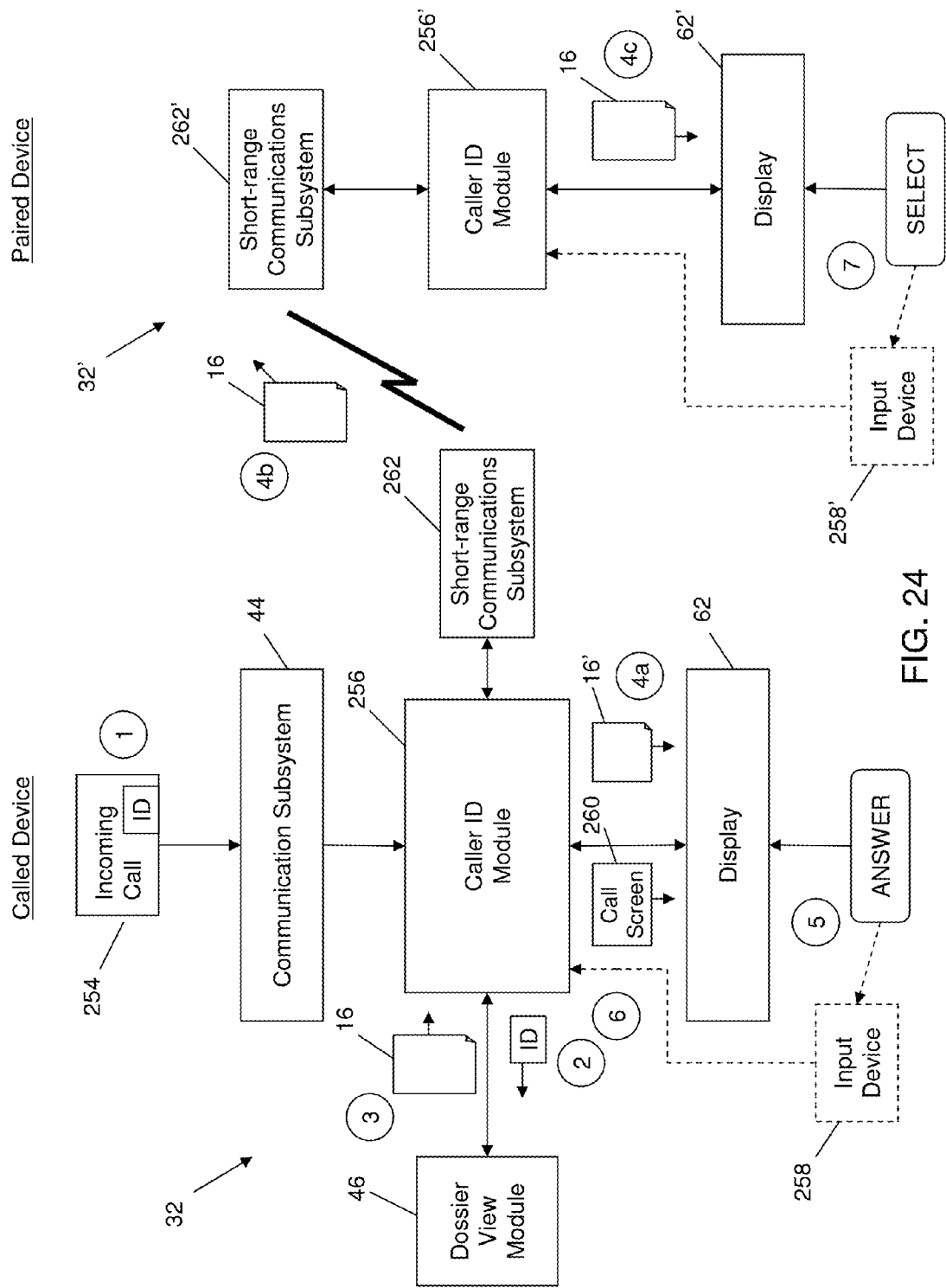
FIG. 24 is a block diagram of an example of a configuration for a mobile device operable to utilize dossier UIs for enhanced caller identification ID and operable to provide dossier UI data to a paired device.

In addition to providing enhanced caller ID information on the called device, as discussed above, the called device 32 may also be tethered to or paired to another device such as a tablet computer (e.g., as shown in FIG. 22), hereinafter a paired device 32'. FIG. 24 illustrates an example of a configuration for a called device 32 and a paired device 32' operable to display enhanced caller ID information using both devices 32, 32'. As can be appreciated from FIG. 24, stages 1, 2 and 3 may be performed in a manner similar to those shown in FIG. 23 and described above. However, after obtaining an individual dossier UI 16 for the caller in stage 3, the called device 32 in this example determines that the called device 32 is paired to another device, namely the paired device 32'. Since the called device 32 is paired to paired device 32', the called device 32 may provide the individual dossier UI 16, or data enabling creation of the individual dossier UI 16, to the paired device 32'. At stage 4, the caller ID module 256 in this example, in addition to displaying an enhanced caller ID UI 16' at stage 4a as described above, provides the individual dossier UI 16 or data enabling the creation thereof to the paired device 32' at stage 4b using a short-range communications subsystem 262. It can be appreciated that the short-range communications subsystem 262 may generally represent any communicable connection between the called device 32 and the paired device 32', including both wired connections (e.g., a Universal Serial Bus (USB) cable) and wireless connections (e.g., Bluetooth, Wi-Fi, infrared, etc.).

As shown in FIG. 24, the paired device 32' may also have a caller ID module 256' operable to communicate with the caller ID module 256 on the called device 32 in order to receive the individual dossier UI 16 via a short-range communications subsystem 262' of the paired device 32'. The caller ID module 256' on the paired device 32' may then display the individual dossier UI 16 at stage 4c using a display module 62'. It can be appreciated that by sending data from the called device 32 to the paired device 32', e.g., an individual dossier UI 16, the recipient of the call may take advantage of the second display 62' provided by the paired device 32'. In scenarios wherein the paired device 32' has a relatively larger display 62' when compared to that of the called device 32, not only is enhanced caller ID information provided, but the recipient can conveniently view and interact with information concerning the caller to enhance the overall experience. In addition, by enabling pivoting between dossier UIs 16, 17, application UIs 10, and item UIs 14 as described above, the enhanced caller ID UI 16' can be used as an entry point into a interconnected domain associated with the caller, while currently communicating with that caller. In scenarios wherein the paired device 32' has access to the wireless network 34, an identifier or other data may be sent from the called device 32 to the paired device 32' to have the paired device 32' access at least some data to be used in displaying a dossier UI 16, 17 on the paired device 32', from a source accessible via the wireless network 34. This access enables the paired device 32' to offload at least some processing and relieve bandwidth burden on the called device 32. Moreover, by utilizing a connection available on the paired device 32', at least some data transfer between the devices 32, 32' can be avoided. For example, the caller ID module 256' on the paired device 32' may be operable to access the Internet over a communication subsystem (not shown) on the paired device 32' and incorporate elements obtained from the Internet into the dossier UI 16, 17 or data related thereto in generating an output to be displayed on the display 62'.

Similar to the example shown in FIG. 23, as shown in FIG. 24, it may be assumed that the user answers the incoming call at stage 5 by providing an input using the display 62 or another input device 258 and the call screen 260 may be displayed at stage 6. FIG. 24 also illustrates that the individual dossier UI 16 displayed by the paired device 32' may also be interacted with at stage 7, e.g., to navigate from the individual dossier UI 16 to other dossier UIs 16, 17, application UIs 10 and item UIs 14 as described above.

Figure 25:
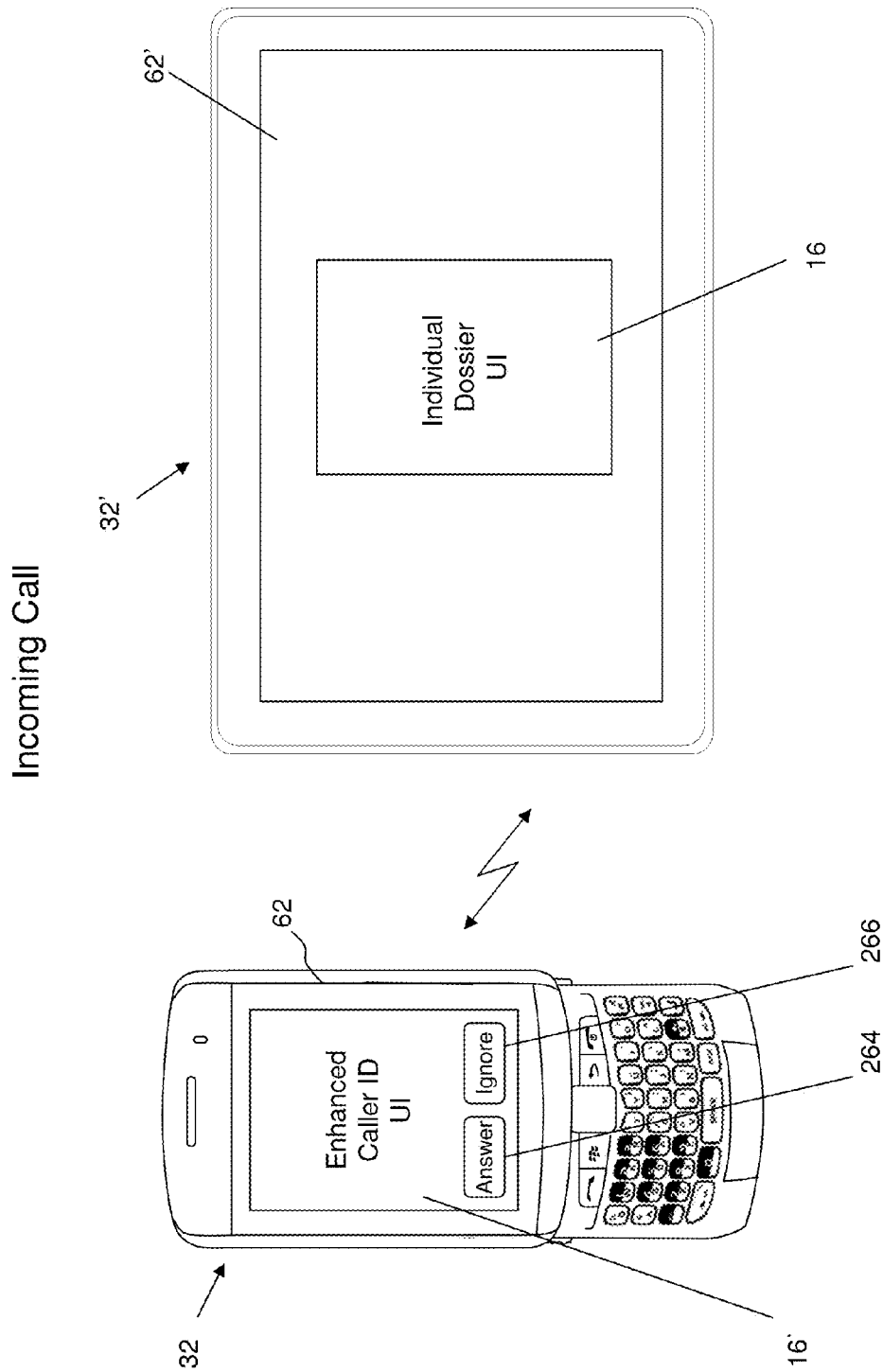
FIG. 25 is a pictorial view of two paired mobile devices displaying dossier UIs for providing enhanced caller ID during an incoming call.

FIG. 25 illustrates a called device 32 communicable with a paired device 32' at the time of receiving an incoming call at the called device 32. The called device 32 in this example displays an enhanced caller ID UI 16' that includes an answer button 264 to accept the incoming call and an ignore button 266 to ignore or otherwise reject or silence the incoming call. It can be appreciated that existing "answer" or "ignore" buttons or keys on the called device 32 may also be used to accept or reject an incoming call, in addition to, or instead of, the answer button 264 and ignore button 266 shown in FIG. 25. At the same time as displaying the enhanced caller ID UI 16' on the called device 32, the paired device 32' displays the individual dossier UI 16 to provide additional information related to the caller on a relatively larger display 62' while enabling the user to conveniently explore and navigate through the additional information, e.g., to determine whether or not to answer the call by selecting the answer button 264 or to recall details associated with the caller. In addition to recognizing the caller, further context can be provided to better prepare the user for the call. Since phone calls are active rather than passive, such preparation and context can be particularly advantageous.

FIG. 26 illustrates the called device 32 and the paired device 32' during a call. The called device 32 in this example displays a call screen 260 that includes an end call button 268 to enable the user to terminate the ongoing call. During the call, the paired device 32' continues to display the individual dossier UI 16 and thus provides additional information related to the caller on a relatively larger display 62' during the call. In the example shown in FIG. 26, it can be seen that during the call, the user may interact with the individual dossier UI 16 using the paired device 32' to conveniently explore and navigate through the additional information related to the caller, while simultaneously conversing with the caller using the called device 32.

Figure 27:
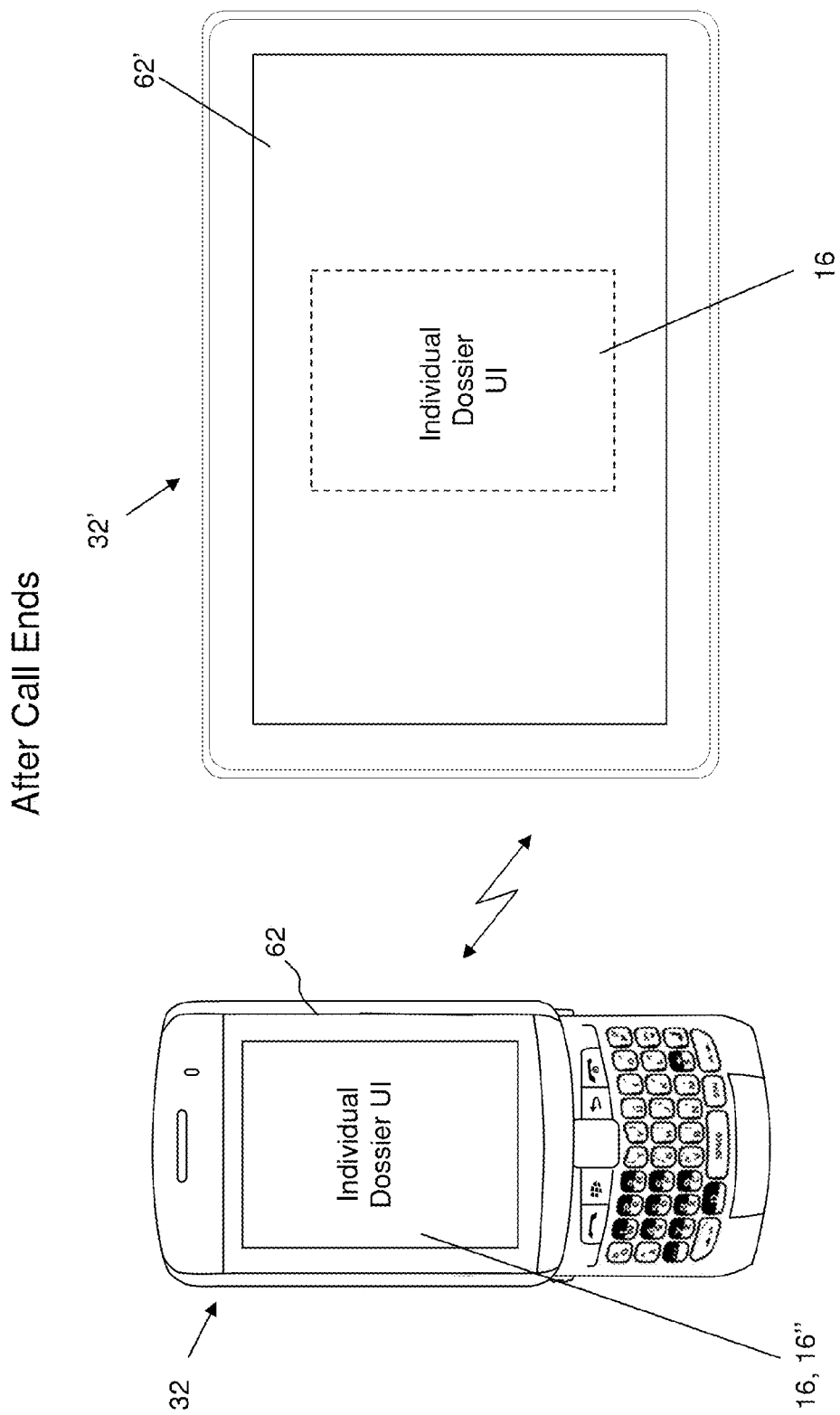
FIG. 27 is a pictorial view of two paired mobile devices displaying dossier UIs after a call has ended.

FIG. 27 illustrates the called device 32 and the paired device 32' after a call ends. The called device 32 in this example displays the individual dossier UI 16 or a modified individual dossier UI 16" (e.g., reduced or truncated version of the individual dossier UI 16). In this way, the user may follow up using another communication medium, explore further details and information related to the caller, etc. As shown in FIG. 27, the paired device 32' may continue to display the individual dossier UI 16 after the call ends, or may automatically close the individual dossier UI 16 in favor of displaying individual dossier UI 16 on the called device 32, e.g., if the called device 32 is a primary communication device.

Figure 28:
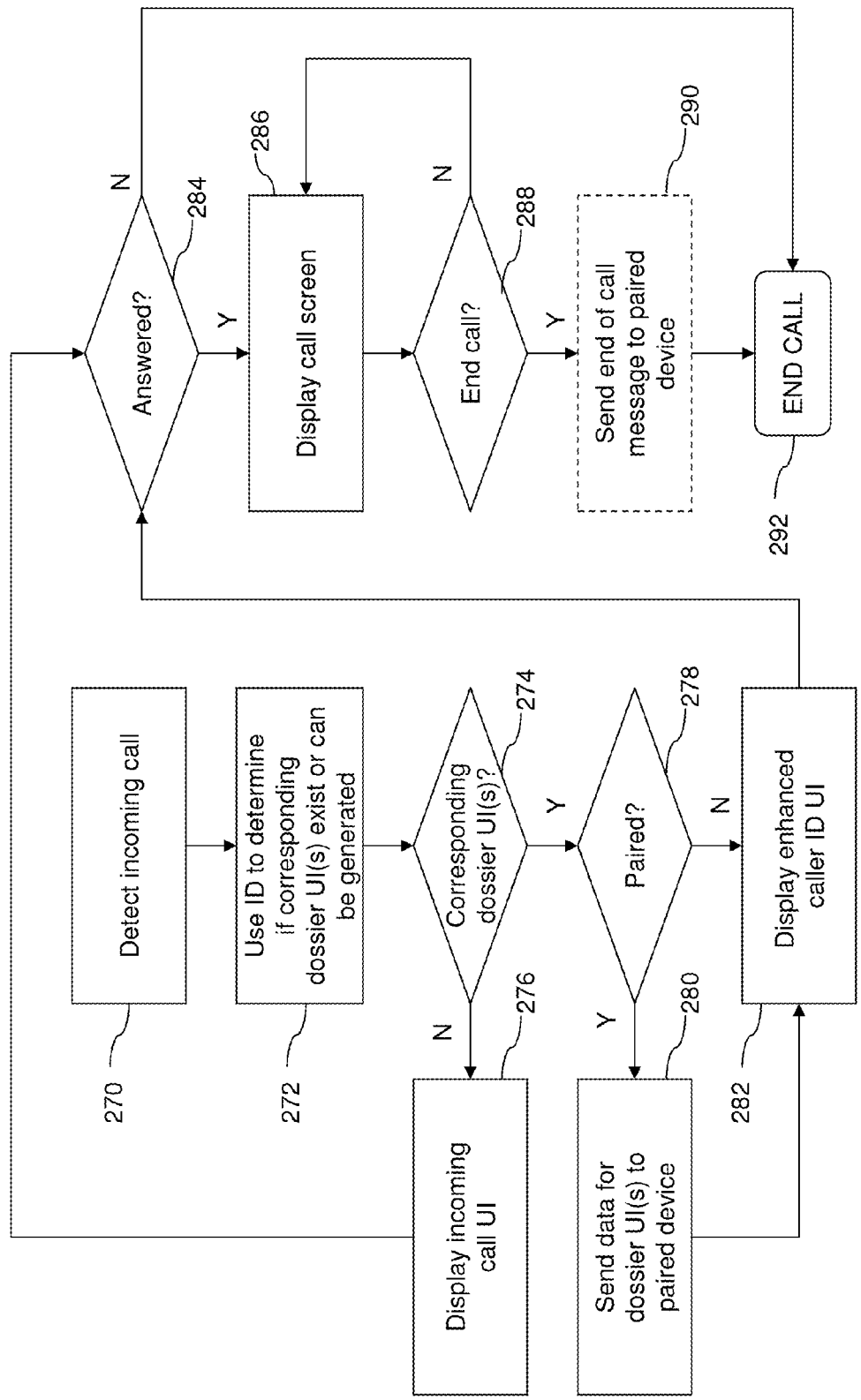
FIG. 28 is a flow chart illustrating example computer executable operations that may be performed by a called device in using dossier UIs to provide enhanced caller ID.

Turning now to FIG. 28, an example set of computer executable operations is shown that may be executed by the called device 32 in providing enhanced caller ID. At 270, the caller ID module 256 detects incoming call data 254 and determines an ID indicative of the caller and/or group or event associated with the caller. The ID may then be used, at 272, to determine from the dossier view module 46 if at least one corresponding dossier UI 16, 17 exists or can be generated. For example, the caller may be an existing contact or a member of an existing group and a dossier UI 16, 17 may exist or be readily generated. Alternatively, it can be appreciated that data accessible to the recipient of the call that is related to the caller may also be accessed in order to generate at least a partial individual dossier UI 16 (e.g., social networking profiles, web pages, etc.). It can be appreciated that data accessible to the recipient and related to the caller may include both publicly available data and data that requires a credential or association or connection between the recipient and the caller. For example, a social networking connection may enable the recipient to utilize a credential associated with the social network to access data related to the caller that would otherwise not be publicly available. The caller ID module 356 determines, at 274, whether or not at least one dossier UI 16, 17 can be obtained that is associated with the caller. If not, an incoming call UI, including available data such as phone number and/or name may be displayed, at 276.

If at least one dossier UI 16, 17 can be obtained, the caller ID module 256 determines at 278 whether or not the called device 32 is paired to another device, e.g., the paired device 32' shown in FIGS. 25-27. If the called device 32 is paired to a paired device 32', data that enables the paired device 32' to display the at least one dossier UI 16, 17 associated with the caller may be sent to the paired device 32', at 280. It can be appreciated that the data sent, at 280, may be the dossier UI(s) 16, 17 or any data or information that enables the paired device 32' to generate an equivalent or similar UI. Whether or not the called device 32 is currently paired, the caller ID module 256, in this example, displays the enhanced caller ID UI 16', at 282, which provides both enhanced caller ID information (e.g., by using at least some elements of a dossier UI 16, 17) and options to accept or ignore/reject the call. As discussed above, the elements of an existing dossier UI 16, 17, or a dossier UI 16, 17 generated for displaying enhanced caller ID information may be adjusted according to a categorization of the caller. For example, a business contact may cause elements related to business activities to be displayed (e.g., business title, calendar appointments, etc.), whereas a call from a personal contact such as a friend may cause personal or social elements to be displayed. It can be appreciated that different categorizations for the same contact may be implemented, e.g., at different times of the day. In this way, business activities related to a co-worker friend may be displayed during working hours whereas social elements and activities displayed after work hours.

The caller ID module 256 determines, at 284, whether or not the call is answered. If the call is ignored, rejected, or otherwise not answered, the call is ended or otherwise not connected at 292. If the call is answered, the caller ID module 256 displays the call screen 260, at 286, to provide call details and call options as discussed above. The caller ID module 256 determines, at 288, whether or not the connected and ongoing call has ended. If the call has not yet ended, the call screen 260 may continue to be displayed at 286. Once the call has ended, an end of call message may be sent to the paired device 32', at 290, if applicable for the particular call, and the call ends, at 292.

Figure 29:
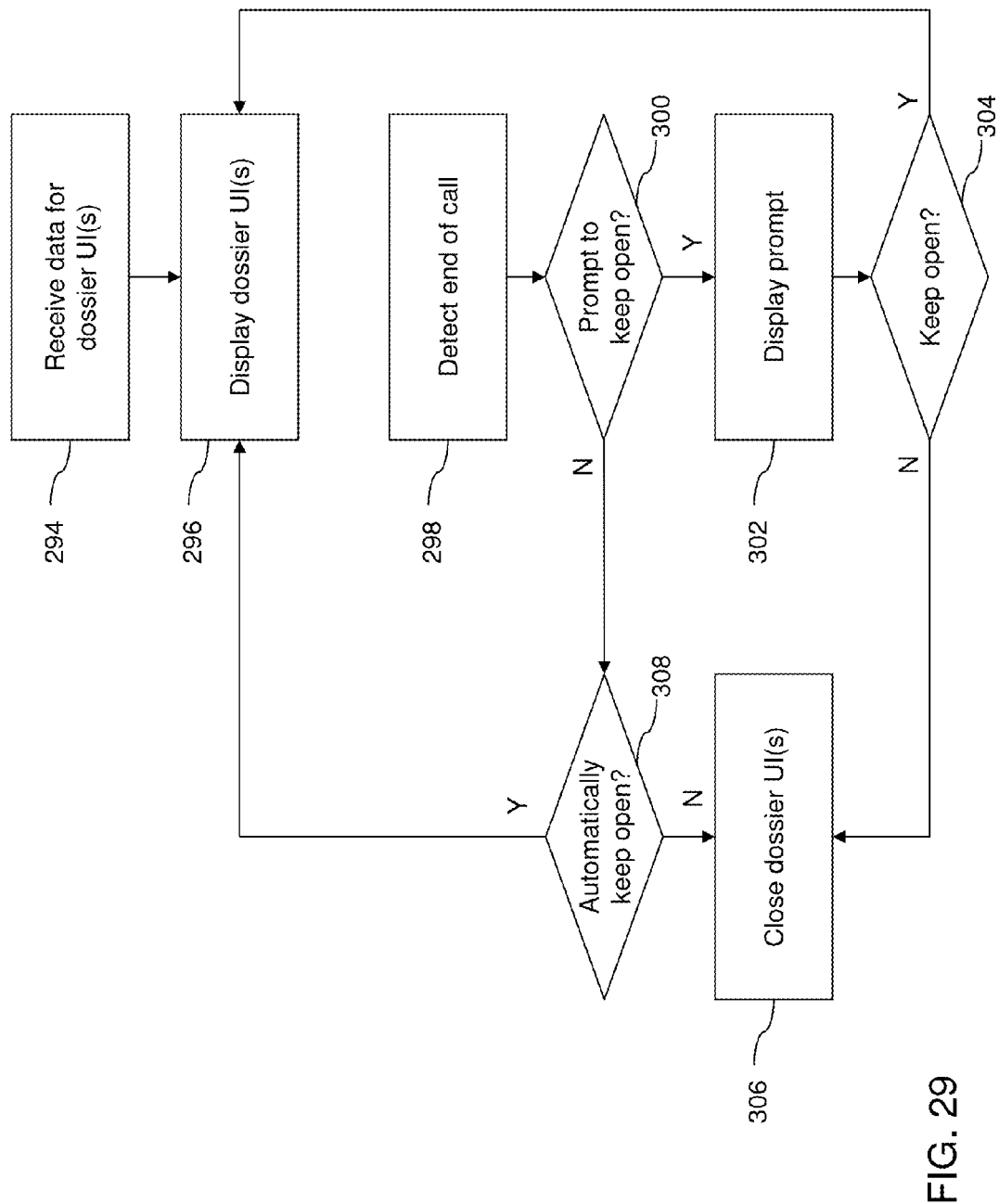
FIG. 29 is a flow chart illustrating example computer executable operations that may be performed by a paired device in using dossier UIs to provide enhanced caller ID.

FIG. 29 illustrates an example set of computer executable operations that may be executed by the paired device 32' in displaying one or more dossier UIs 16, 17 to complement or "take over" or "hand off" displaying the enhanced caller ID information to the paired device 32'. At 294 the caller ID module 256' on the paired device 32' receives data for at least one dossier UI 16, 17 via the short-range communications subsystem 262'. The dossier UI(s) 16, 17 is displayed, at 296, e.g., for the duration of the call. In this example, the paired device 32' is notified by the called device 32 of the end of the call and the caller ID module 256' thus detects the end of call, at 298. It can be appreciated that the dossier UI(s) 16, 17 may instead be displayed upon receipt of the data at 294 and persist until closed or terminated by the user. It can also be appreciated that data in a dossier UI 16, 17 may be updated during the course of a call, e.g., if new events or related data are detected during the call.

After detecting the end of the call, at 298, the caller ID module 256' in this example determines, at 300, if the user should be prompted to keep the dossier UI(s) 16, 17 open or not. If a prompt is to be provided, the prompt is displayed, at 302, and the caller ID module 256' determines, at 304, whether or not a selection from the prompt instructs the paired device 32' to keep the dossier UI(s) 16, 17 open, e.g., to further interact therewith. If the dossier UI(s) 16, 17 are to be kept open control may return to 296. If the dossier UI(s) 16, 17 are not to be kept open, the dossier UI(s) 16, 17 may be closed, at 306. It can be appreciated that instead of prompting the user whether or not to keep the dossier UI(s) 16, 17 open, the caller ID module 256' may be operable to either automatically keep the dossier UI(s) 16, 17 open or automatically close them. In this example, the caller ID module 256' in the absence of using a prompt, determines at 308 whether or not the dossier UI(s) 16, 17 should be automatically kept open. If not, the dossier UI(s) 16, 17 are closed, at 306. If the dossier UI(s) 16, 17 are to be automatically kept open, the caller ID module 256 may continue to display the dossier UI(s) 16, 17, at 296.

FIGS. 30 and 31 illustrate example screen shots of an enhanced caller ID UI 16' and an individual dossier UI 16 displayed by the called device 32 and paired device 32' respectively at the time of the called device 32 receiving a new incoming call. The enhanced caller ID UI 16', in this example, includes a name and other details portion 312 for displaying the caller's name, title, company, etc.; a photo portion 314 for displaying a photo of the caller, if available; a mutual activities portion 316 for displaying activities common to the recipient and the caller; a recent activities portion 318 for displaying recent activities of the caller; a mutual connections portion 320 for displaying contacts or other individuals that can be related to both the recipient and the caller; and the answer button 264 and ignore button 266 described above. It can be appreciated that the items shown in the enhanced caller ID UI 16' in FIG. 30 are purely illustrative. For example, user profiles or preferences, IT policies, or other criteria may be relied upon to select from various items that may be displayed in the enhanced dossier UI 16'. It can also be appreciated that although the example discussed herein show generating the enhanced caller ID UI 16' from a dossier UI 16, 17, any item related to the caller may be incorporated into the enhance caller ID UI 16' without departing from the principles discussed herein.

It can be seen that in this example, not only can the paired device 32', having a relatively larger display size, display greater detail from each portion shown in FIG. 30 (wherein similar portions are shown in FIG. 31 using a (') for clarity), additional items may also be displayed. For example, as shown in FIG. 31, various links to communication media 332 may be displayed in the individual dossier UI 16, as well as a mutual groups portion 334 providing links or access to groups common to both the recipient and the caller, both event based and persistent. It can be appreciated that the items provided in the individual dossier UI 16 shown in FIG. 31 can be interacted with to navigate to, or pivot back and forth from, other dossier UIs 16, 17, item UIs 14, and application UIs 10 as discussed above.

FIGS. 32 and 33 illustrate example screen shots of a call screen UI 260 displayed by the called device 32 and an individual dossier UI 16 displayed by the paired device 32' respectively during a call connected at the called device 32. In this example, the call screen UI 260 retains a name and other details portion 312", a photo portion 314", and a mutual activities portion 316" and includes a call data portion 336 (e.g., length of call, status of call, etc.), a call options portion 338 (e.g., speaker phone, mute, hold, add participant, keypad, calendar, etc.), and the end call button 268 discussed above. As shown in FIG. 33, the paired device 32' may continue to display the same individual dossier UI 16 during the call. However, it can be appreciated that during the call, the user may interact with the individual dossier UI 16 to navigate to, or pivot back and forth from, other dossier UIs 16, 17, item UIs 14, and application UIs 10 as discussed above.

Figure 34:
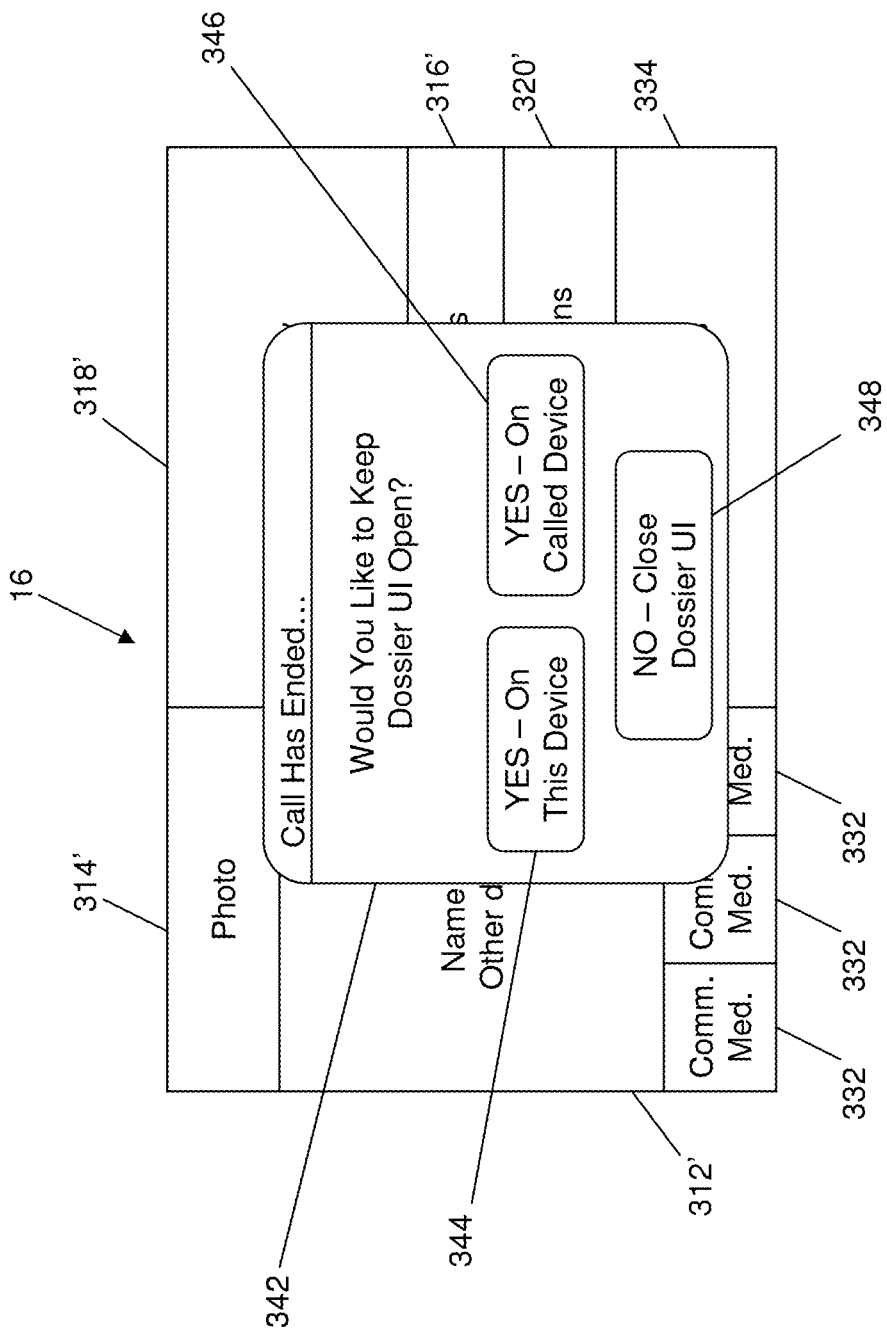
FIG. 34 is a screen shot of an example prompt displayed by a paired device after a call has ended.

FIG. 34 illustrates an example screen shot displayed by a paired device 32' including a prompt 342 displayed by the paired device 32' after a call ends. Providing a prompt 342 as shown in FIG. 34 enables the caller ID module 256' on the paired device 32' to provide an option to the user to keep the dossier UI(s) 16, 17 displayed during the call open, or to close the dossier UIs 16, 17. The prompt 342 in this example includes a first option 344 to enable the user to have the paired device 32' keep the dossier UI(s) 16, 17 open, a second option 346 to enable the user to have the called device 32 display the dossier UI(s) 16, 17, and a third option to have the dossier UI(s) 16, 17 closed on either or both the called device 32 and the paired device 32'. It can be appreciated that the prompt shown in FIG. 34 is for illustrative purposes only and is entirely optional. For example, the dossier UI 16, 17 displayed by the paired device 32' may automatically persist after a call ends in the background such that the dossier UI 16, 17 is available for further navigation or may be closed by the user of the paired device 32'. Similarly, the options shown in the prompt 342 may also be included in the dossier UI 16, 17 after the call.

As discussed above, in addition to enhancing a call by displaying individual dossier UIs 16 related to the caller, group dossier UIs 17 may also be displayed to provide enhanced caller ID for a conference call or other multi-participant call. Displaying an associated group dossier UI 17 may therefore provide additional context for the conference or group call. Additionally, multiple individual dossier UIs 16 for multiple call attendees may also be displayed on either or both the called device 32 and the paired device 32'. For example, the incoming call may be detectable as a conference call (e.g., using an ID in the incoming call data 254, a group or calendar event, etc.) and individual dossier UIs 16 obtained for each call attendees, as well as a group dossier UI 17 for the meeting associated with the conference call, if available. The group dossier UI 17 may then be displayed on the called device 32 and the group dossier UI 17 and the individual dossier UIs 16 displayable on the paired device 32'.

Figure 35:
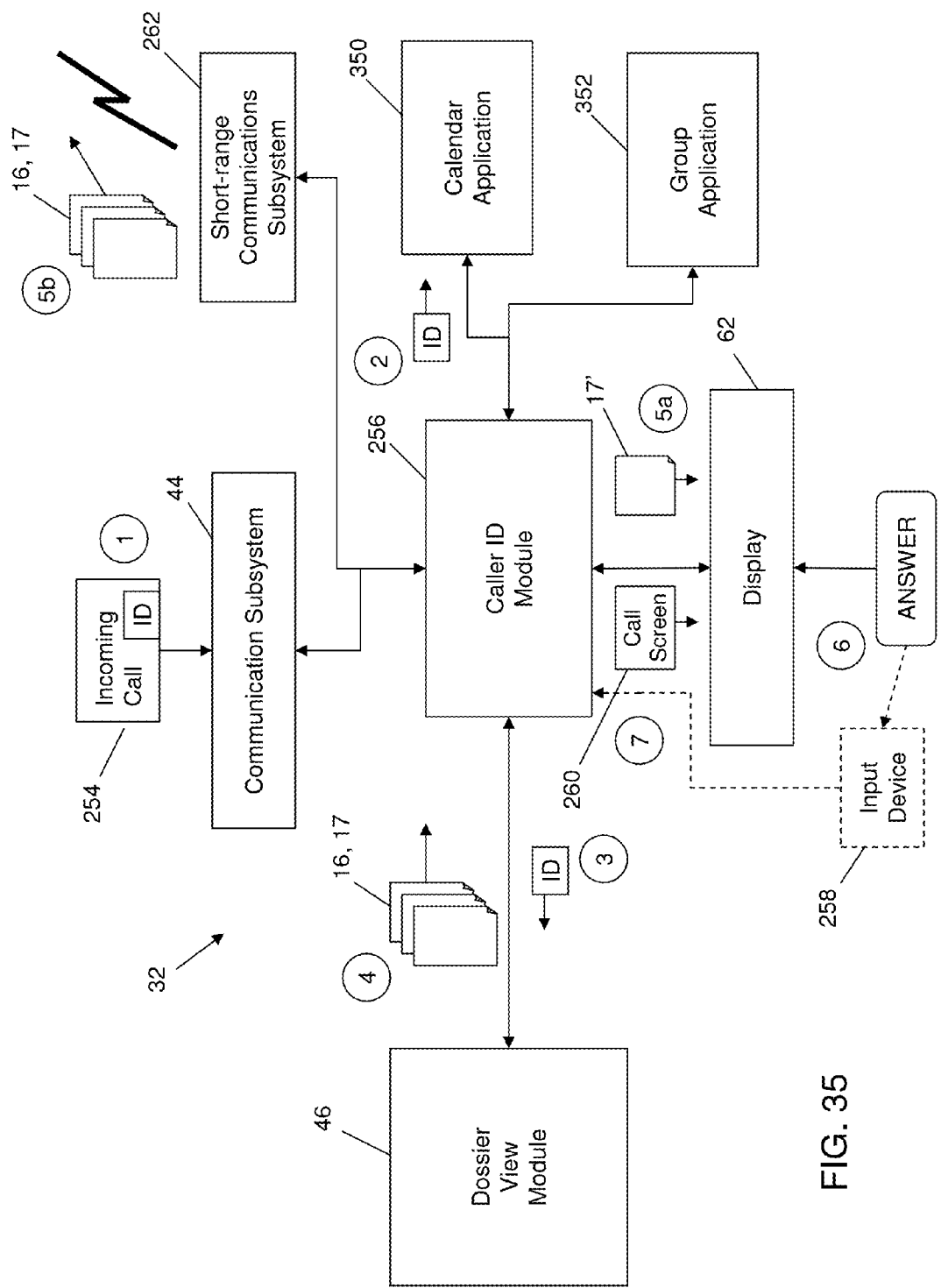
FIG. 35 is a block diagram of an example of a configuration for a mobile device operable to utilize dossier UIs for enhanced caller identification ID associated with a conference or group call.

Turning now to FIG. 35, an example configuration is shown for a called device 32 to obtain multiple individual dossier UIs 16 and/or at least one group dossier UI 17 to enhance context for a conference or group call and to provide enhanced caller ID information. In the example shown in FIG. 35, incoming call data 254 includes an ID that is associated with any one or more of at least one call attendee (e.g., the caller), a calling service (e.g., when arranging a conference call), and a group or event associated with the call. The ID may then be used at stage 2 to determine if there is an associated group or event, e.g., by accessing or otherwise communicating with a calendar application 350, group application 352, etc. By accessing other applications, not only can the caller ID module 256 provide context for the caller, the caller ID module 256 can determine relevant groups or associations, events such as meetings, and call attendees that are likely part of or going to be part of the call. The ID sent to the dossier view module 46 may therefore include identifying information related to one or more individuals and one or more groups such that at stage 4, multiple individual and group dossier UIs 16, 17 or data related thereto may be provided to the caller ID module 256. An enhanced caller ID UI 17' displayed in stage 5a on the called device 32 may therefore include details of the conference or group call such as event or group details It the example shown in FIG. 35, it may be assumed that the called device 32 is paired to a paired device 32' and thus multiple individual and group dossier UIs 16, 17 may be sent to the paired device in stage 5b. It may also be assumed in the example shown in FIG. 35 that the call is answered at stage 6 and a call screen 260 displayed at stage 7.

Figure 36:
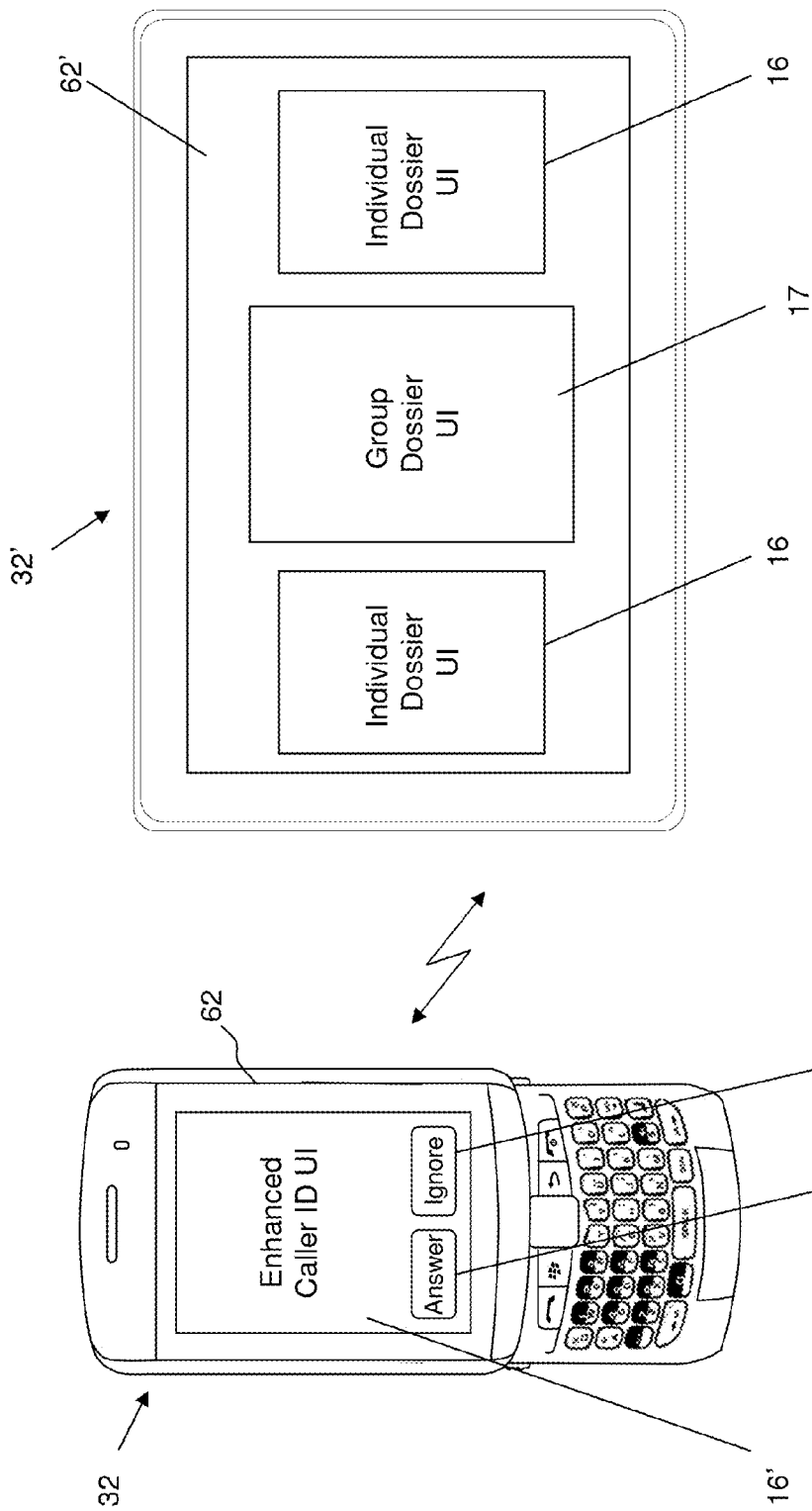
FIG. 36 is a pictorial view of a called device and a paired device during an incoming conference or group call wherein the paired device displays individual and group dossier UIs.

FIG. 36 illustrates an example wherein the paired device 32' displays a group dossier UI 17 and multiple individual dossier UIs 16. For example, by detecting that the incoming call to be identified using the enhanced caller ID UI 17' on the called device 32 relates to a conference call with multiple attendees, a group dossier UI 17 for the meeting may be displayed on the paired device 32' along with individual dossier UIs 16 for each attendee.

Figure 37:
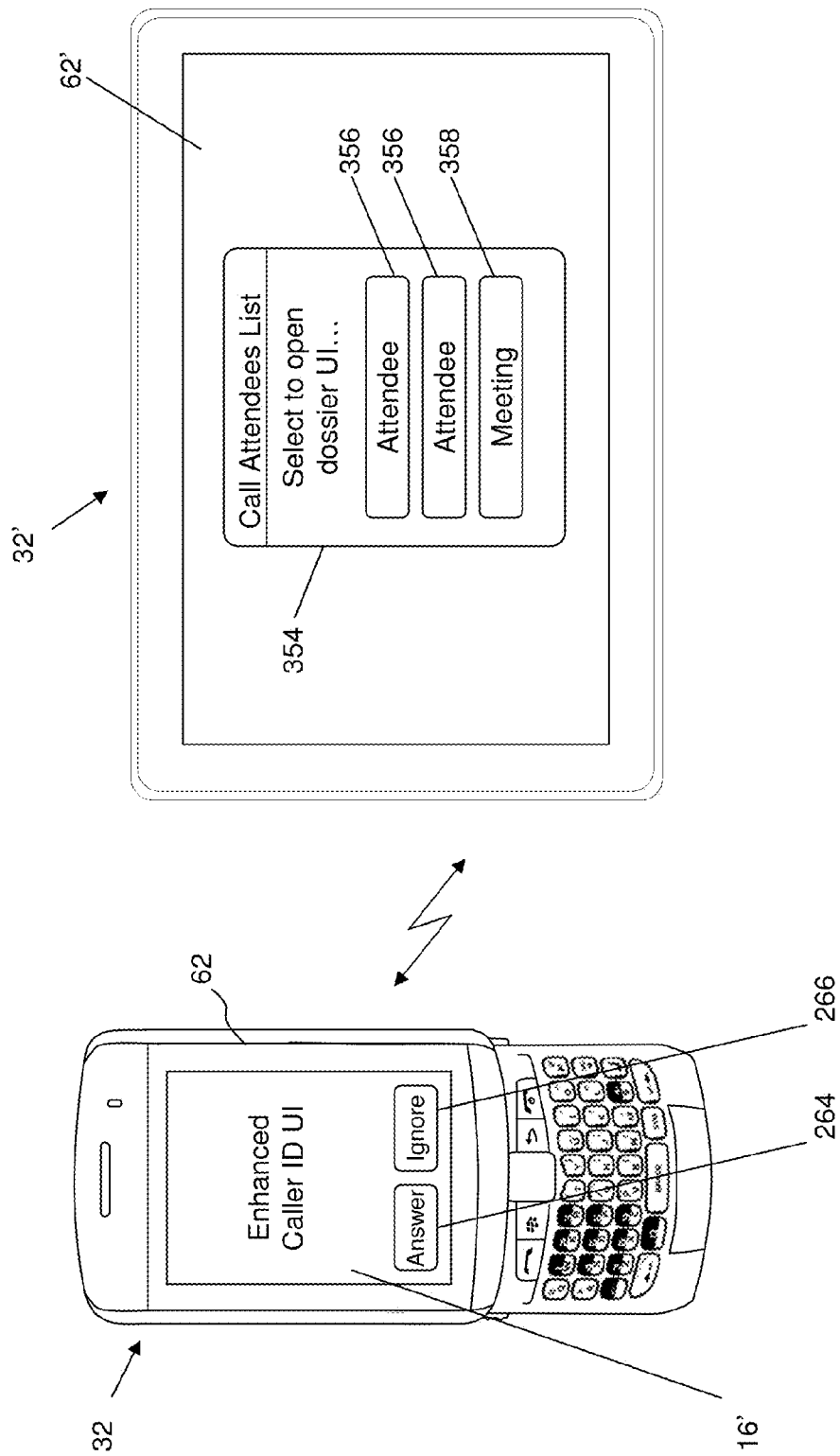
FIG. 37 is a pictorial view of a called device and a paired device during an incoming conference or group call wherein the paired device displays a list of call attendees for displaying dossier UIs on the paired devices.

Rather than automatically displaying all available dossier UIs 16, 17 on the paired device 32', as shown in FIG. 37, a call attendees list 354 may be displayed enabling the user to select one or more dossier UIs 16, 17 associated with the call. In the example shown in FIG. 37, a pair of attendees buttons 356 are displayed with a meeting button 358 to enable the dossier UIs 16, 17 shown in FIG. 36 to be selectively displayed rather than automatically. It can be appreciated that the call attendees list 354 and buttons 356, 358 shown in FIG. 37 are illustrative only and various other navigational elements may be used in other examples.

Turning now to FIG. 38, an example set of computer executable instructions is shown that may be performed by the caller ID module 256 on the called device 32 in determining how many, if any, dossier UIs 16, 17 are to be sent to the paired device 32'. At 360, the ID is used to determine if a group or event exists, e.g., by accessing or querying other applications such as the calendar application 350 and group application 352 shown in FIG. 35. Based on such a determination, the ID that is provided to the dossier view module 46 for fetching or generating corresponding dossier UIs 16, 17 may be updated, at 362, to include group or event data, including indications of other potential call attendees. The ID is used by the dossier view module 46 to determine the associated individual and/or group dossier UIs 16, 17, at 364, such that the dossier UI(s) 16, 17 may be fetched or generated and provided to the caller ID module 256, at 366.

In addition to providing enhanced caller ID information for incoming calls, the caller ID module 256 may also be operable to obtain and display dossier UIs 16, 17 on the called device 32 and/or the paired device 32', for outgoing calls. FIG. 39 illustrates an example set of operations that may be performed by the caller ID module 256 for an outgoing call. At 370, the caller ID module 256 detects an outgoing call and uses call details to determine, at 372, if corresponding dossier UI(s) 16, 17 is/are available and relevant to the outgoing call. For example, the called number or other contact list details may be used to determine who the recipient of the call is such that an individual dossier UI 16 can be displayed, e.g., using the paired device 32' to enhance the caller's context regarding the individual being called. In another example, a conference call-in number may be selected from a link in a calendar meeting whereupon a group dossier UI 17 for that meeting is displayed on the paired device 32'. As shown in FIG. 39, after determining which if any dossier UIs 16, 17 are relevant to the outgoing call, the caller ID module 256 may operate, for example, according to operations 274-292, described above.

The principles discussed above regarding the amalgamation of UI elements concerning an individual or group (event based or persistent), can also be incorporated into electronic groups that are created, modified, and deleted on or by a mobile device 32, including groups containing members that utilize other types of devices.

Figure 40:
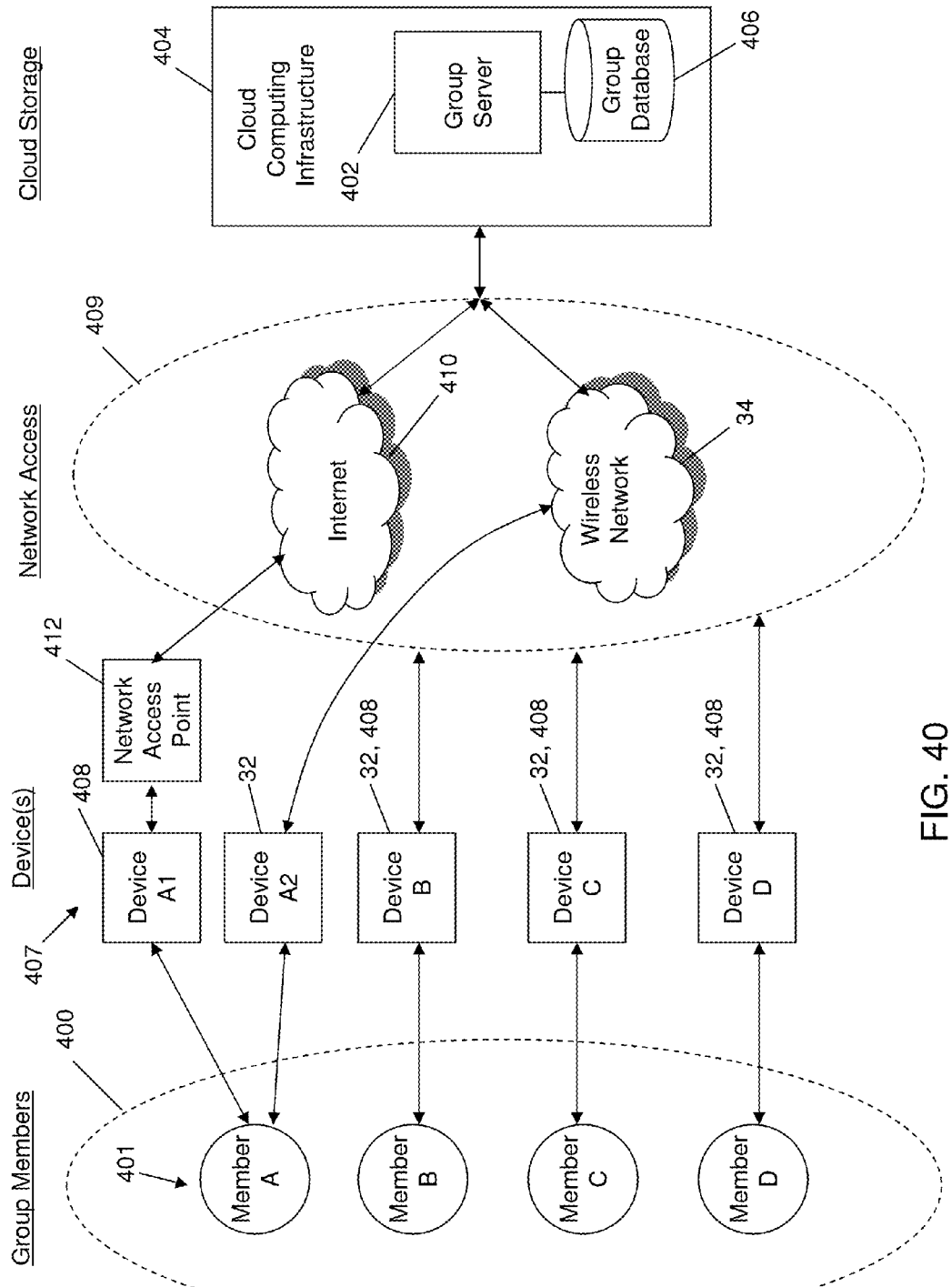
FIG. 40 is a schematic diagram of an example communication system including a cloud computing infrastructure.

FIG. 40 illustrates an example of a group 400 including, in this example, four members 401. Each group member 401 may access at least one communication network 409 using one or more devices 407. Access to the networks 409 enables the group members 401 to communicate with each other using various devices 407 available to the group members 401. Group memberships and data and information associated with the group 400 may be stored in a cloud computing infrastructure 404 accessible via the networks 409. The cloud computing infrastructure 404 includes a group server 402 and group database 406 to enable group members 401 and their respective devices 407 to determine which individuals are in a particular group in order to leverage the capabilities of the device 407 currently being used to create a group experience. For example, messaging capabilities on a mobile device 32 can be leveraged when accessing and communicating with a group 400 using a mobile device 32, whereas fewer bandwidth constraints can be leveraged when accessing and communicating with the group 400 using a desktop computer.

It can be appreciated that when a group member 401 uses a mobile device 32, information on the mobile device 32 can be used to supplement information from the group server 402 and group database 306. In this way, particular devices 407 used by the group members 401 can enhance the group experience when compared to other devices 407. For example, a group member 401 using a mobile device 32 may have a better experience than when using a PC or other devices, since the mobile device 32 may have access to additional group member information such as location, calendar information, memos, photos, messages, etc., which may be combined with information returned from the group server 402 and group database 406 to provide individual group members 401 with a more complete and integrated view of the group members 401 and their activity.

The devices 407 capable of accessing the communication networks 409 may therefore include mobile devices 32, and other electronic devices 408 such as a desktop computer, kiosk, smart home system, etc. In the example shown in FIG. 40, group member A is configured to access the internet 410 via a network access point 412 in communication with a first device 408, Device A1. Group member A may also access a wireless network 34 using a mobile device 32, Device A2. Both communication channels enable group member A to determine the membership of the group 400 and related information, by accessing the group server 402 and group database 406. The cloud computing infrastructure 404 retains enough group data to enable a member 401 to generate a user interface and user experience on the particular device 407 being used, without having to store all relevant group data. For example, when accessing the group server 402 using a mobile device 32, the mobile device 32 can use the membership of the group as specified by the group server 402 to generate a group dossier UI 17 and leverage data and communication capabilities available on the mobile device 32. It can be appreciated that Devices B, C, and D are shown for illustrative purposes only and may represent any one or more devices 407 utilized by group members B, C, and D respectively.

The devices 407 may communicate with each other via the networks 409 in performing group operations such as sharing data, sharing calendar events, sharing media items (e.g., pictures, videos, documents, etc.), messaging with each other, sharing tasks or lists of items, etc. It can be appreciated that the group 400 may be facilitated by a server located in a network or other infrastructure (not shown) or may be maintained by each device 407 in a "serverless" configuration wherein the devices 407 share, update, and maintain common data in local databases.

In one example, the group server 402 may be the same server used in facilitating group operations, or may be a server that is used independent of any service that supports the group 400. For example, the group 400 may be supported by a server or other component of a wireless network infrastructure (e.g., wireless router or relay) whereas the group server 402 is provided and maintained by a separate service within the cloud computing infrastructure 404, e.g., a web-based service accessible to the networks 409.

By maintaining the group database 406 in the cloud computing infrastructure 404, group data and group activities can be monitored and contributed to by group members 401 using multiple devices 407 and device types. It can be appreciated that shifting or copying group data (e.g., changing group membership) to the cloud computing infrastructure 404 facilitates a more seamless group experience by enabling a user to participate in the group using multiple and different devices 407 while being able to leverage capabilities and advantages provided by such different devices 407.

Figure 41:
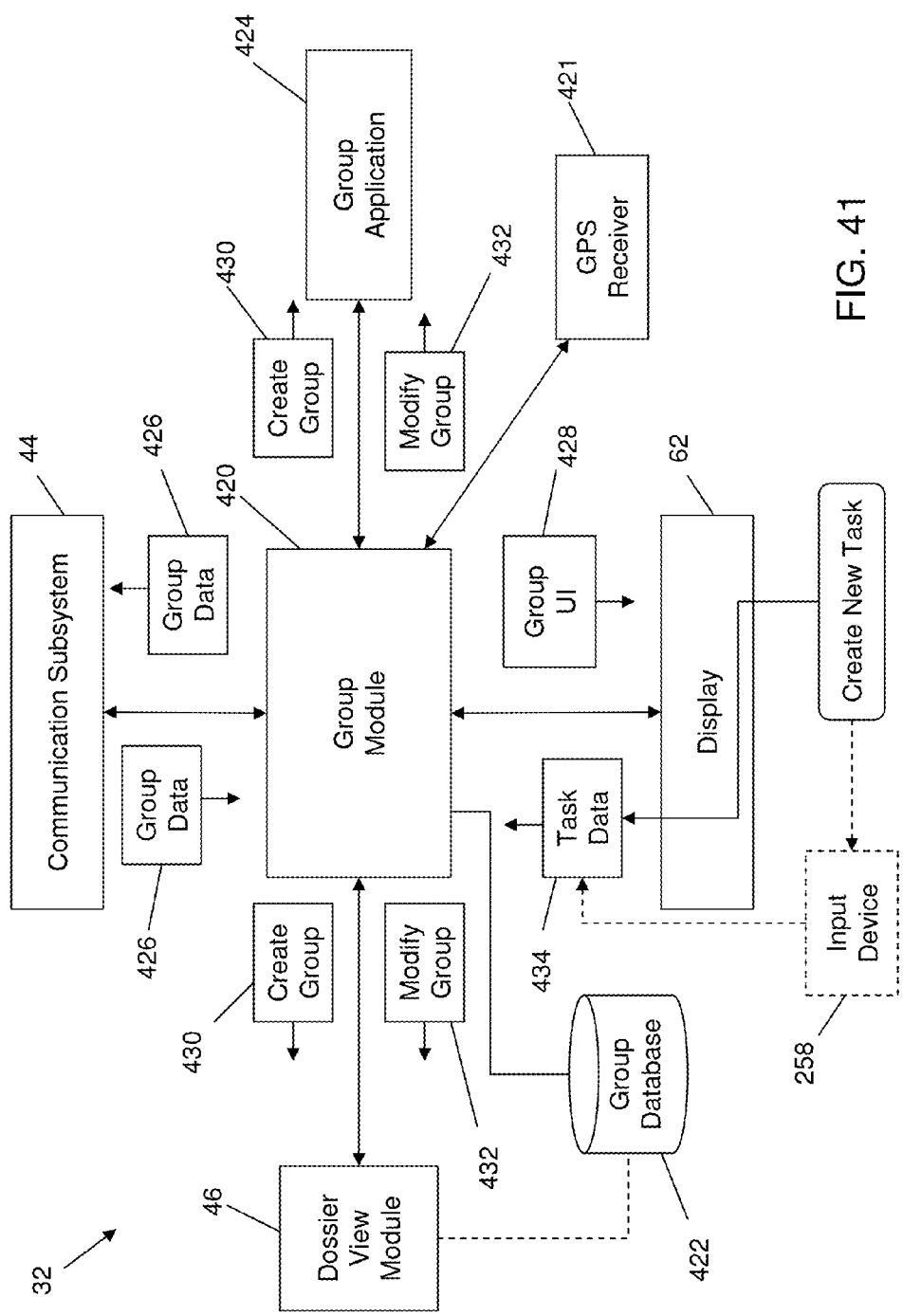
FIG. 41 is a block diagram of an example configuration of a mobile device operable to communicate in an electronic group.

FIG. 41 illustrates an example of a configuration for a mobile device 32 that includes a group module 420 for group operations and enables a group member 401 to leverage the capabilities of the mobile device 32 when participating in the group, e.g., by generating dossier UIs 16 for other group members 401. The group module 420 in this example is shown as being independent of a group application 424 for illustrative purposes only and may instead be an integral portion of the group application 424. The group module 420 is communicable with the dossier view module 46 described above, to enable group dossier UIs 17 to be created, updated, and deleted from groups established via the group module 420 and/or group application 424. The group module 420 is operable to send and receive group data 426 using a communication subsystem 44 of the mobile device 32 and includes or otherwise has access to a local copy or version of the group database 406 for maintaining and/or synchronizing group data 426. The group module 420 also enables a group UI 428 to be displayed using a display 62 of the mobile device 32. It can be appreciated that the group UI 428 may also be displayed by the dossier view module 46 and/or group application 424.

The group module 420 is operable to automatically create new groups based on events such as detecting proximity with at least one contact, frequent messaging between contacts, common calendar events with other contacts, common media content being consumed, etc. Such new groups may be short lived or ephemeral, based on a detectable duration of the event that triggered creation of the group 400, or may be longer term, e.g., based on a registration, membership, or other change in status with respect to an organization or group of individuals. Examples of relatively longer term groups include, without limitation, "friends from college", "family members", "hockey friends", "church friends", etc. Create group instructions 430 may be generated by the group module 420 and provided to the group application 424 or dossier view module 46 to enable new groups 400 to be created. For example, detecting that at least one contact in an address book or contact list is proximate to the mobile device 32 may trigger the creation of a new group 400 wherein a group dossier UI 17 is also generated to pull in data and information that is available with respect to the group members. At the same time, an existing group application 424 such as a group component of an instant messaging application, may also be created for the purpose of enabling messaging between group members. Group creation instructions 430 may be generated in response to user input, external data, or by detecting other events, such as proximate locations. For example, the group module 420 may be operable to obtain location information for contacts of the user of the mobile device 32 and compare the location information to a current location of the mobile device 32. The current location of the mobile device 32 may be obtained in various ways, e.g., by accessing a global positioning system (GPS) receiver 421 of the mobile device 32. Another example of detecting an event includes determining that the user has been regularly emailing the same group about a particular topic (e.g., upcoming meetings, concerts, hockey games, etc.). Yet another example of detecting an event includes determining that the user regularly schedules conference calls with the same (or similar) group of individuals (e.g., a collection of staff at work). Group creation instructions 430 based on external data or events detectable by the mobile device 32 may therefore include various detectable correlations, associations, linkages, etc., between collections of users or contacts.

Modify group instructions 432 may also be generated by the group module 420 and provided to the group application 424 and/or dossier view module 46 for adding or removing members, deleting the group 400, removing the mobile device 32 from a group 400 that will persist, etc.

Tasks may be created in association with a group 400 and those tasks assigned to one or more members of the group 400. For example, a group 400 that is formed based on a detected calendar event for a meeting may enable tasks leading up to the meeting to be created. A new task may be created by interacting with the mobile device 32 and the group UI 428, e.g., by interacting with the display 62 and/or other input device 258 such as a keyboard. Task data 434 is generated for creating a new task, modifying an existing task, deleting or completing a task, and performing other operations associated with a group task.

The group module 420 can automatically generate a new group 400 based on various detectable events. For example, detecting that one or more contacts is/are within a predetermined distance of the current location of the mobile device 32 may cause an automatic group 400 including those contacts to be formed. FIG. 42 illustrates a location-based group UI 450 for displaying a map 452 showing a current location 454 for the mobile device 32 and friend locations 456 of those contacts within a predetermined distance from the mobile device 32. The location-based group UI 450 may be created automatically when at least one contact is within the predetermined distance and invite others to join as contacts are detected within this range. The location-based group UI 450 in this example provides a group dossier view for the members of the newly formed group 400. A communication media portion 458 is provided which includes a number of communication media 460 that may be used to contact the contacts in the group 400. For example, a phone icon, IM icon, and email icon may be displayed to enable the respective communication media to be used to get in touch with the group members.

Messaging groups may be automatically formed, e.g., by accessing a group application 424 and creating a new group within that group application 424. A group activity portion 462 can be used to display various types of group activity, including recent messages in a related messaging group. A related data portion 464 may also be included for displaying other data and information pulled from other sources. For example, the related data portion 464 may include the same information as the recent activity portion 142 of an individual dossier UI 16 (see FIG. 10) but may include a combined collection of recent activities for all group members.

The group 400 formed based on the proximity of various contact as shown in FIG. 42 may be automatically deleted as the proximity of the contacts disappears. FIG. 43 illustrates a group update UI 466 in which a group update message 468 is displayed indicating that "Bob" has left the area and is no longer in the group 400. It can be appreciated that similar group updates 466 may be displayed as other members leave the area defining the location-based group, until the group no longer exists, at which time the group can be deleted.

Similar UIs may be generated automatically based on other events. For example, detecting that the user of the mobile device 32 has created or accepted an invitation to a meeting or appointment can trigger the group module 420 to create a new group and group dossier UI 17 related to the calendar event as discussed above.

Figure 44:
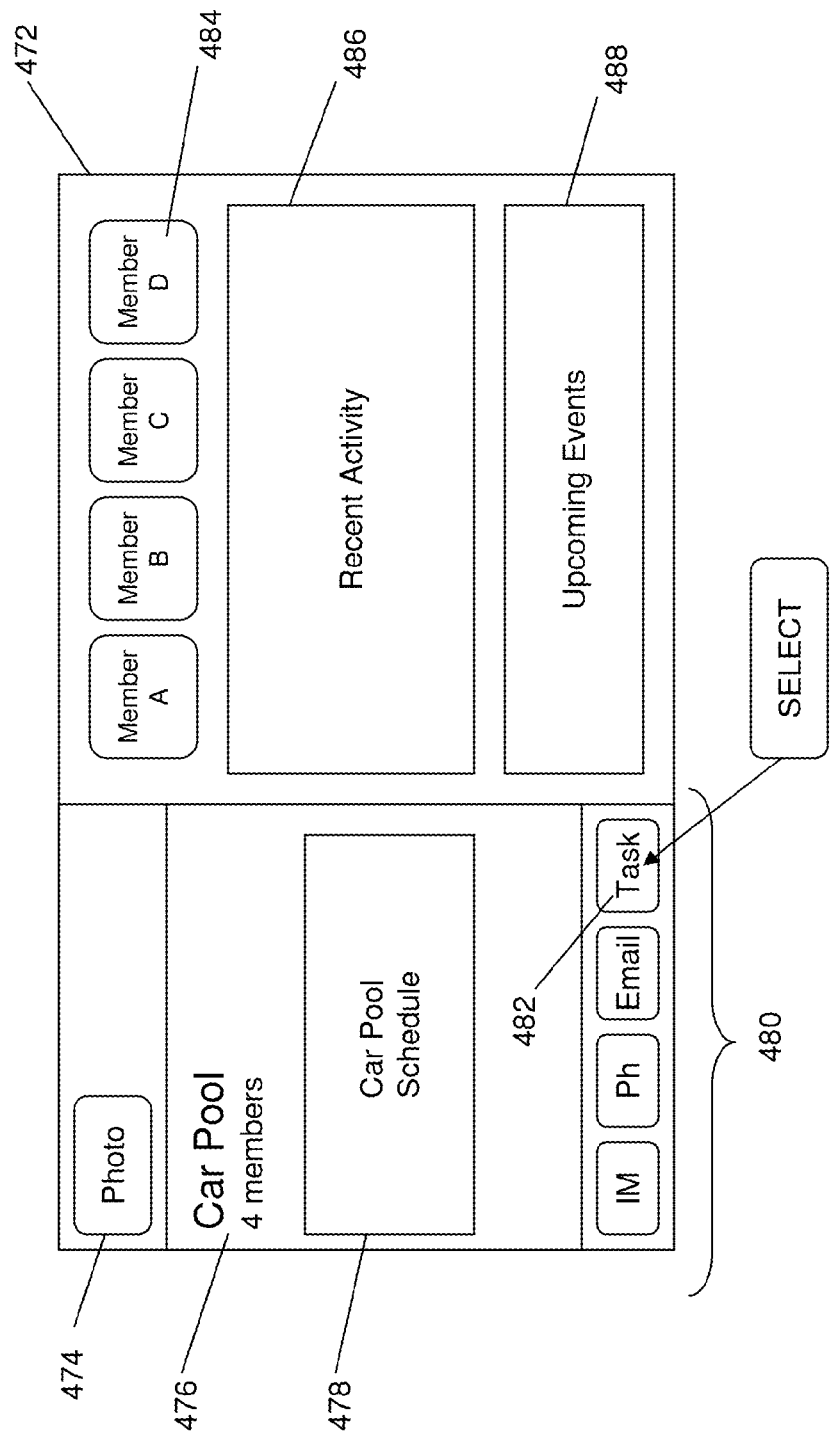
FIG. 44 is a screen shot of an example of a car pool group UI.
Figure 45:
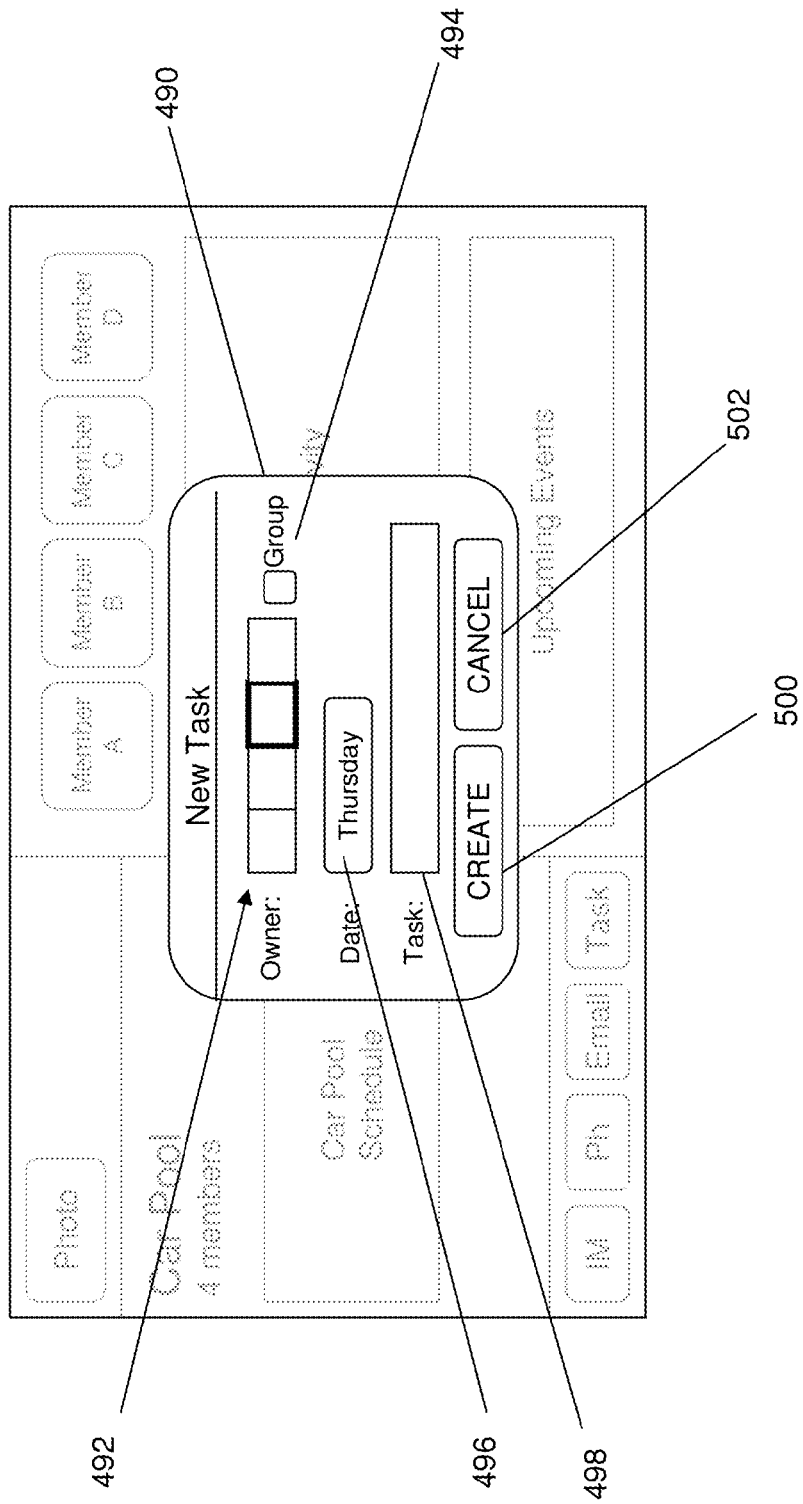
FIG. 45 is a screen shot of an example of a new group task UI.

FIG. 44 illustrates a car pool group UI 472 that has been generated for a longer term group. The car pool group UI 472 is, in the example shown in FIG. 44, generated as a group dossier UI 17 and includes a photo 474 or other identifier for the group, a group name 476, a car pool schedule 478, and a number of group operation buttons 480. The car pool group UI 472 also includes an identifier 484 for each group member, a recent activity portion 486 (e.g., combined recent activity for all group members), and an upcoming events portion 488. By selecting a group member identifier 484, the group module 420 may initiate a pivot to an individual dossier UI 16 for the associated member. Of the group operation buttons 480 is a task button 482. By selecting the task button 482 as shown in FIG. 44, a group task UI 490 is displayed, as shown in FIG. 45. The group task UI 490 includes a member selection mechanism 492 for selecting a particular member to assign the task to, and a group selection box 494 for assigning the task group wide. The group task UI 490 also includes a date selection button 496 for assigning a date for completing the task, and a task name box 498 for assigning a task name. By selecting a create button 500, the task may be generated. By selecting a cancel button 502, the task creation operation may be aborted.

Figure 46:
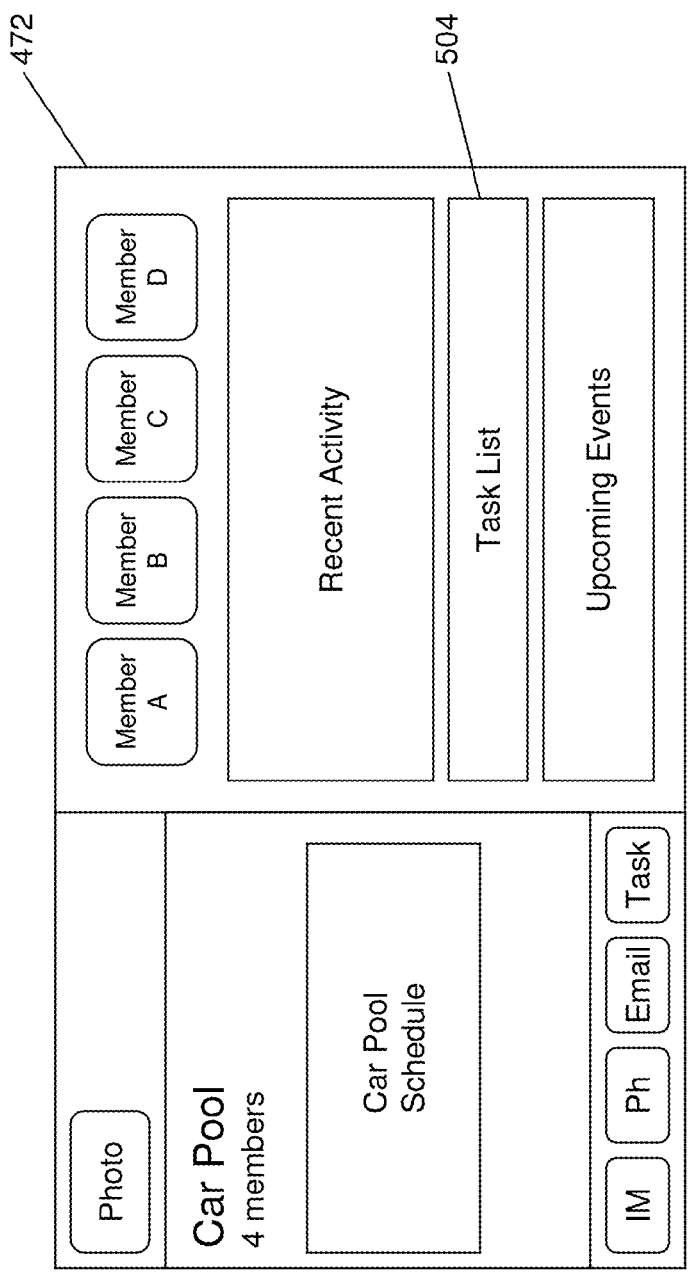
FIG. 46 is a screen shot of an example of a car pool group UI including a task list portion.

After a new task has been created using the group task UI 490, a task list portion 504 is created in the car pool group UI 472 as shown in FIG. 46. It can be appreciated that by enabling tasks to be created in the manner shown in FIGS. 44 to 46, group dossier UIs 17, group applications 424, group database 406 in the mobile devices 32 of the group members and in the cloud computing infrastructure 404 can be updated in concert to allow other members to view the tasks, be assigned to tasks, and to access and view tasks from other electronic devices 408. In this way, group interactions can propagate throughout a social network and become part of the UIs between which a user can pivot and with which the user can interact as discussed herein.

As discussed above, it can be appreciated that a car pool group is only one example of a group 400. For example, groups of friends, family members, co-workers, teams, committees, etc., may also be formed according to the principles discussed herein.

It can also be appreciated that location-based groups as illustrated in FIGS. 42-46 are only one example of a type of group. For example, groups may be formed based on various other associations such as frequent messaging, common interests, common memberships or organizations, etc.

Figure 47:
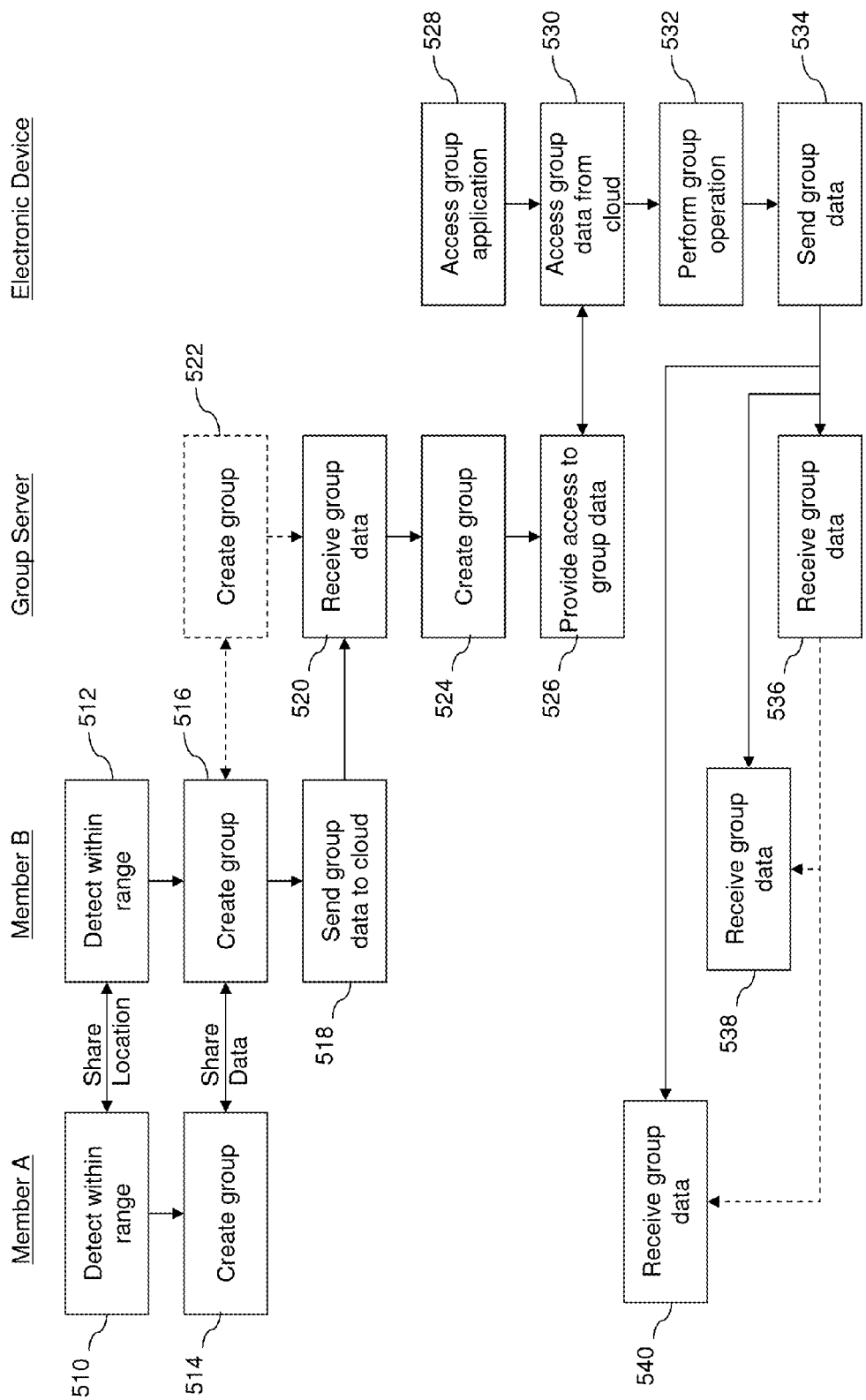
FIG. 47 is a flow chart illustrating example computer executable operations that may be performed in creating a new location-based electronic group.

FIG. 47 illustrates example computer executable operations that may be performed in creating a new location-based group 400. At 510, a first member associated with a first mobile device 32 (hereinafter Member A) detects that a second member associated with a second mobile device 32 (hereinafter Member B) is within range. Similarly, Member B also detects that Member A is within range, at 512, assuming both mobile devices 32 are currently sharing location data. Member A automatically creates the new group 400 at 514, and Member B automatically creates the new group 400 at 516. In this example, Member B sends group data 426 to the group server 402 in the cloud computing infrastructure 404 at 518. However it can be appreciated that Member A may also send group data to the group server 402 to enable the group server 402 to receive the group data 426 for the new group, at 520, and create the new group, at 524. It can be appreciated that, as shown in dashed lines in FIG. 47, the group server 402 may also create the new group, at 522, at the same time as Member A and Member B, e.g., if the group server 402 is privy to the event causing Member A and Member B to create the new group.

Once the group server 402 has created the new group 400 that has been automatically created by Member A and Member B, the group server 402 can provide access to the group data 426, at 526, to enable other electronic devices 408 accessing a group application, at 528, to access the group data 426 from "the cloud," at 530. Since the group server 402 has been provided with the group data 426 associated with the new group, the electronic device 408 can be used to perform a group operation, at 532, and have group data sent, at 534, to the group server 402 and member devices 32 to be received at 536, 538, 540. It can be appreciated that as shown in FIG. 47, the electronic device 408 may be operable to send the group data directly to both the group server 402 and the member mobile devices 32 or may have the group server 402 send the group data 426 on behalf of the electronic device 408.

Providing access to the group server 402 for electronic devices 408 enables users to more conveniently interact with groups using multiple "entry points". For example, a user with a mobile device 32 may be automatically added to a new group while stationary at work, when friends are detected close by. Instead of only being able to interact with the new group using their mobile device 32, by accessing the group server 402 using another electronic device 408 such as their desktop computer, group operations can be seamlessly performed regardless of the device being used. This access provided to the electronic device 408, in addition to sharing of group data 426 between tethered devices (e.g., as discussed above), enables a single user to participate in a group using multiple devices in a convenient manner.

Figure 48:
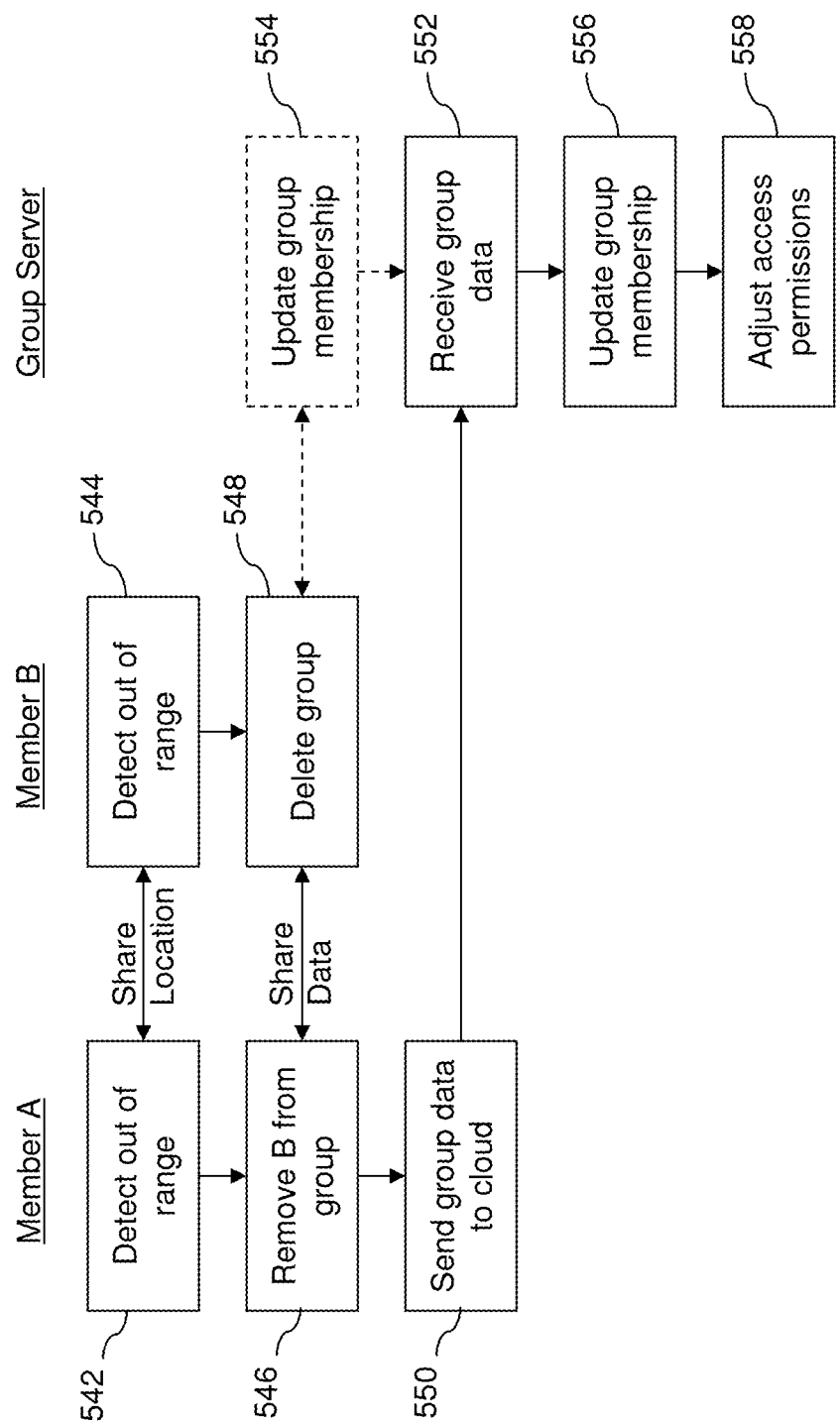
FIG. 48 is a flow chart illustrating example computer executable operations that may be performed in removing a member from a location-based electronic group.

FIG. 48 illustrates example computer executable operations that may be performed in removing a member from a location-based electronic group. Member A detects that Member B is out of range, at 542, and Member B likewise detects that Member A is out of range, at 544, assuming the mobile devices 32 are sharing location information. In the example showing in FIG. 48, it may be assumed that there is at least one additional member in the group and thus Member A remains in the group while Member B is removed from the group by Member A, at 546. Member B then deletes the group and group data 426, at 548. Member A sends group data 426 to the cloud, at 550, indicative of the removal of Member B from the group, which is received by the group server 402, at 552, and the group membership updated, at 556 and access permissions adjusted, at 558, e.g., to prevent Member B from having further access to the group database 406. It can be appreciated that, as shown in dashed lines in FIG. 48, the group server 402 may also update the group membership, at 554, at the same time as Member B deletes the group, at 548, e.g., if the group server 402 is privy to this operation.

Figure 49:
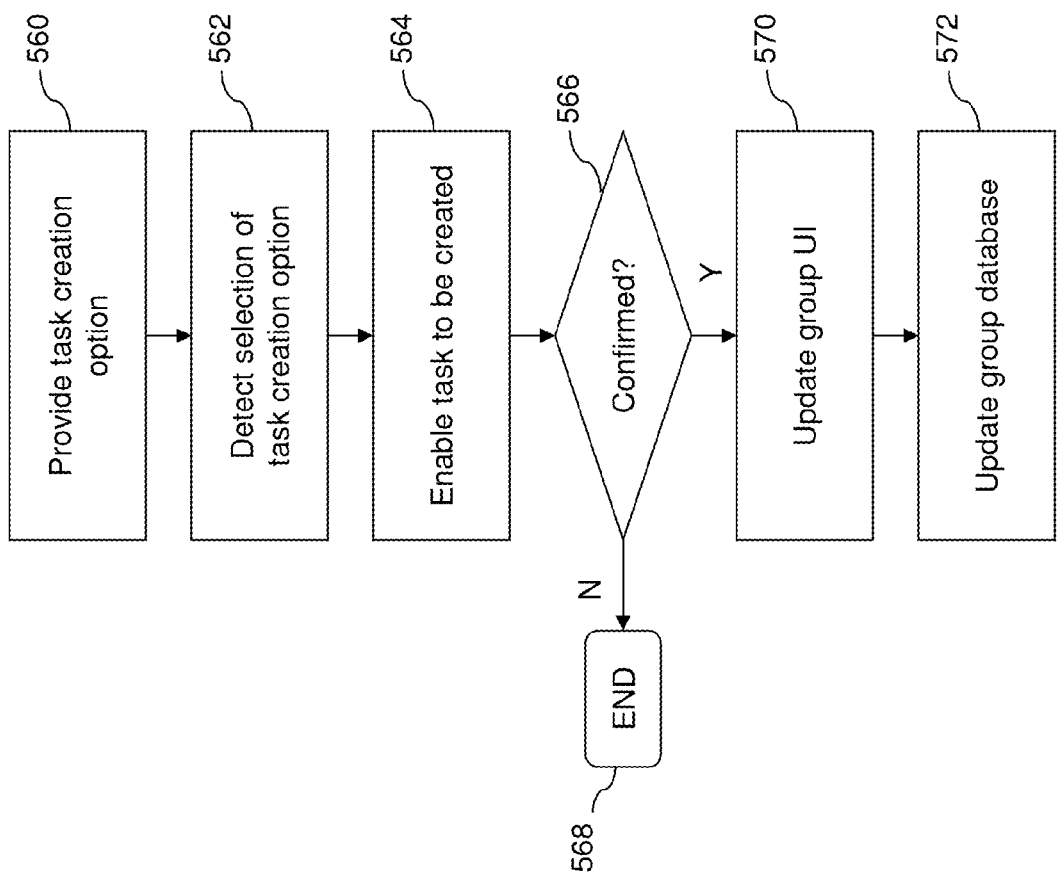
FIG. 49 is a flow chart illustrating example computer executable operations that may be performed in enabling a new group task to be created.

FIG. 49 illustrates example computer executable operations that may be performed in enabling a new group task to be created. At 560, a task creation option is provided, e.g., by providing the task button 482 as shown in FIG. 44. The group module 420 detects selection of the task creation option, at 562, and enables a task to be created, at 564, e.g., by displaying a group task UI 490 as shown in FIG. 45. The group module 420 determines, at 566, whether or not the new task has been confirmed. If not (e.g., if the cancel button 502 is selected), the process ends at 568. If the task has been confirmed, an associated group UI (e.g., car pool group UI 472 shown in FIGS. 44-46) is updated, at 570, and the group database 406 updated, at 572. It can be appreciated that group data 426 may also be sent to the cloud in order for the group server 402 to update the server-based group database 406 as discussed above.

Accordingly, there is provided a method of operating an electronic device, the method comprising: detecting a first input in a first user interface; displaying a second user interface comprising a first plurality of data items obtained from a plurality of sources, the first plurality of data items including a first data item associated with the first user interface and a second data item associated with a third user interface; detecting a second input selecting the second data item in the second user interface; displaying the third user interface; detecting a third input which results in navigating away from the third user interface; and displaying the second user interface.

There is also provided a mobile device comprising a processor, memory, and a display, the memory comprising computer executable instructions for operating the mobile device to: detect a first input in a first user interface; display a second user interface comprising a first plurality of data items obtained from a plurality of sources, the first plurality of data items including a first data item associated with the first user interface and a second data item associated with a third user interface; detect a second input selecting the second data item in the second user interface; display the third user interface; detect a third input which results in navigating away from the third user interface; and display the second user interface.

There is also provided a computer readable storage medium comprising computer executable instructions for operating a mobile device, the computer executable instructions comprising instructions for: detecting a first input in a first user interface; displaying a second user interface comprising a first plurality of data items obtained from a plurality of sources, the first plurality of data items including a first data item associated with the first user interface and a second data item associated with a third user interface; detecting a second input selecting the second data item in the second user interface; displaying the third user interface; detecting a third input which results in navigating away from the third user interface; and displaying the second user interface.

Figure 50:
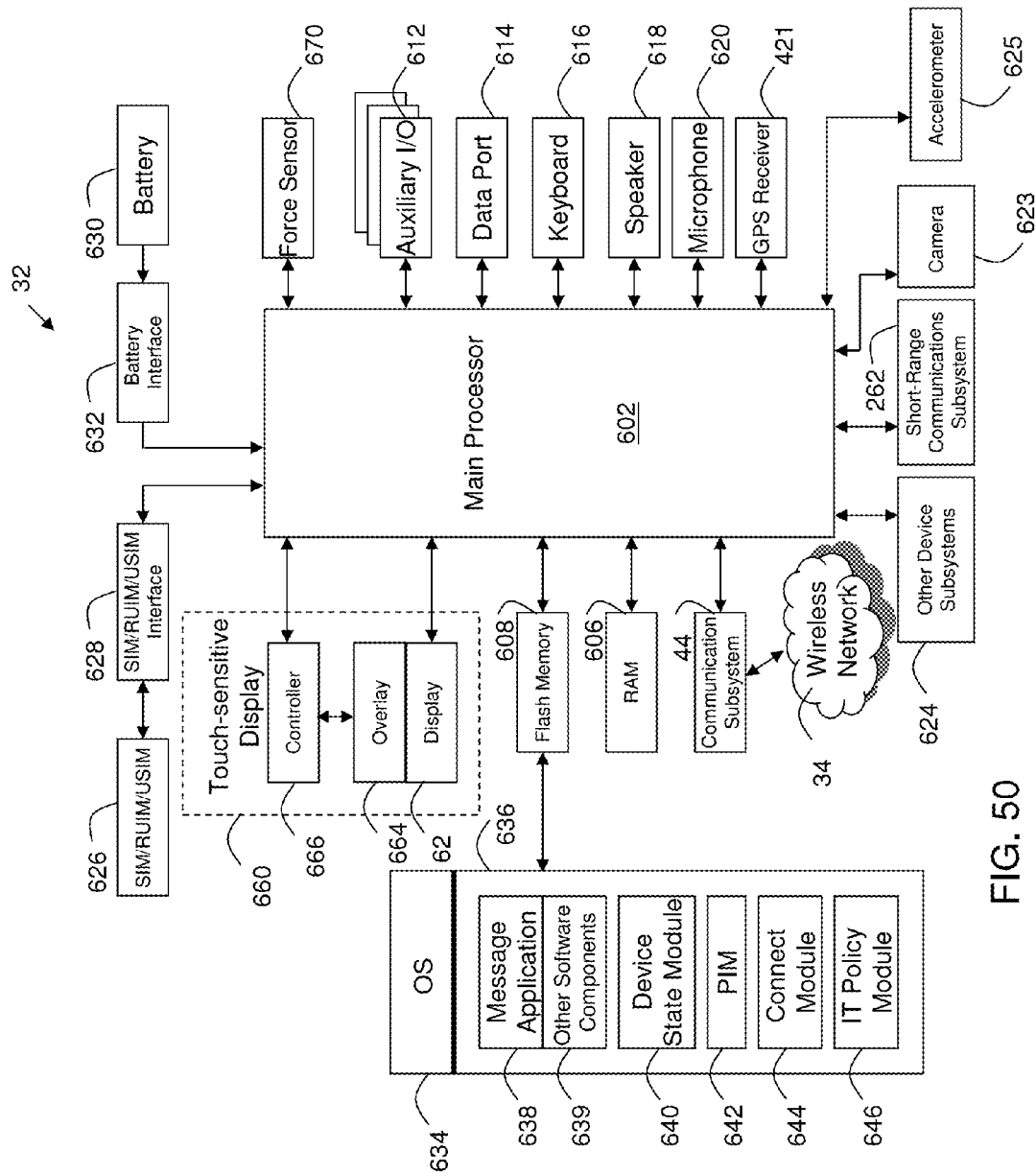
FIG. 50 is a block diagram illustrating an example of a configuration for a mobile device.

Referring to FIG. 50, to further aid in the understanding of the example mobile devices 32, 32' described above, shown therein is a block diagram of an example configuration of a mobile device 32. The mobile device 32 includes a number of components such as a main processor 602 that controls the overall operation of the mobile device 32. Communication functions, including data and voice communications, are performed through a communication subsystem 44. The communication subsystem 44 receives messages from and sends messages to a wireless network 34. In this example of the mobile device 32, the communication subsystem 44 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 44 with the wireless network 34 represents one or more different Radio Frequency (RF) channels, operating according to defined protocols specified for GSM/GPRS communications.

The main processor 602 also interacts with additional subsystems such as a Random Access Memory (RAM) 606, a flash memory 608, a touch-sensitive display 660, an auxiliary input/output (I/O) subsystem 612, a data port 614, a keyboard 616 (physical, virtual, or both), a speaker 618, a microphone 620, a GPS receiver 421, short-range communications subsystem 262, a camera 623, a accelerometer 625 and other device subsystems 624. Some of the subsystems of the mobile device 32 perform communication-related functions, whereas other subsystems may provide "resident" or on-device functions. By way of example, the display 660 and the keyboard 616 may be used for both communication-related functions, such as entering a text message for transmission over the wireless network 34, and device-resident functions such as a calculator or task list. In one example, the mobile device 32 can include a non touch-sensitive display in place of, or in addition to the touch-sensitive display 660. For example the touch-sensitive display 660 can be replaced by a display 62 that may not have touch-sensitive capabilities.

The mobile device 32 can send and receive communication signals over the wireless network 34 after required network registration or activation procedures have been completed. Network access is associated with a subscriber or user of the mobile device 32. To identify a subscriber, the mobile device 32 may use a subscriber module component or "smart card" 626, such as a Subscriber Identity Module (SIM), a Removable User Identity Module (RUIM) and a Universal Subscriber Identity Module (USIM). In the example shown, a SIM/RUIM/USIM 626 is to be inserted into a SIM/RUIM/USIM interface 628 in order to communicate with a network.

The mobile device 32 is typically a battery-powered device and includes a battery interface 632 for receiving one or more rechargeable batteries 630. In at least some examples, the battery 630 can be a smart battery with an embedded microprocessor. The battery interface 632 is coupled to a regulator (not shown), which assists the battery 630 in providing power to the mobile device 32. Although current technology makes use of a battery, future technologies such as micro fuel cells may provide the power to the mobile device 32.

The mobile device 32 also includes an operating system 634 and software components 636 to 646. The operating system 634 and the software components 636 to 646 that are executed by the main processor 602 are typically stored in a persistent store such as the flash memory 608, which may alternatively be a read-only memory (ROM) or similar storage element (not shown). Those skilled in the art will appreciate that portions of the operating system 634 and the software components 636 to 646, such as specific device applications, or parts thereof, may be temporarily loaded into a volatile store such as the RAM 606. Other software components can also be included, as is well known to those skilled in the art.

The subset of software applications 636 that control basic device operations, including data and voice communication applications, may be installed on the mobile device 32 during its manufacture. Software applications may include a message application 638, a device state module 640, a Personal Information Manager (PIM) 642, a connect module 644 and an IT policy module 646. A message application 638 can be any suitable software program that allows a user of the mobile device 32 to send and receive electronic messages, wherein messages are typically stored in the flash memory 608 of the mobile device 32. A device state module 640 provides persistence, i.e. the device state module 640 ensures that important device data is stored in persistent memory, such as the flash memory 608, so that the data is not lost when the mobile device 32 is turned off or loses power. A PIM 642 includes functionality for organizing and managing data items of interest to the user, such as, but not limited to, e-mail, contacts, calendar events, and voice mails, and may interact with the wireless network 34. A connect module 644 implements the communication protocols that are required for the mobile device 32 to communicate with the wireless infrastructure and any host system, such as an enterprise system, that the mobile device 32 is authorized to interface with. An IT policy module 646 receives IT policy data that encodes the IT policy, and may be responsible for organizing and securing rules such as the "Set Maximum Password Attempts" IT policy.

Other types of software applications or components 639 can also be installed on the mobile device 32. These software applications 639 can be pre-installed applications (i.e. other than message application 638) or third party applications, which are added after the manufacture of the mobile device 32. Examples of third party applications include games, calculators, utilities, etc.

The additional applications 639 can be loaded onto the mobile device 32 through at least one of the wireless network 34, the auxiliary I/O subsystem 612, the data port 614, the short-range communications subsystem 262, or any other suitable device subsystem 624.

The data port 614 can be any suitable port that enables data communication between the mobile device 32 and another computing device. The data port 614 can be a serial or a parallel port. In some instances, the data port 614 can be a USB port that includes data lines for data transfer and a supply line that can provide a charging current to charge the battery 630 of the mobile device 32.

For voice communications, received signals are output to the speaker 618, and signals for transmission are generated by the microphone 620. Although voice or audio signal output is accomplished primarily through the speaker 618, the display 660 can also be used to provide additional information such as the identity of a calling party, duration of a voice call, or other voice call related information.

The touch-sensitive display 660 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 660 is a capacitive touch-sensitive display which includes a capacitive touch-sensitive overlay 664. The overlay 664 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 662 of the touch-sensitive display 660 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 660. The processor 602 may determine attributes of the touch, including a location of a touch. Touch location data may include an area of contact or a single point of contact, such as a point at or near a center of the area of contact, known as the centroid. A signal is provided to the controller 666 in response to detection of a touch. A touch may be detected from any suitable object, such as a finger, thumb, appendage, or other items, for example, a stylus, pen, or other pointer, depending on the nature of the touch-sensitive display 660. The location of the touch moves as the detected object moves during a touch. The controller 666 and/or the processor 602 may detect a touch by any suitable contact member on the touch-sensitive display 660. Similarly, multiple simultaneous touches, are detected.

One or more gestures are also detected by the touch-sensitive display 660. A gesture is a particular type of touch on a touch-sensitive display 660 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a "flick"). A swipe has a single direction. The touch-sensitive overlay 664 may evaluate swipes with respect to the origin point at which contact is initially made with the touch-sensitive overlay 664 and the end point at which contact with the touch-sensitive overlay 664 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 664 to initialize the gesture, a horizontal movement of the detected object from the origin point to an end point towards the right or left side of the touch-sensitive overlay 664 while maintaining continuous contact with the touch-sensitive overlay 664, and a breaking of contact with the touch-sensitive overlay 664. Similarly, a vertical swipe typically comprises an origin point towards the top or bottom of the touch-sensitive overlay 664 to initialize the gesture, a horizontal movement of the detected object from the origin point to an end point towards the bottom or top of the touch-sensitive overlay 664 while maintaining continuous contact with the touch-sensitive overlay 664, and a breaking of contact with the touch-sensitive overlay 664.

Swipes can be of various lengths, can be initiated in various places on the touch-sensitive overlay 664, and need not span the full dimension of the touch-sensitive overlay 664. In addition, breaking contact of a swipe can be gradual in that contact with the touch-sensitive overlay 664 is gradually reduced while the swipe is still underway.

Meta-navigation gestures may also be detected by the touch-sensitive overlay 664. A meta-navigation gesture is a gesture that has an origin point that is outside the display area of the touch-sensitive overlay 664 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 664. Thus, two fingers may be utilized for meta-navigation gestures. Further, multi-touch meta-navigation gestures may be distinguished from single touch meta-navigation gestures and may provide additional or further functionality.

In some examples, an optional force sensor 670 or force sensors is disposed in any suitable location, for example, between the touch-sensitive display 660 and a back of the mobile device 32 to detect a force imparted by a touch on the touch-sensitive display 660. The force sensor 670 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 32, any component of or related to the communication system 44, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating an electronic device, the method comprising:
   detecting in a first user interface, a first input associated with a first data item, the first user interface being related to a first application;
   in response to detecting the first input, displaying a second user interface comprising a first plurality of data items obtained from a plurality of sources related to a plurality of corresponding applications, the first plurality of data items including the first data item and a second data item associated with a third user interface related to a second application, the second user interface being related to at least one of an individual and a group;
   enabling the first user interface to be redisplayed after detecting a second input in the second user interface associated with navigating back to the first user interface; and
   enabling the third user interface to be displayed after detecting a third input selecting the second data item in the second user interface, the third user interface enabling the second user interface to be redisplayed after detecting a fourth input for navigating away from the third user interface.

2. The method of claim 1, further comprising at least one of detecting the second input and redisplaying the first user interface; and detecting the third input and displaying the third user interface.

3. The method of claim 2, wherein the second input comprises any one of:
   selection of an option displayed in the second user interface;
   a swipe gesture in the second user interface; and
   selection of a button on the electronic device.

4. The method of claim 1, wherein the fourth input comprises any one of:
   sending a message;
   closing the third user interface; and
   selection of a link displayed in the third user interface associated with an individual or group related to the first plurality of data items.

5. The method of claim 4, wherein the individual or group related to the first plurality of data items is any one of a contact, a group of individuals, and a group event.

6. The method of claim 1, wherein the third user interface comprises a second plurality of data items obtained from a plurality of sources, the second plurality of data items being associated with an individual or group that is different from the individual or group associated with the second user interface.

7. The method of claim 6, wherein one of the second and third user interfaces is related to an individual, and the other of the second and third user interfaces is related to a group of individuals or a group event.

8. The method of claim 6, wherein prior to detecting the fourth input, the method further comprises:
   detecting a fifth input selecting one of the second plurality of data items in the third user interface; and
   displaying a fourth user interface.

9. The method of claim 1, wherein at least one of the plurality of sources is remote from the electronic device.

10. The method of claim 9, wherein the at least one source remote from the electronic device comprises a social networking server.

11. The method of claim 1, wherein the at least one of the first plurality of data items is obtained in real time from a respective source after detecting the first input.

12. The method of claim 1, wherein the third user interface relates to a first messaging application, the method further comprising detecting a sixth input in the second user interface after detecting the fourth input, and displaying a fifth user interface related to a second messaging application.

13. The method of claim 1, wherein at least one of the first, second, and third user interfaces is displayed on another electronic device communicable with the electronic device.

14. A mobile device comprising a processor, memory, and a display, the memory comprising computer executable instructions for operating the mobile device to:
   detect in a first user interface, a first input associated with a first data item, the first user interface being related to a first application;
   in response to detecting the first input, display a second user interface comprising a first plurality of data items obtained from a plurality of sources related to a plurality of corresponding applications, the first plurality of data items including the first data item and a second data item associated with a third user interface related to a second application, the second user interface being related to at least one of an individual and a group;
   enable the first user interface to be redisplayed after detecting a second input in the second user interface associated with navigating back to the first user interface; and
   enable the third user interface to be displayed after detecting a third input selecting the second data item in the second user interface, the third user interface enabling the second user interface to be redisplayed after detecting a fourth input for navigating away from the third user interface.

15. A computer readable storage medium comprising computer executable instructions for operating a mobile device, the computer executable instructions comprising instructions for:
   detecting in a first user interface, a first input associated with a first data item, the first user interface being related to a first application;
   in response to detecting the first input, displaying a second user interface comprising a first plurality of data items obtained from a plurality of sources related to a plurality of corresponding applications, the first plurality of data items including the first data item and a second data item associated with a third user interface related to a second application, the second user interface being related to at least one of an individual and a group;
   enabling the first user interface to be redisplayed after detecting a second input in the second user interface associated with navigating back to the first user interface; and
   enabling the third user interface to be displayed after detecting a third input selecting the second data item in the second user interface, the third user interface enabling the second user interface to be redisplayed after detecting a fourth input for navigating away from the third user interface.

* * * * *